(12) United States Patent
Burgess et al.

(10) Patent No.: US 9,533,219 B2
(45) Date of Patent: *Jan. 3, 2017

(54) CONTROLLER FOR A GAMES CONSOLE

(71) Applicant: Ironburg Inventions Ltd., Wincanton, Somerset (GB)

(72) Inventors: Simon Burgess, Cossington (GB); Duncan Ironmonger, Atlanta, GA (US)

(73) Assignee: Ironburg Inventions Ltd., Wincanton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,641

(22) Filed: Jul. 22, 2015

(65) Prior Publication Data

US 2015/0321092 A1    Nov. 12, 2015

Related U.S. Application Data

(63) Continuation of application No. 14/736,771, filed on Jun. 11, 2015, which is a continuation of application No. PCT/EP2014/060587, filed on May 22, 2014.

(Continued)

(51) Int. Cl.
*A63F 9/24* (2006.01)
*A63F 13/23* (2014.01)
(Continued)

(52) U.S. Cl.
CPC ............... *A63F 13/23* (2014.09); *A63F 13/02* (2013.01); *A63F 13/08* (2013.01); *A63F 13/24* (2014.09);
(Continued)

(58) Field of Classification Search
None
See application file for complete search history.

(56) References Cited

U.S. PATENT DOCUMENTS 4,032,728 A    6/1977  Oelsch
5,989,123 A    11/1999 Tosaki et al.
(Continued)

FOREIGN PATENT DOCUMENTS

EP    2 479 636    7/2012
EP    2 698 185    2/2015
(Continued)

OTHER PUBLICATIONS

Review: Scuf Xbox 360 Controller, Dave Burns, pp. 5, Oct. 20, 2010 source: archive.org/web20/20101022215104/http://www.xboxer360.com/features/review-scuf-xbox-360-controller/.*

(Continued)

*Primary Examiner* — Paul A D'Agostino
(74) *Attorney, Agent, or Firm* — Walters & Wasylyna LLC

(57) ABSTRACT

The invention provides an improved controller (10) for a games console. The invention is a games controller (10) that is intended to be held by a user in both hands in the same manner as a conventional controller (1). Additionally, the controller of the invention (10) may comprise the same controls (2, 3, 4, 5, 6, 7, 8, 9) as a conventional controller (1). The controller of the present invention (10) is advantageous as it additionally comprises four additional controls (11A, 11B, 11C, 11D) located on the rear of the controller (10) in a position to be operated by the middle fingers of a user (12). The additional controllers (11A, 11B, 11C, 11D) may be paddle levers and may replicate the functions of one or more of the controls (2, 3, 4, 5, 6, 7, 8, 9) located on the front or top of the controller (10).

6 Claims, 48 Drawing Sheets

Related U.S. Application Data

(60) Provisional application No. 61/882,171, filed on Sep. 25, 2013, provisional application No. 61/826,087, filed on May 22, 2013.

(51) Int. Cl.
*A63F 13/24* (2014.01)
*A63F 13/98* (2014.01)
*A63F 13/90* (2014.01)

(52) U.S. Cl.
CPC ........ *A63F 13/98* (2014.09); *A63F 2300/1043* (2013.01)

(56) References Cited

U.S. PATENT DOCUMENTS

| | | | | |
|---|---|---|---|---|
| 6,251,015 | B1* | 6/2001 | Caprai | A63F 13/06 273/148 B |
| 7,510,477 | B2* | 3/2009 | Argentar | A63F 13/02 345/156 |
| 7,859,514 | B1 | 12/2010 | Park | |
| 8,568,233 | B2* | 10/2013 | Block | A63F 13/02 463/36 |
| 8,641,525 | B2* | 2/2014 | Burgess | A63F 13/24 200/329 |
| 9,089,770 | B2 | 7/2015 | Burgess et al. | |
| 2001/0003713 | A1 | 6/2001 | Willner et al. | |
| 2001/0025778 | A1 | 10/2001 | Ono | |
| 2002/0052237 | A1* | 5/2002 | Magill | A63F 13/06 463/38 |
| 2002/0128064 | A1* | 9/2002 | Sobota | A63F 13/06 463/37 |
| 2003/0067111 | A1* | 4/2003 | Swan | A63F 13/02 273/148 R |
| 2004/0259059 | A1* | 12/2004 | Aoki | A63F 13/10 434/61 |
| 2005/0083297 | A1 | 4/2005 | Duncan | |
| 2005/0255918 | A1* | 11/2005 | Riggs | A47C 3/16 463/37 |
| 2006/0025217 | A1* | 2/2006 | Hussaini | A63F 13/06 463/36 |
| 2009/0088250 | A1* | 4/2009 | Carlson | A63F 13/06 463/37 |
| 2009/0258705 | A1* | 10/2009 | Guinchard | A63F 13/02 463/37 |
| 2010/0073283 | A1 | 3/2010 | Enright | |
| 2010/0304865 | A1* | 12/2010 | Picunko | A63F 13/06 463/37 |
| 2011/0256930 | A1* | 10/2011 | Jaouen | A63F 13/06 463/37 |
| 2011/0281649 | A1* | 11/2011 | Jaouen | A63F 13/06 463/36 |
| 2012/0322553 | A1* | 12/2012 | Burgess | A63F 13/24 463/37 |
| 2014/0274397 | A1* | 9/2014 | Sebastian | G06F 3/014 463/37 |
| 2015/0238855 | A1* | 8/2015 | Uy | A63F 13/24 463/37 |

FOREIGN PATENT DOCUMENTS

| | | |
|---|---|---|
| GB | 2 244 546 | 12/1991 |
| GB | 2 481 633 | 1/2012 |
| WO | WO 2008/131249 | 10/2008 |

OTHER PUBLICATIONS

International Search Report, PCT/EP2014/060587 (2014).
International Search Report, PCT/EP2015/058096 (2015).
Written Opinion of the International Searching Authority, PCT/EP2015/058096 (2015).
Burns, "Review: Scuf Xbox 360 Controller," Xboxer360.com (2010).
Combined Search and Examination Report, GB1011078.1 (2011).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Office Action, U.S. Appl. No. 14/832,211 (2015).
Office Action, U.S. Appl. No. 14/736,771 (2015).
Office Action, U.S. Appl. No. 14/805,597 (2015).
Office Action, U.S. Appl. No. 14/805,661 (2015).
Corrected Petition for Inter Partes Review of U.S. Pat. No. 9,089,770, Under 37 C.F.R. § 42.100, filed by Valve Corporation, Case IPR2016-00949 (2016).
Corrected Petition for Inter Partes Review of U.S. Pat. No. 8,641,525, Under 37 C.F.R. § 42.100, filed by Valve Corporation, Case IPR2016-00948 (2016).
Xbox 360 Wireless Controller Tour, published on May 13, 2005 at http://www.ign.com/articles/2005/05/13/xbox-360-wireless-controller-tour.

\* cited by examiner

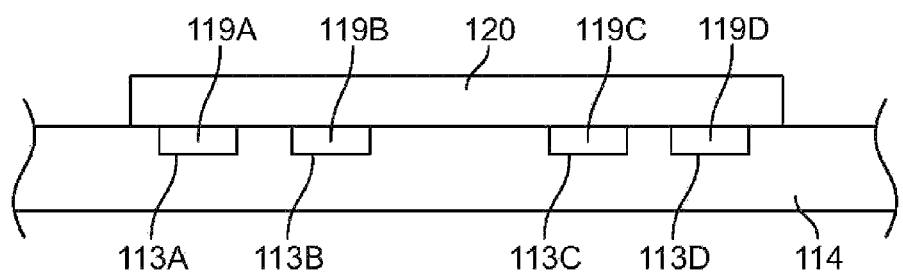
FIG. 12
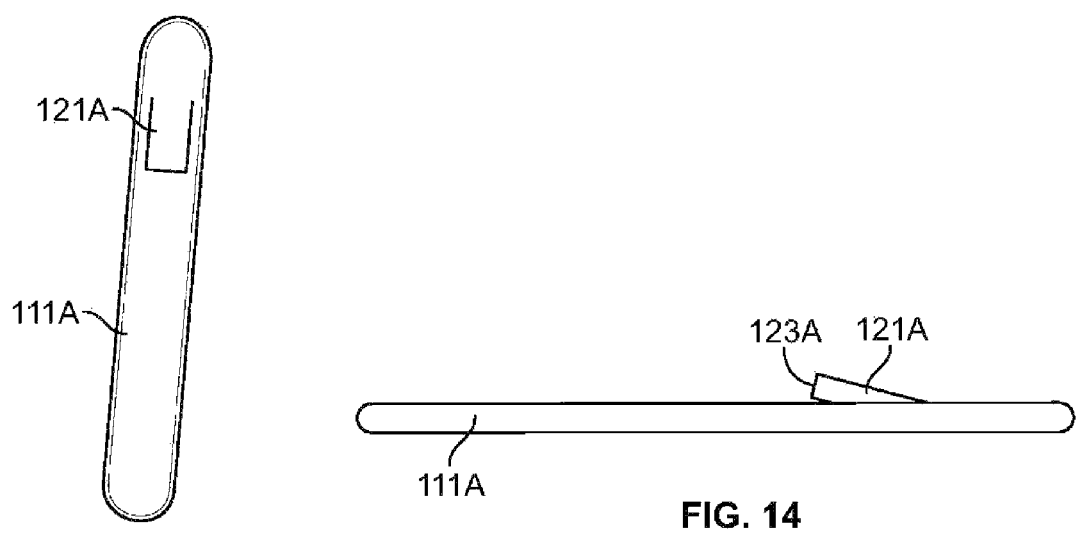
FIG. 13
FIG. 14
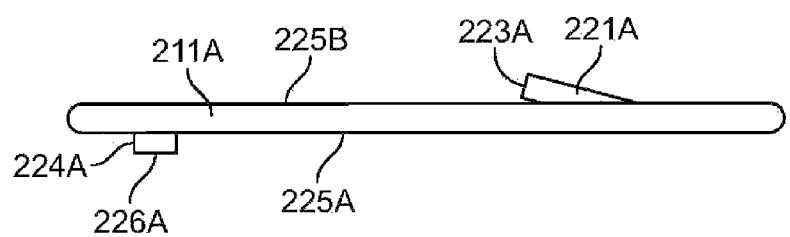
FIG. 15

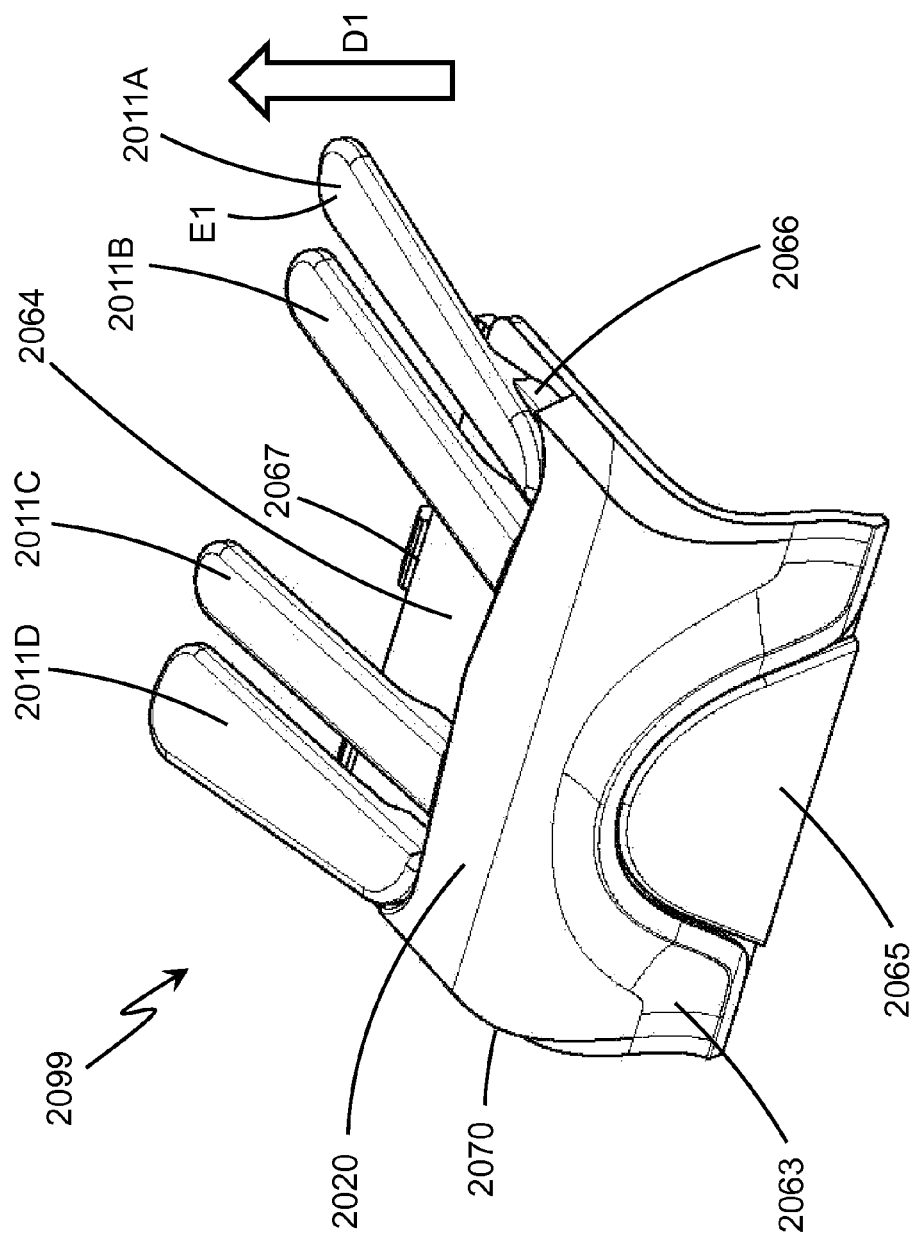

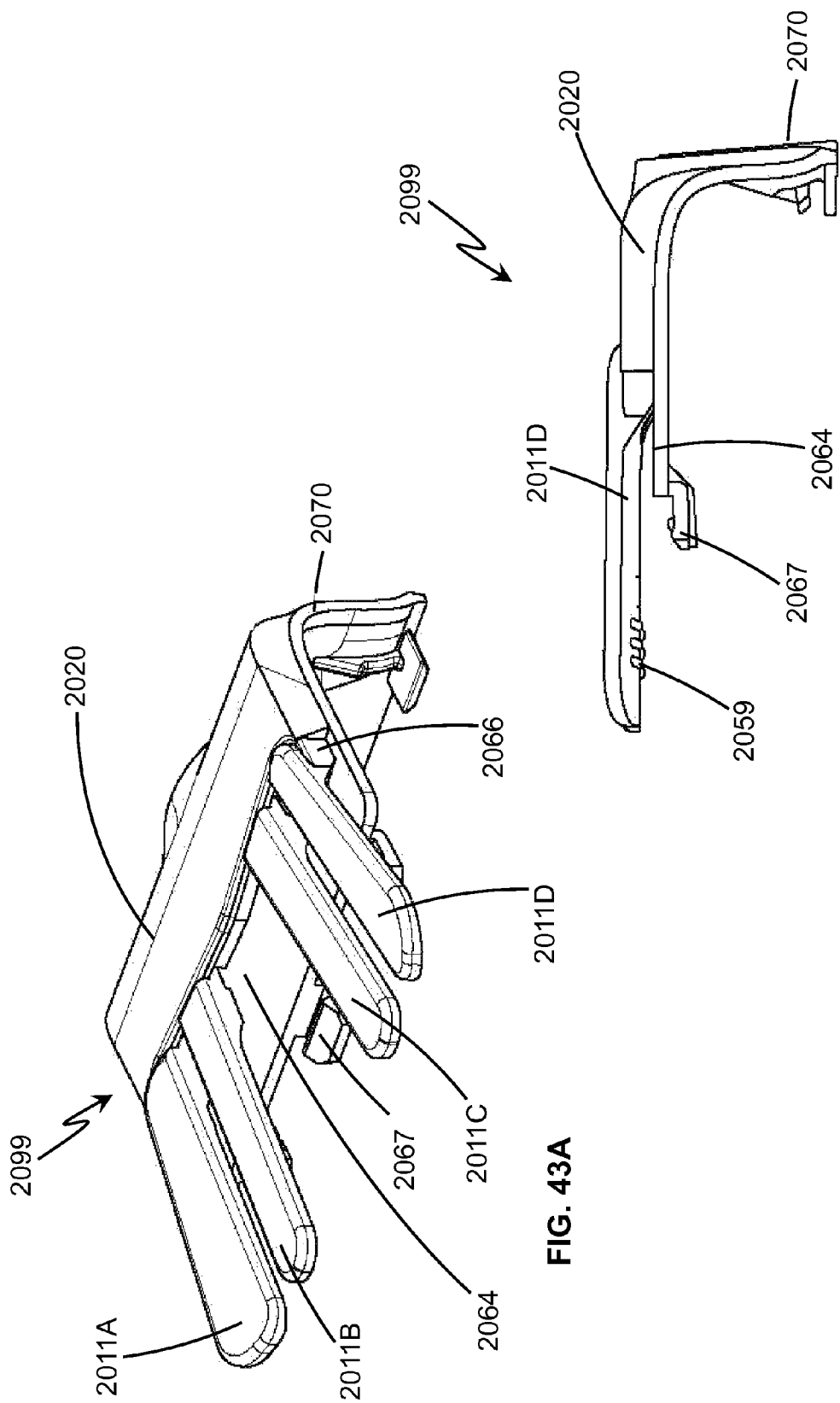

CONTROLLER FOR A GAMES CONSOLE

PRIORITY

This application is a continuation of U.S. Ser. No. 14/736,771 filed on Jun. 11, 2015, which is a continuation of PCT/EP2014/060587 filed on May 22, 2014, which claims priority from U.S. Ser. No. 61/882,171 filed on Sep. 25, 2013, and U.S. Ser. No. 61/826,087 filed on May 22, 2013. The entire contents of U.S. Ser. No. 14/736,771, PCT/EP2014/060587, U.S. Ser. No. 61/882,171 and U.S. Ser. No. 61/826,087 are incorporated herein by reference.

FIELD

The present invention relates to games consoles, in particular to hand held controllers for games consoles.

BACKGROUND

Controllers for most current games consoles are generally intended to be held and operated by the user using both hands. A conventional controller will generally comprise a hard outer case with a plurality of controls mounted about the controller. Typically the controls include buttons, analogue control sticks, bumpers and triggers. An example of a conventional controller is shown in FIG. 1.

As can be seen in FIG. 1, all of the controls are mounted on the front and top of the controller 1. Specifically, there are left and right analogue thumb sticks 2, 3 which normally control movement and are intended to be operated by the user's left and right thumbs respectively. There are four buttons 4, located on a front right portion of the controller 1, which normally control additional actions and are intended to be operated by the user's right thumb. There is a direction pad 5 located on the lower portion of the front left of the controller 1. The direction pad 5 is intended to be operated by the user's left thumb, typically either as an alternative to the left thumb stick 2 or to provide additional actions. A left trigger 6, a right trigger 7, a left bumper 8 and a right bumper 9 are located on the top edge of the controller 1. The left and right triggers 6, 7 are typically operated by a user's index fingers. The left and right bumpers 8, 9 may also be operated by a user's index fingers.

The only way to operate the four buttons 4 is for a user to remove their right thumb from the right thumb stick 3. This takes time and, in some games, can cause the loss of control. This is a particular problem in games where the right thumb stick 3 is used for aiming. A similar problem may arise in games where the direction pad 5 provides additional actions and the user has to remove their thumb from the left thumb stick 2 in order to operate the direction pad 5.

In light of the above, there is a need for an improved controller which removes the requirement for a user to remove their thumb from the left or right thumb stick 2, 3 in order to operate additional actions controlled by the four buttons 4 and/or the direction pad 5.

The present invention seeks to overcome or at least mitigate the problems of the prior art.

SUMMARY

A first aspect of the present invention provides a hand held controller for a games console comprising a hard outer case and a plurality of controls located on a front and top of the controller. The controller is shaped to be held in both hands of a user such that the user's thumbs are positioned to operate controls located on the front of the controller and the user's index fingers are positioned to operate controls located on the top of the controller. The controller further comprises at least one additional control mounted on a back of the controller such that the at least one additional control is in a position operable by the middle finger of a user. The controller comprises a switch mechanism mounted in the outer case, and disposed in vertical registry with at least a portion of the at least one additional control, the switch mechanism being mounted to be disposed flush with the back of the controller. Each of the at least one additional control comprises a projection arranged to be aligned in vertical registry with the switch mechanism, the projection providing an engaging surface for activating the switch mechanism.

Optionally, the at least one additional control comprises a paddle lever.

Optionally, the paddle lever comprises an elongate member.

A second aspect of the present invention provides a paddle lever for engaging with a hand held controller comprising an elongate member and a first part of a complementary locking mechanism for engaging with a second part of a complementary locking mechanism disposed on a back of the controller. The paddle lever comprises a projection extending from a first surface, the projection providing an engaging surface for activating a switch mechanism mounted within the controller.

A third aspect of the present invention provides a hand held controller for a games console comprising a hard outer case and a plurality of controls located on a front and top of the controller. The controller is shaped to be held in both hands of a user such that the user's thumbs are positioned to operate controls located on the front of the controller and the user's index fingers are positioned to operate controls on the top of the controller. The controller further comprises at least one additional control mounted on a back of the controller such that the at least one additional control is in a position operable by a user's middle finger. The controller comprises a switch mechanism mounted in the outer case and disposed in vertical registry with at least a portion of the at least one additional control, the switch mechanism being mounted to be disposed in a recessed position with respect to the back of the controller. Each of the at least one additional controls comprises a projection arranged to be aligned in vertical registry with the switch mechanism, the projection providing an engaging surface for activating the switch mechanism.

Further features and advantages of the present invention will be apparent from the specific embodiments illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIG. 12 is a view, taken along the line A-A' shown in FIG. 8, of a portion of the rear panel of a games controller according to a second embodiment in which the paddles have been removed;

FIG. 13 is a plan view from below of a paddle component for the games console controller according to the second embodiment;

FIG. 14 is a side view of a paddle component for the games console controller according to the second embodiment;

FIG. 15 is a side view of a paddle component for the games console controller according to a third embodiment;

FIG. 42 is a perspective view from below of a manifold and paddles for the rear of the games console controller according to a twentieth embodiment;

FIG. 43A is an alternative perspective view from below of the manifold and paddles of FIG. 42;

FIG. 43B is a side view of the manifold and paddles of FIG. 42;

DETAILED DESCRIPTION

Figure 1:
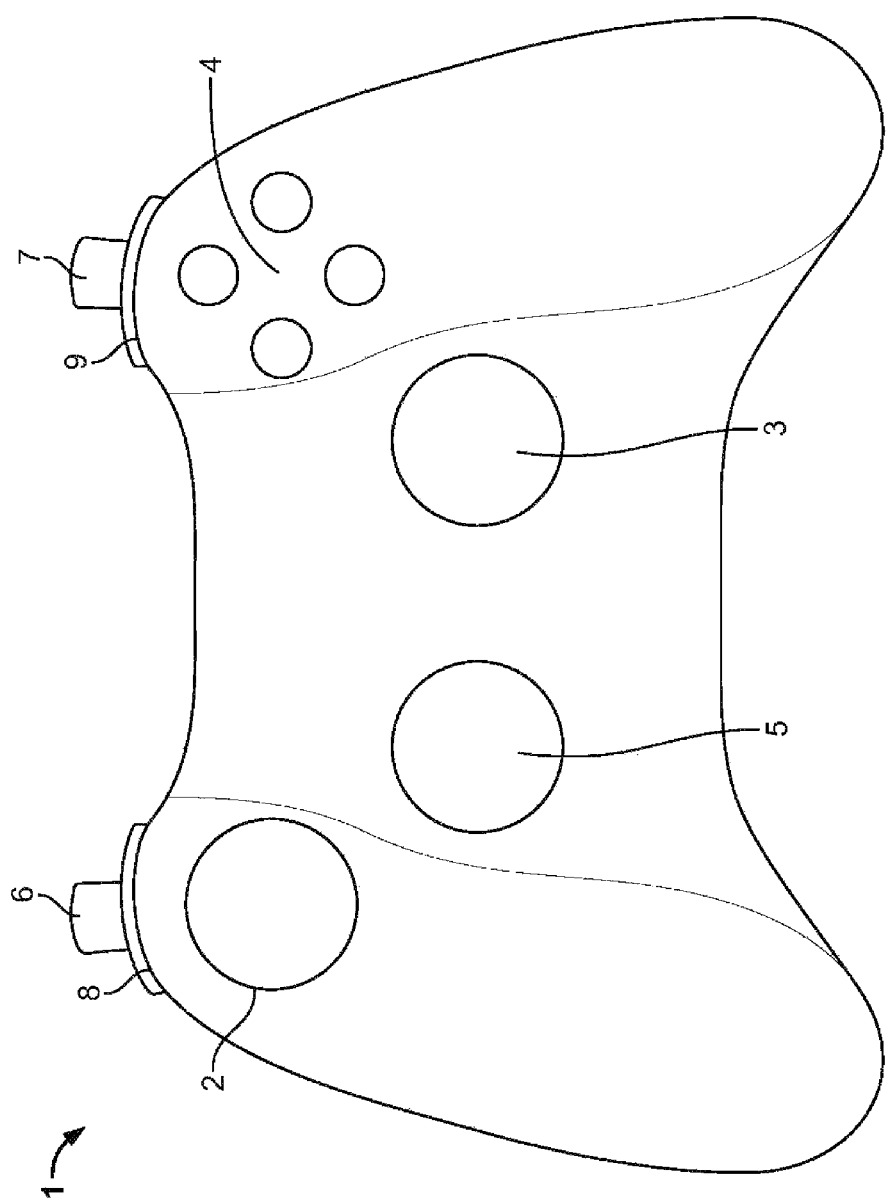
FIG. 1 is a schematic illustration of the front of a conventional games console controller according to the prior art.

The rear of a games controller 10 according to the present invention is illustrated in FIGS. 2 to 6. The front of the games controller 10 of FIGS. 2 to 6 is the same as a conventional controller 1, as illustrated in FIG. 1 and as discussed above. Therefore, where appropriate, the same reference numerals have been used to indicate the features of the controller according to the present invention 10 that are identical to the features of a conventional controller 1.

Figure 6:
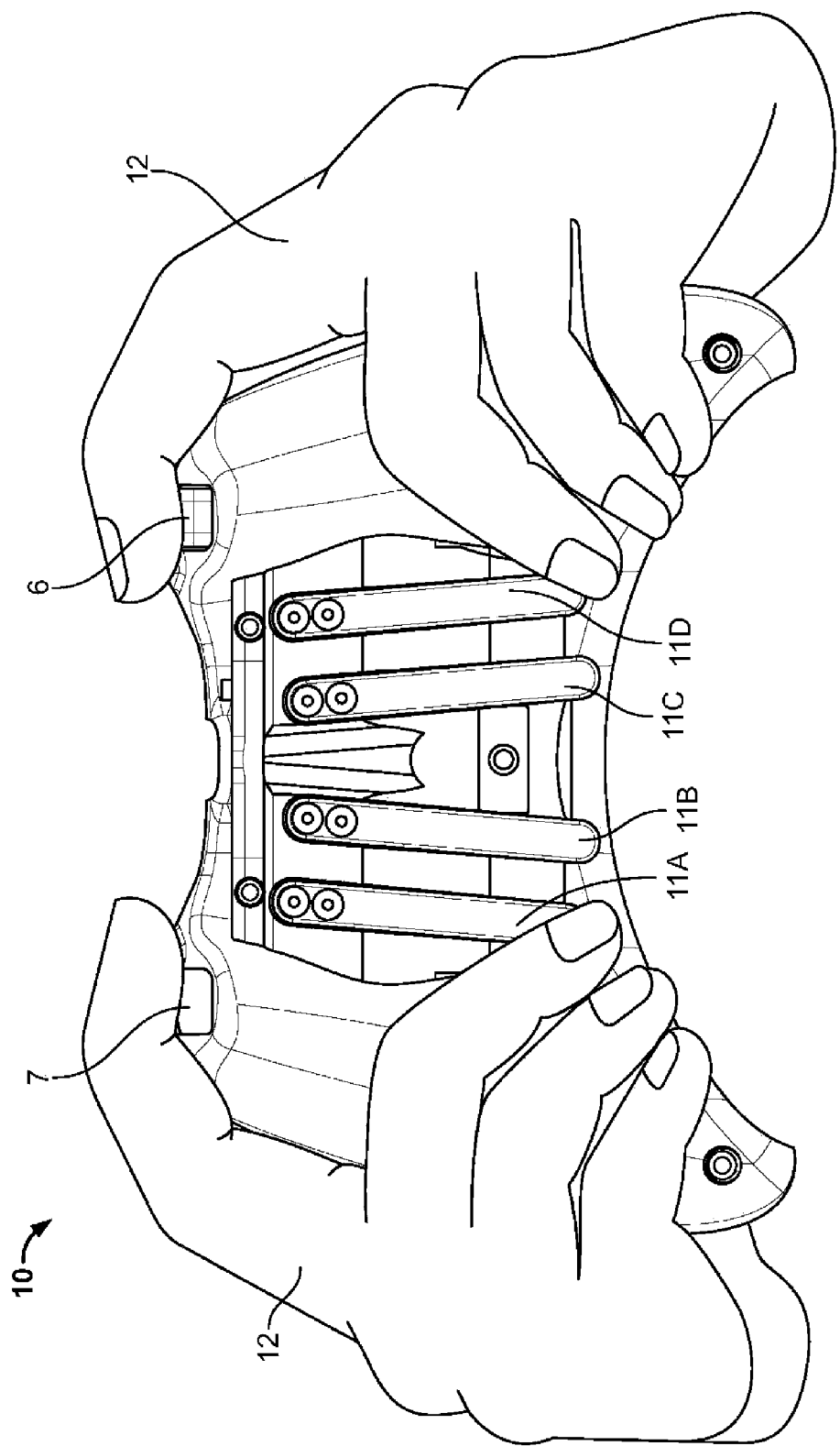
FIG. 6 is a schematic illustration from below of the rear of a games console controller according to the first embodiment in use.

The games controller 10 of the present invention differs from the conventional controller 1 in that it additionally comprises four paddle levers 11A, 11B, 11C, 11D located on the rear of the controller. The paddle levers 11A, 11B are substantially orientated in parallel with respect to a first handle portion H1 of the controller 10 and are positioned to be operated by the middle, ring or little fingers of a user 12, as shown in FIG. 6. The paddle levers 11C, 11D are substantially orientated in parallel with respect to a second handle portion H2 of the controller 10 and are positioned to be operated by the middle, ring or little fingers of a user 12, as shown in FIG. 6.

In one embodiment the paddles 11A, 11B, 11C, 11D are formed from a thin, flexible material such as a plastics material, for example polyethylene. Preferably, the paddles 11A, 11B, 11C, 11D are less than 10 mm thick, but may be less than 5 mm thick and more preferably are 3 mm thick or less.

Figure 19:
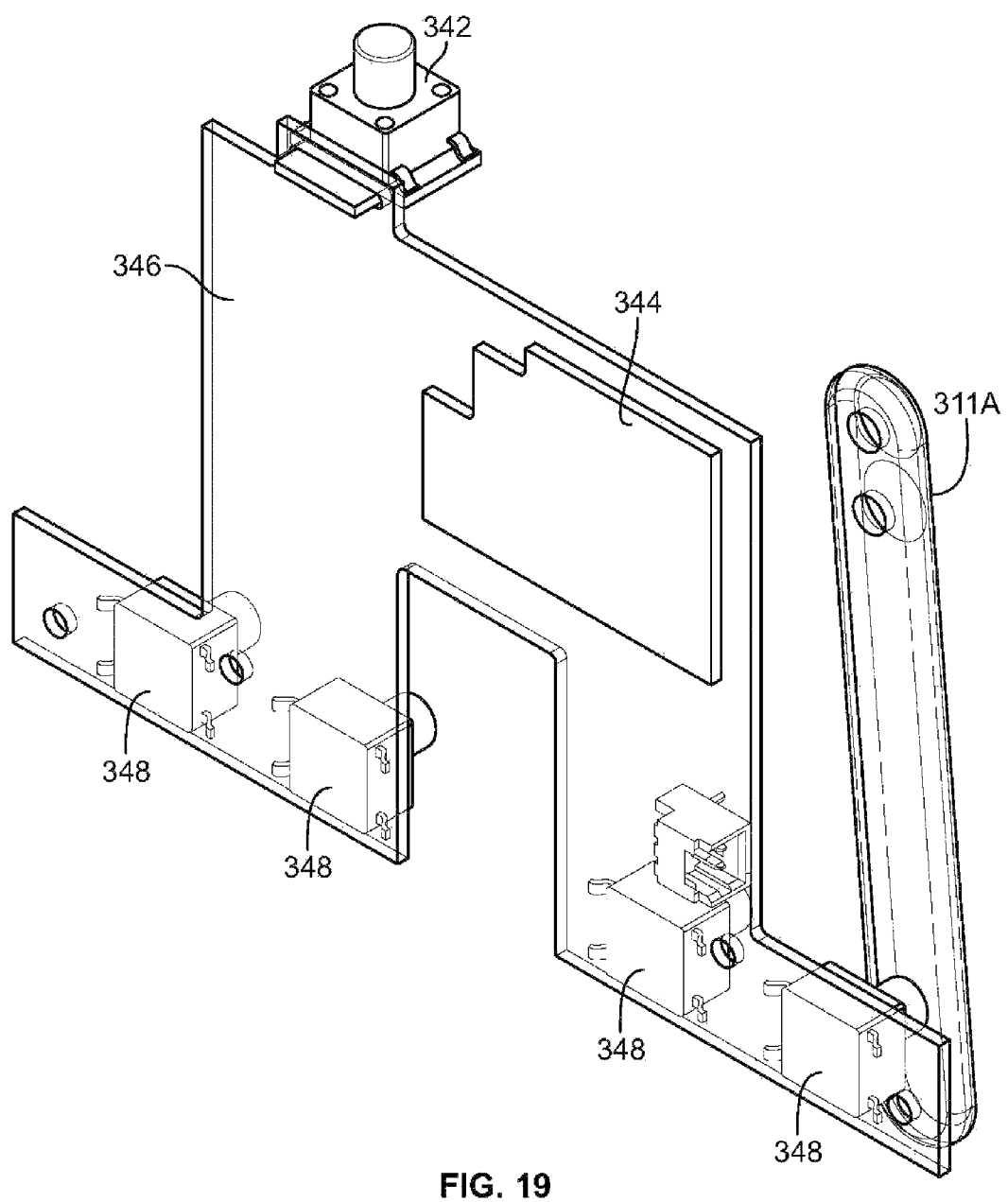
FIGS. 19 and 20 are schematic illustrations of the components of the games controller according to the fourth embodiment.
Figure 20:
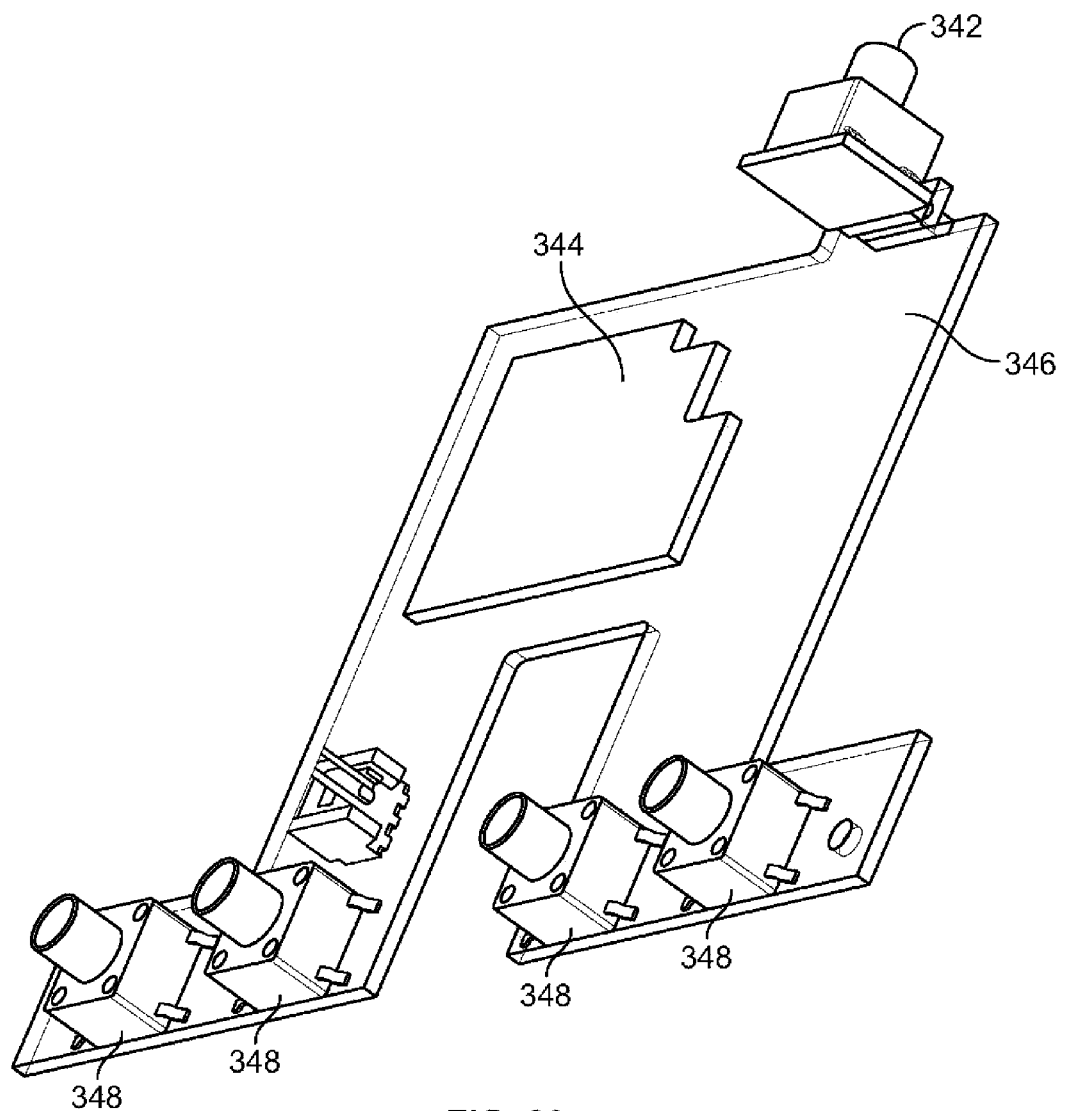

The paddles 11A, 11B, 11C, 11D are inherently resilient, that is to say that they return to an unbiased position when not under load. A user may displace or depress either of the paddles 11A, 11B, 11C, 11D by engaging an outer surface thereof; such displacement causes the paddle 11A, 11B, 11C, 11D to activate a switch mechanism 348 as shown in FIGS. 19 and 20 mounted within the body of the controller 10. The paddles 11A, 11B, 11C, 11D are mounted between the first handle portion H1 and the second handle portion H2 located on the back of the controller 10, and are disposed in close proximity to the outer surface of the controller body.

Figure 2:
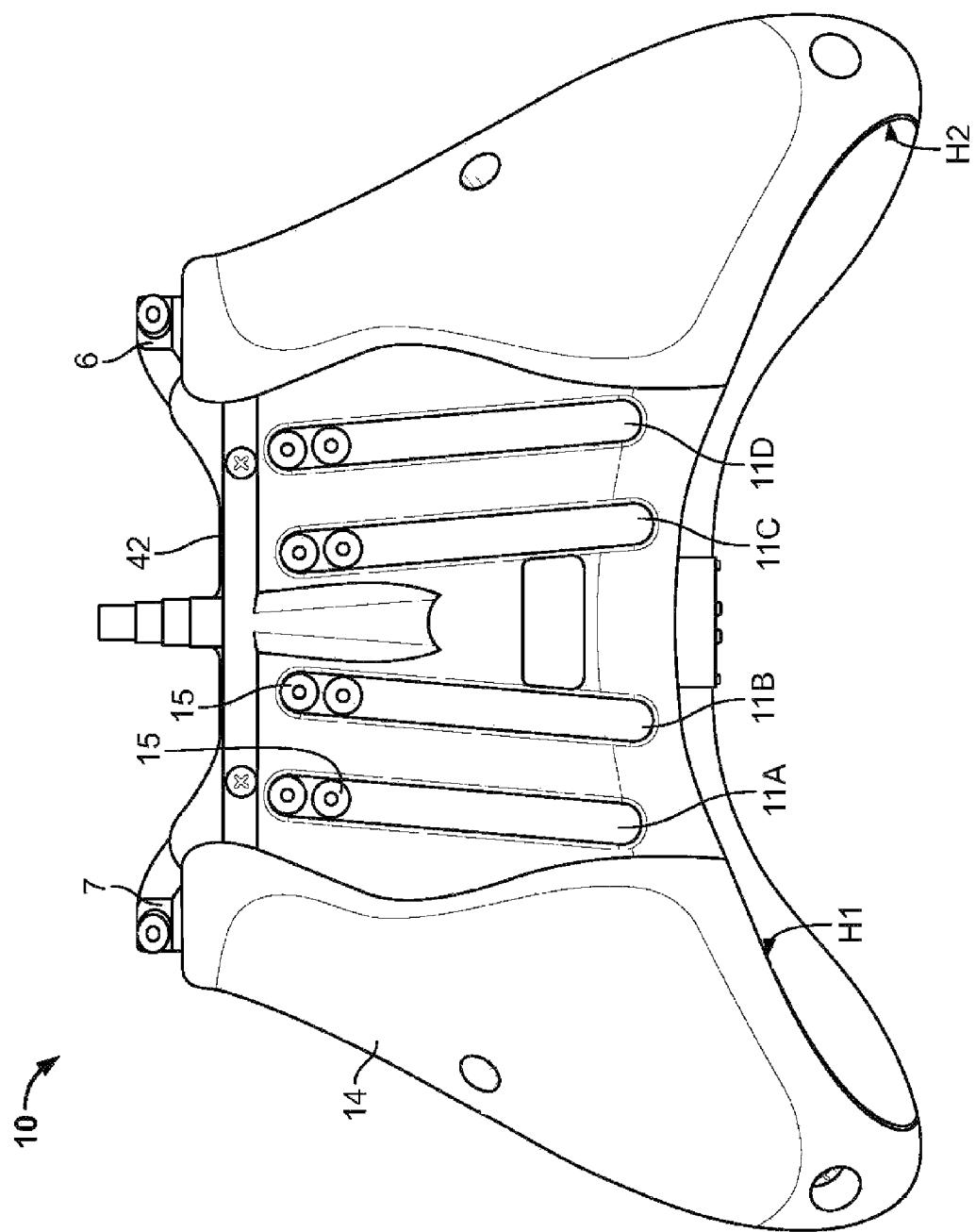
FIG. 2 is a plan view from below of the rear of a games controller according to the first embodiment.
Figure 3:
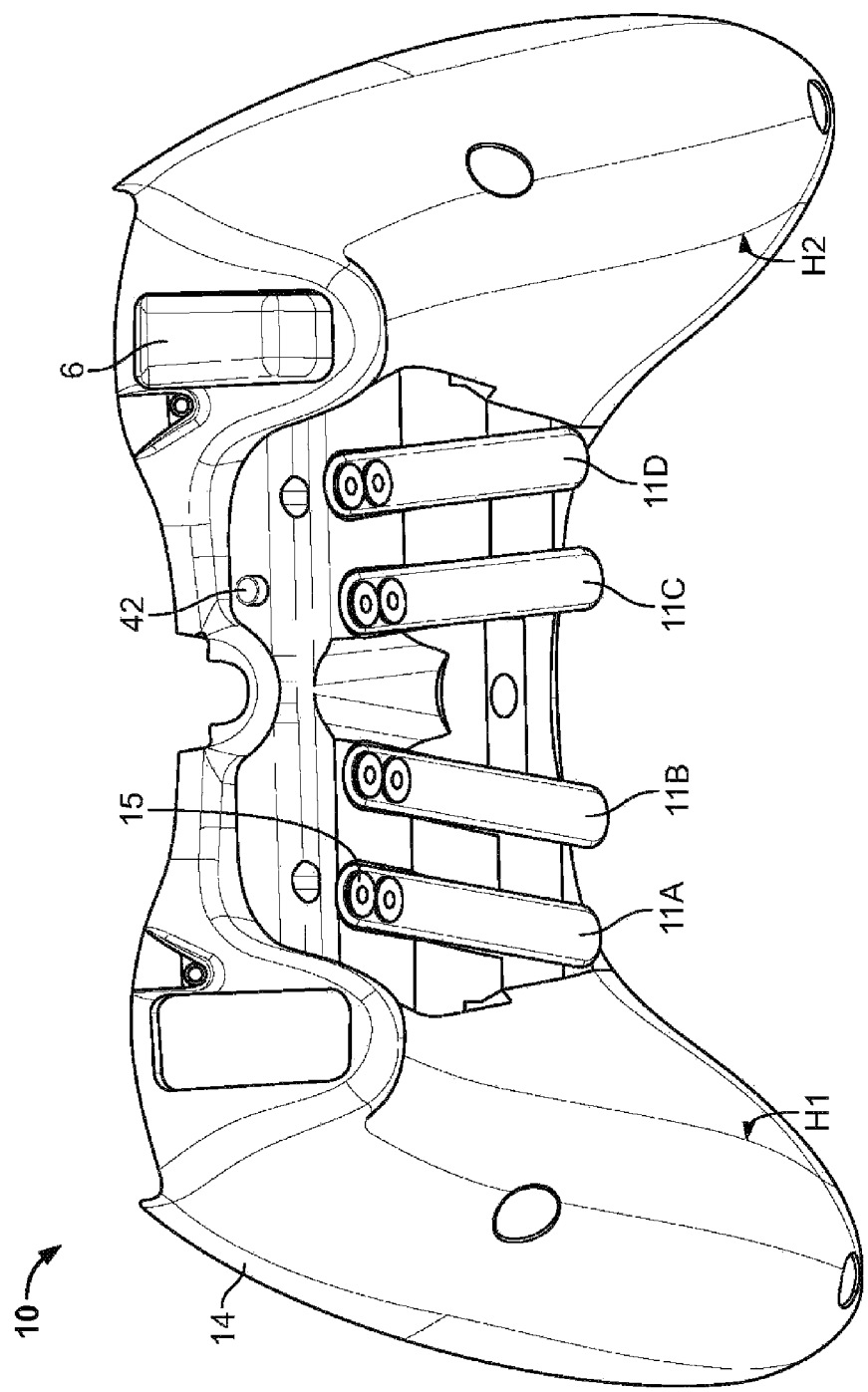
FIG. 3 is a perspective view from below of the rear panel of a games console controller according to a first embodiment.
Figure 4:
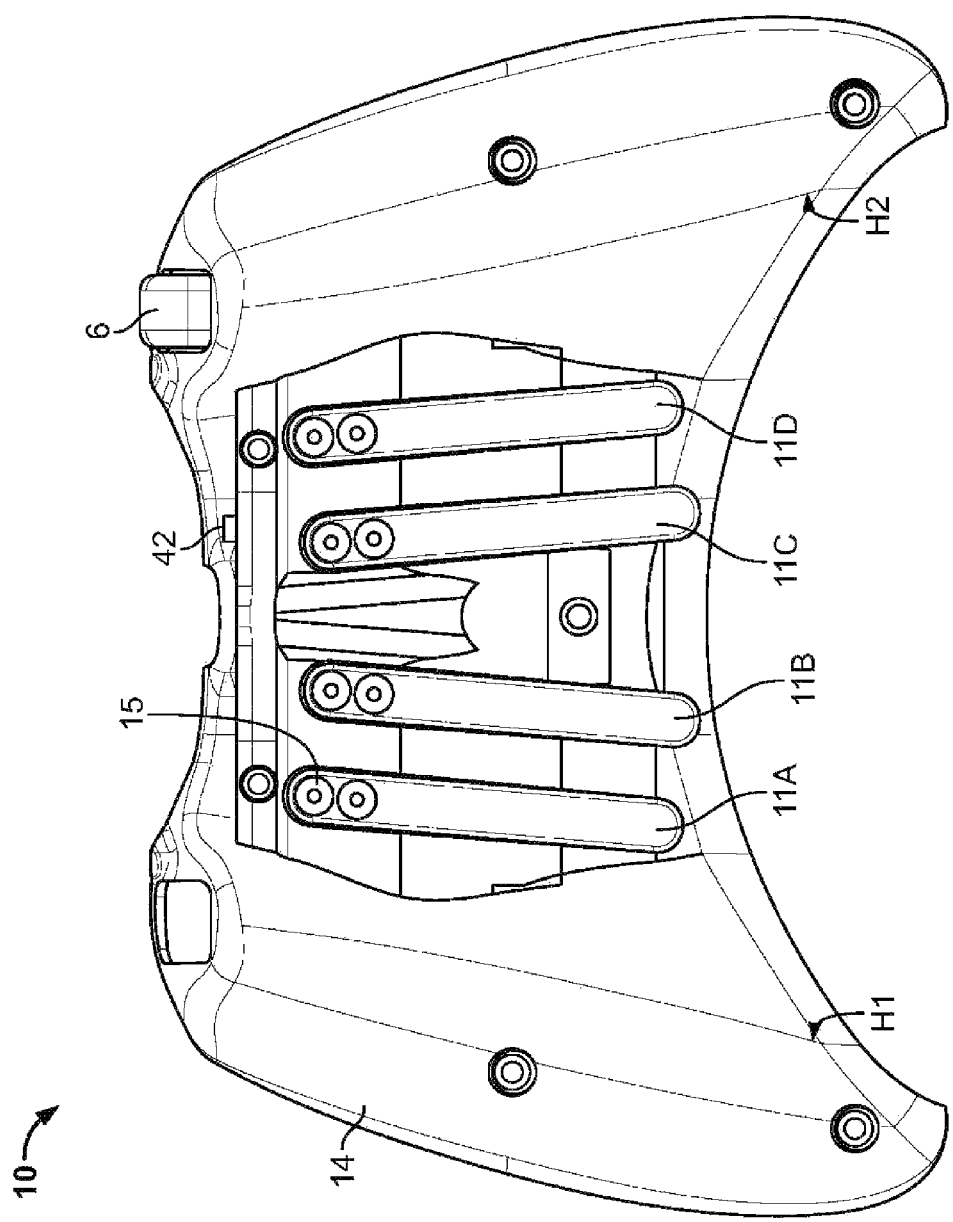
FIG. 4 is a plan view from below of the rear panel of a games controller according to the first embodiment.

In the embodiment of FIG. 2, the paddles are fixed by a screw mechanism. A screw 15, having an external screw thread, is received in each of a pair of apertures provided in each of the paddles 11A, 11B, 11C, 11D. The apertures for receiving the screws are provided at one end of the paddles 11A, 11B, 11C, 11D; this is a fixed end. The other end of the paddles 11A, 11B, 11C, 11D is moveable. In this way, the paddles 11A, 11B, 11C, 11D can be bent or deformed temporarily. The inherent resilience of the paddles 11A, 11B, 11C, 11D returns the paddles 11A, 11B, 11C, 11D substantially to their starting position when released. The screws 15 are received in the back of the controller 10 in a respective aperture having an internal screw thread. It is envisaged that the internal screw thread may be pre-tapped into the back portion of the controller body, or may be created when driving the screws 15 into the back portion of the controller body, for example by using a self-tapping screw. It is also envisaged that the internal screw thread may be provided directly in the material forming the back portion of the controller body or may be provided in a separate insert or nut secured to, or in, the controller body.

Figure 7:
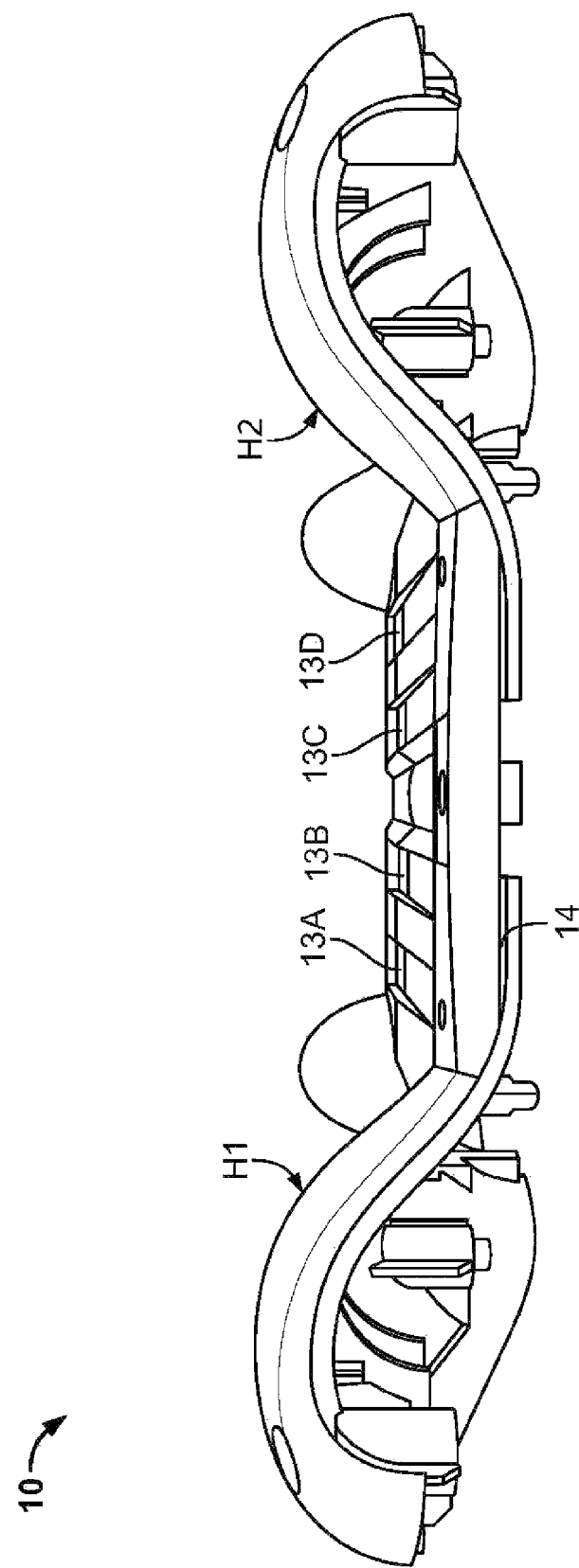
FIG. 7 is an end view of the rear panel of a games console controller according to the first embodiment in which the paddles have been removed to illustrate channels.
Figure 8:
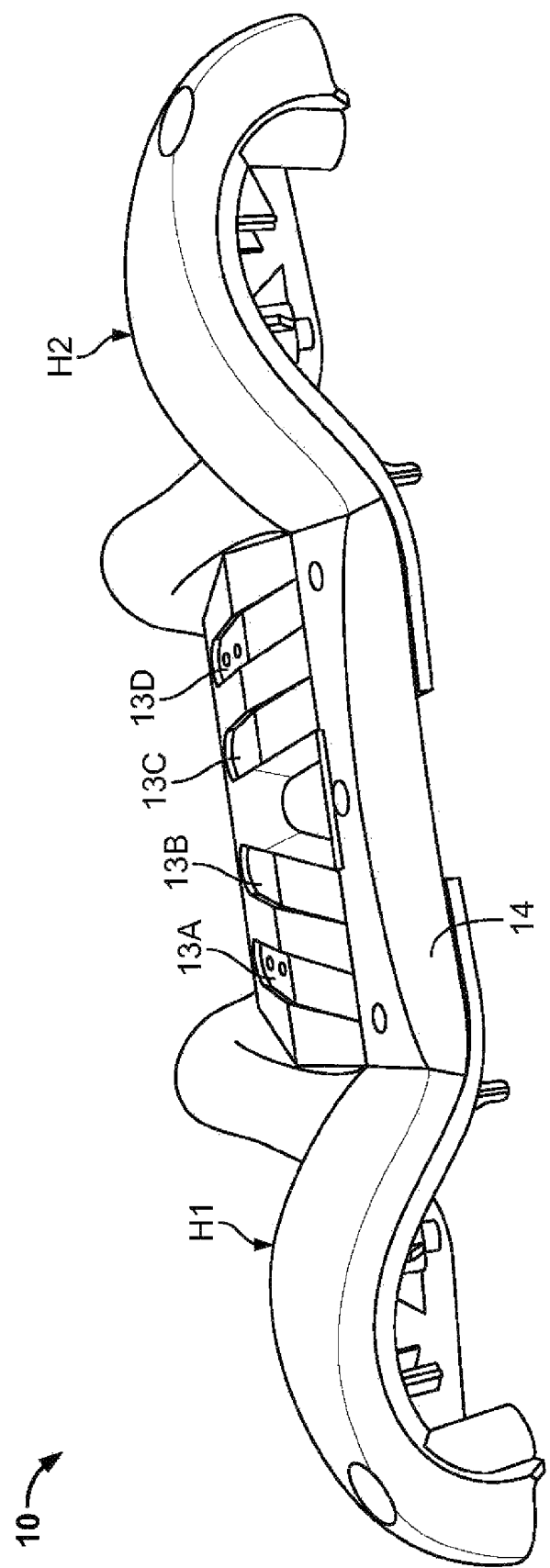
FIG. 8 is a perspective view from below of the rear panel of a games console controller according to the first embodiment in which the paddles have been removed to illustrate channels.

The base of the controller 10 is provided with four channels 13A, 13B, 13C, 13D, best shown in FIGS. 7 and 8. Each channel receives a respective one of the paddles 11A, 11B, 11C, 11D. In the illustrated embodiment the channels 13A, 13B, 13C, 13D are arranged to receive an end portion of the respective paddles 11A, 11B, 11C, 11D. This is achieved by reducing the depth of the channels 13A, 13B, 13C, 13D towards one end to nothing, such that the channels 13A, 13B, 13C, 13D are tapered. This provides that one end of each of the paddles 11A, 11B, 11C, 11D stands proud of the back of the controller 10, best shown in FIG. 5. In this way a user can readily engage with the paddles 11A, 11B, 11C, 11D. The channels 13A, 13B, 13C, 13D provide stability to the paddles 11A, 11B, 11C, 11D. This increases the durability of the paddles and of the fixing means.

The channels 13A, 13B, 13C, 13D reduce the likelihood of the paddles 11A, 11B, 11C, 11D rotating about the fixing end when engaging with the moveable end. The channels serve to restrict movement of the paddles 11A, 11B, 11C, 11D in a direction substantially perpendicular to the back of the controller, as indicated by direction arrow D1 in FIG. 5.

In this way, a user may engage the paddles 11A, 11B, 11C, 11D with the tips of the fingers, preferably the middle fingers, without compromising their grip on the controller 10. However, it is envisaged that a user could use the ring or little finger. The index fingers may simultaneously engage trigger style controls mounted on the top end of the controller 10 whilst the thumbs may be used to activate controls on the front of the controller 10.

The paddles 11A, 11B, 11C, 11D are elongate in shape and substantially extend in a direction from the top to the bottom of the controller 10. In one embodiment, the paddles are orientated such that they converge towards the top end with respect to one another; in an alternative embodiment, the paddles are orientated parallel with respect to one another. The elongate shape of the paddles allows a user to engage the paddles with any of the middle, ring or little fingers; it also provides that different users, having different sized hands, can engage with the paddles in a comfortable position, thereby reducing the effects of prolonged or repeated use such as repetitive strain injury.

Each of the four paddle levers 11A, 11B, 11C, 11D can replicate the function of one of the four buttons 4 located on the front of the controller 10, and thereby allow a user to operate the functions of the relevant buttons using their middle fingers 12, without the need to remove either of their thumbs from the left or right thumb sticks 2, 3. In alternative embodiments, the paddle levers 11A, 11B, 11C, 11D may activate a new function not activated by the controls on the front of the controller 10.

It is envisaged that the paddles 11A, 11B, 11C, 11D could be fitted to an existing controller 10. In such embodiments, the paddles would be mounted onto an outer surface of the controller body by means of a mechanical fixing such as a screw or bolt or, alternatively, bonded or welded to the controller body by adhesive or other suitable means. A switch mechanism would be mounted within the controller in vertical registry with a portion of each paddle. A portion of the switch mechanism may extend through the controller body and be disposed in close proximity to, or in contact with, an innermost surface of the paddles 11A, 11B, 11C, 11D.

Figure 5:
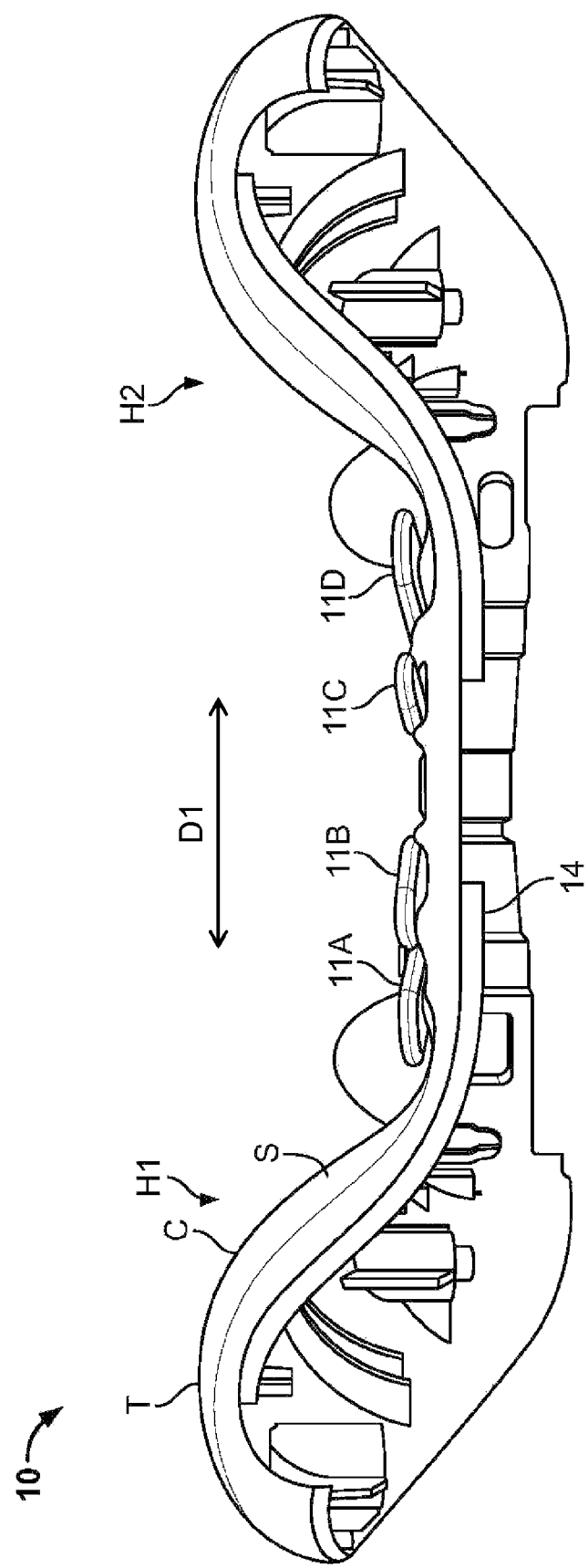
FIG. 5 is a rear end view of the rear panel of a games console controller according to the first embodiment.

The handles H1, H2 comprise an inner surface S, as shown in FIG. 5. The inner surface S is engaged by the middle, ring and little fingers of a user's hands. The ring and little fingers are increasingly important for grip of the controller when the middle fingers are employed actuating the paddles 11A, 11B, 11C, 11D. The inner surface S of each of the handles H1, H2 meets a region of the back of the controller 10 upon which the paddles 11A, 11B, 11C, 11D are mounted. The inner surface S is inclined at a steep angle with respect to this region of the controller 10. This angle is equal to or greater than 45 degrees; optionally it may be between about 50 degrees to about 60 degrees. The handles H1, H2 have a substantially flat top portion T. The flat top portion T meets the inner surface S to define a corner or edge; the corner or edge is sharp, that is to say has a small radius of curvature. In this way the handles H1, H2 provide an ergonomic shape for being grasped by the ring and little fingers of a user's hands.

Referring now to FIGS. 9 to 20, there are shown alternative embodiments of the present invention. In the further alternative illustrated embodiments like numerals have, where possible, been used to denote like parts, albeit with the addition of the prefix "100" or "200" or "300" and so on to indicate that these features belong to the second, third, fourth and so on embodiment respectively. The alternative embodiments share many common features with the first embodiment and therefore only the differences from the embodiment illustrated in FIGS. 1 to 8 will be described in any greater detail.

Figure 9:
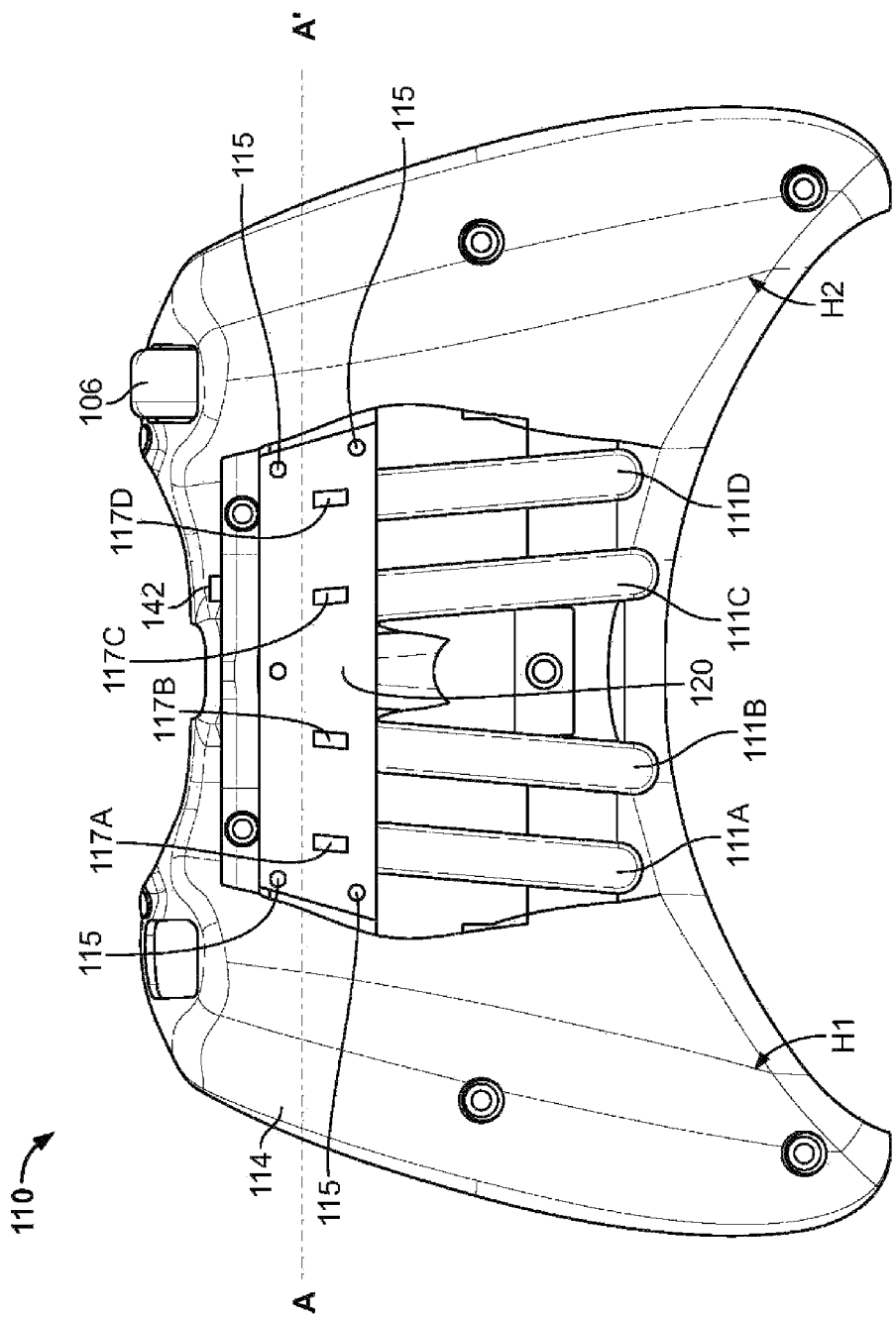
FIG. 9 is a plan view from below of the rear panel of a games controller according to a second embodiment.
Figure 10:
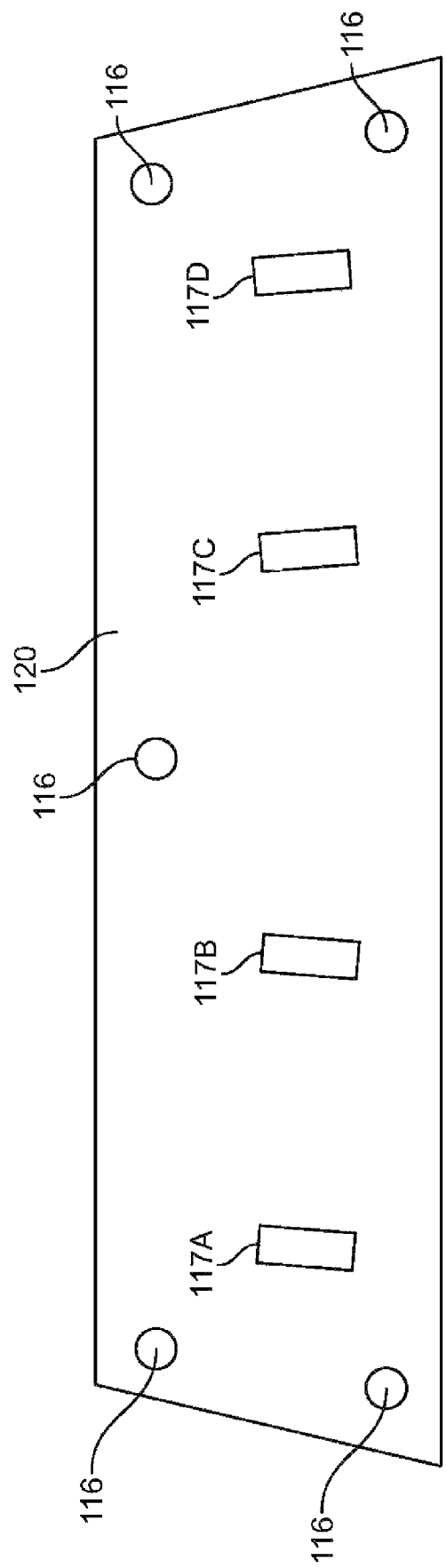
FIG. 10 is a schematic illustration of a component of the rear of a games console controller according to the second embodiment.

FIG. 9 illustrates a plan view from below of a rear body panel 114 of a controller 110. The rear body panel 114 comprises a manifold or cover portion 120. In the illustrated embodiment the cover portion 120 is secured to an external surface of the rear body panel 114 of the controller 110 by screws 115, although in other embodiments alternative fixing means are envisaged including, but not limited to, adhesive or mechanical interlocks. In alternative embodiments the cover portion 120 may be secured to an internal surface of the rear body panel 114 of the controller 110. In such an embodiment, the rear body panel 114 of the controller 110 may comprise apertures through which the paddle levers 111A, 111B, 111C, 111D are inserted. In yet other embodiments, the cover portion 120 may be integrally formed or molded with the rear body panel 114 of a controller 110.

The cover portion 120 comprises a first part 117A, 117B, 117C, 117D of a complementary locking means. The first part 117A, 117B, 117C, 117D of the complementary locking means takes the form of an aperture. The aperture is preferably rectangular in shape, although other shapes are envisaged. The cover portion 120 comprises five screw apertures 116 each for receiving a screw 115.

Figure 11:
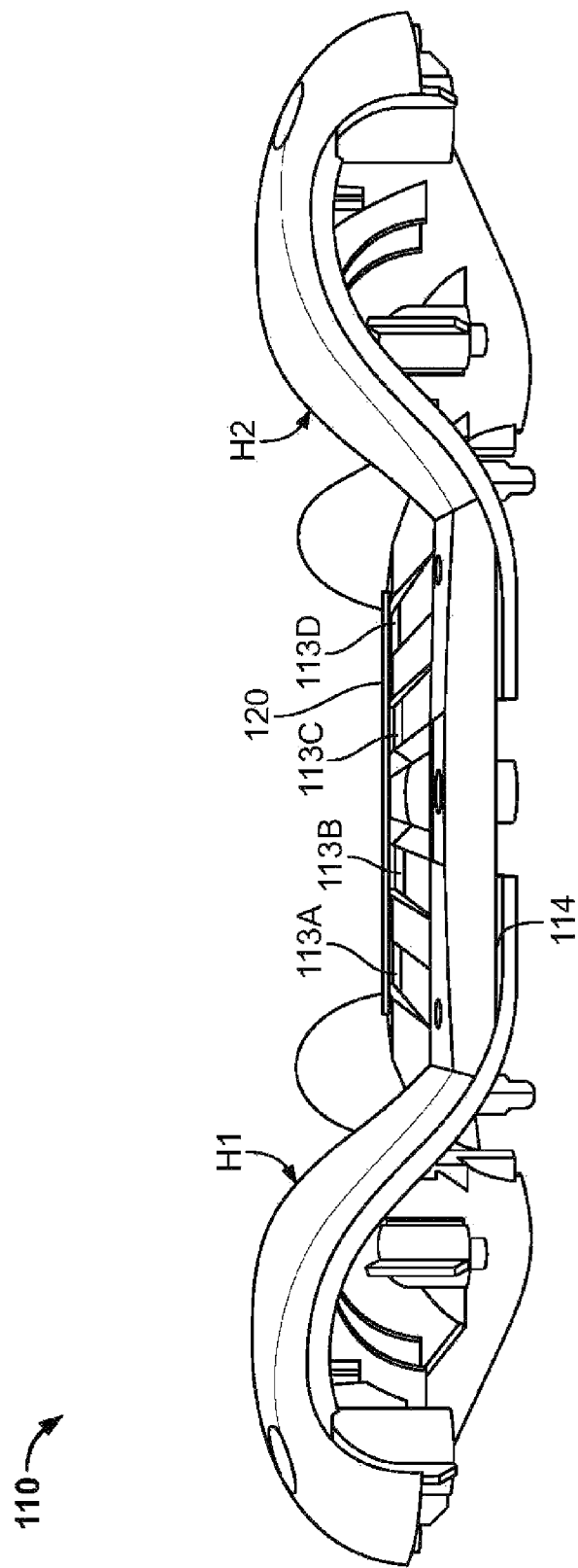
FIG. 11 is an end view of the rear panel of a games controller according to a second embodiment in which the paddles have been removed.

The cover portion 120, when secured over the channels 113A, 113B, 113C, 113D defined in the rear body panel 114 of the controller 110, forms four closed channels or conduits 119A, 119B, 119C, 119D into which a respective one of the paddles 111A, 111B, 111C, 111D is inserted, best illustrated in FIGS. 11 and 12. The conduits 119A, 119B, 119C, 119D surround an end portion of the paddle levers 111A, 111B, 111C, 111D providing increased support to the paddle levers 111A, 111B, 111C, 111D.

The paddle levers 111A, 111B, 111C, 111D are configured to be interchangeable or replaceable without the need to unscrew the fixing screws 115. The paddle levers 111A, 111B, 111C, 111D each comprise a second part 121A of a complementary locking means as shown in FIGS. 13 and 14. The second part 121A of the complementary locking means takes the form of a barb or catch and has an engaging edge 123A which interlocks with the aperture of first part 117A, 117B, 117C, 117D of the complementary locking means. The barb or catch is displaceable so as to be disengageable from the aperture by inserting a tool into the aperture and moving or pressing the barb or catch out of interlocking engagement with the aperture. Once the barb or catch has been sufficiently displaced the paddles 111A, 111B, 111C, 111D can be slid out of the conduit 119A, 119B, 119C, 119D. The paddles 111A, 111B, 111C, 111D can be inserted into the conduits 119A, 119B, 119C, 119D without the need for any tools. The paddles 111A, 111B, 111C, 111D can be pushed into the conduits 119A, 119B, 119C, 119D and in doing so the cover portion progressively engages with the barb or catch forcing it to be displaced within the paddles 111A, 111B, 111C, 111D. When the paddles 111A, 111B, 111C, 111D are inserted sufficiently that the barb or catch is aligned with the aperture, the inherent resilience of the barb or catch biases the barb or catch to return to its starting position such that the engaging edge of the barb or catch engages with an edge of the aperture thereby locking the paddles 111A, 111B, 111C, 111D within the conduits 119A, 119B, 119C, 119D.

FIG. 15 illustrates a side view of a paddle 211A according to a third embodiment. The paddle 211A comprises a lug or projection 224A. The projection 224A projects outwardly from a first surface 225A of the paddle 211A. The first surface 225A of the paddle 211A opposes a second surface 225B of the paddle 211A from which the barb or catch 221A projects. The paddle 211A according to the third embodiment may be employed with the rear body panel 114 of the controller 110 and the cover portion 120 of the second embodiment. In an alternative embodiment, the barb or catch 221A may be omitted and replaced with one or more apertures for receiving a screw 115. In such an embodiment, the paddle lever may be employed with the rear body panel 114 of the controller 110 of the first embodiment.

The lug or projection 224A provides an engaging surface 226A which is spaced from the first surface 225A of the paddle 211A. This lug or projection 224A is configured to be aligned with a switch mechanism 348, see FIG. 19. The engaging surface 226A is arranged to be disposed proximate the switch mechanism 348 such that when the paddle 211A is pressed, the engaging surface 226A contacts with the switch mechanism 348 and activates the switch mechanism 348. One advantage of providing the lug or projection 224A is that the switch mechanism 348 can be disposed in a recessed or flush position within the rear body panel 114 of the controller 110. There is no requirement for any part of the switch mechanism 348 to project from the rear body panel 114 of the controller 110. In this way the switch mechanism 348 is protected when the paddle 211A is detached from the controller 110. This allows a user to configure the controller with a desired number of paddles in the available positions provided on the controller 110. When the number of paddles employed is less than the number of available positions, those switch mechanisms 348 in the vacant positions are protected by the rear body panel 114 of the controller 110. It also reduces the likelihood of a user accidentally or inadvertently activating a switch mechanism 348 in a vacant position.

Figure 16:
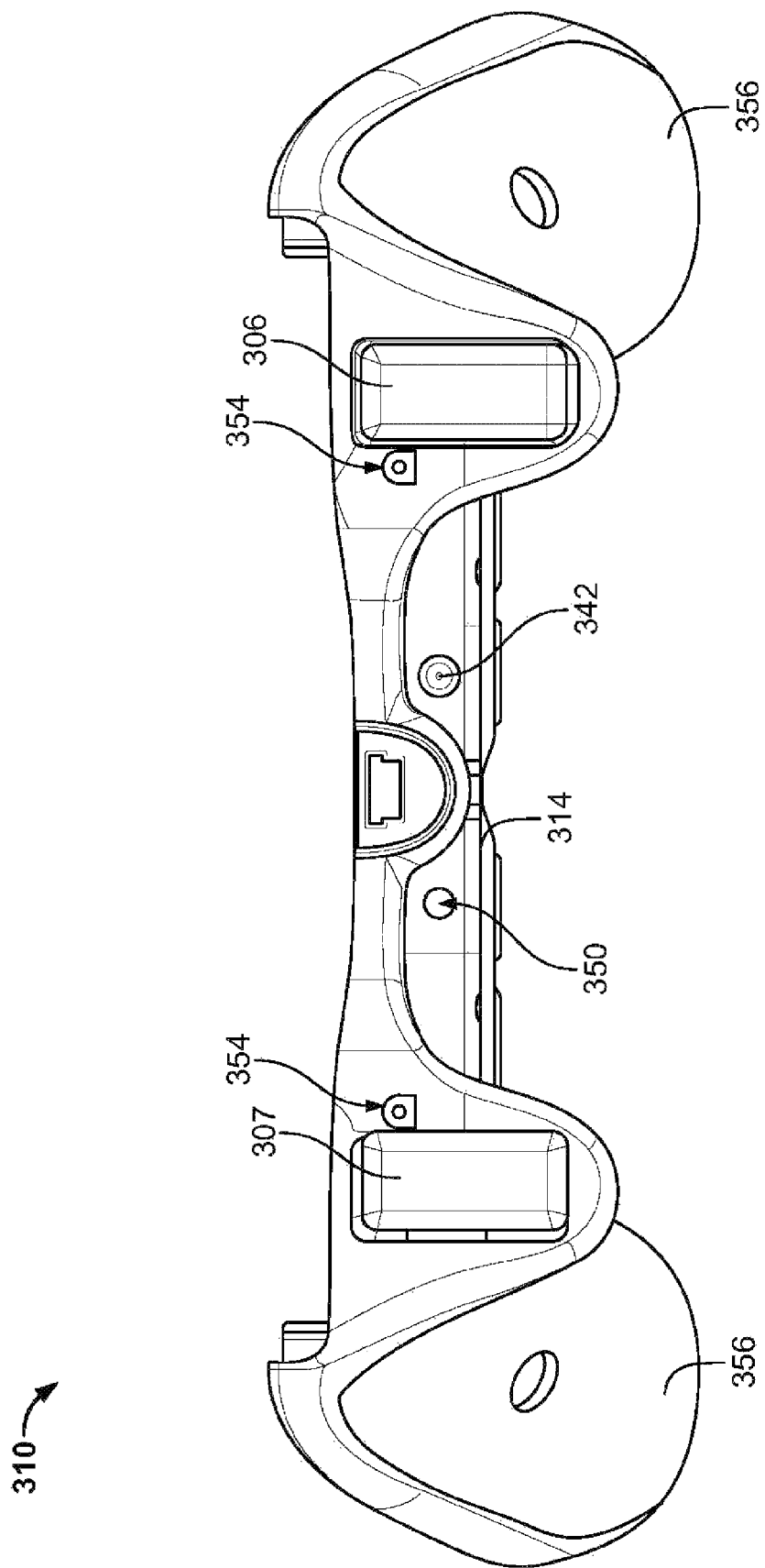
FIG. 16 is a front view of the rear panel of a games controller according to a fourth embodiment.
Figure 17:
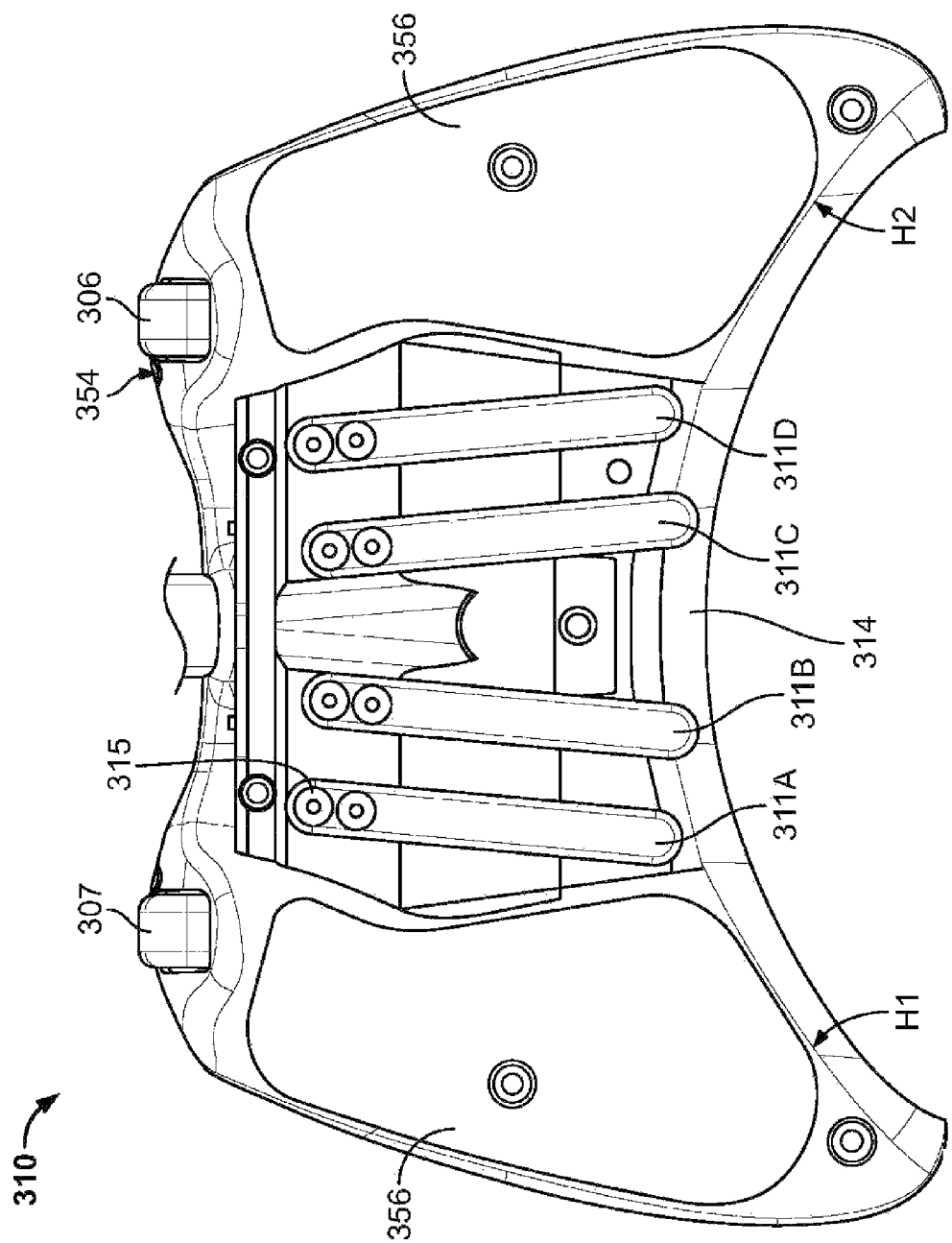
FIG. 17 is a plan view from below of the rear of a games console controller according to the fourth embodiment.
Figure 18:
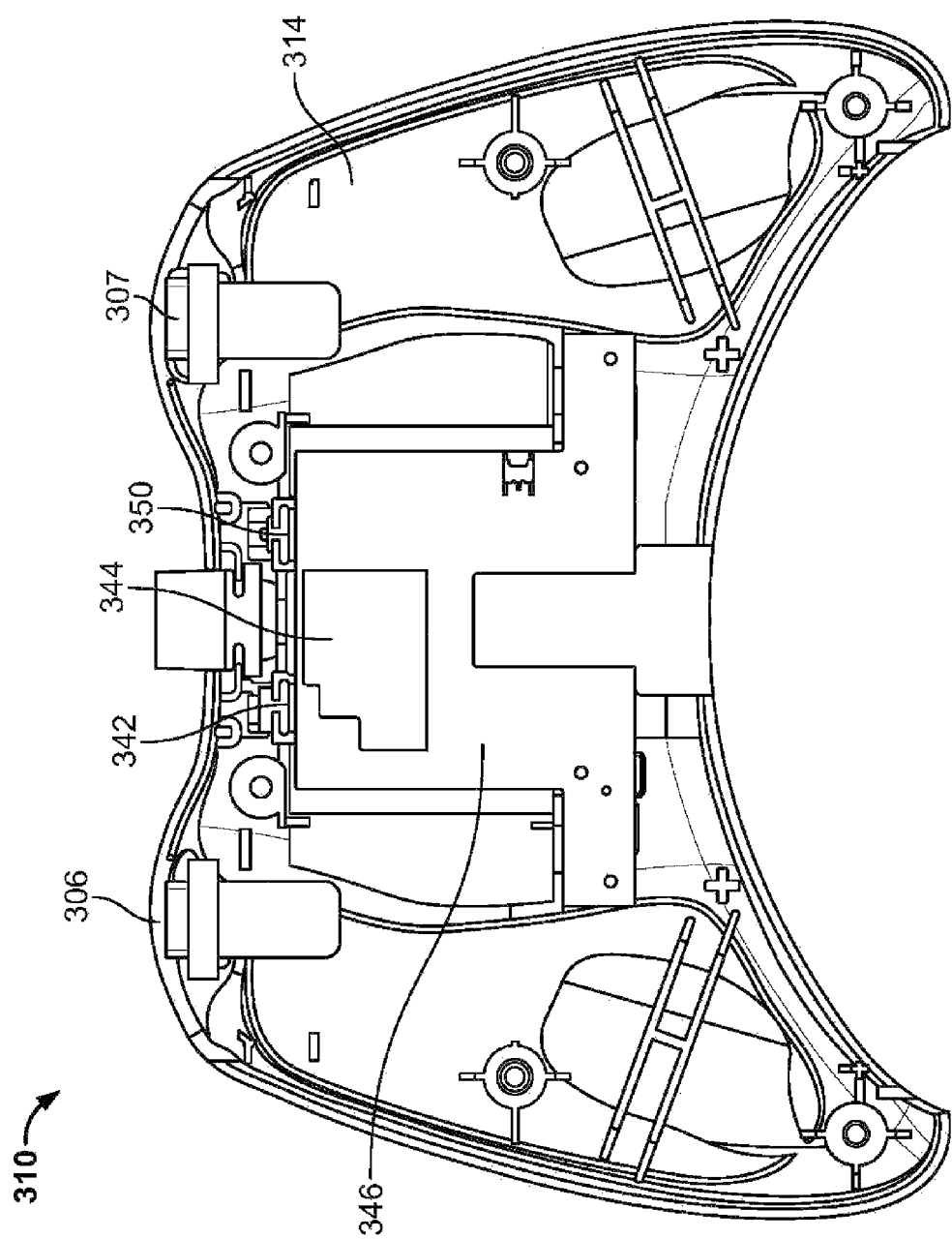
FIG. 18 is a plan view from above of the rear panel of a games controller according to the fourth embodiment.

FIGS. 16 to 18 show a back panel 314 for a games controller 310. The back panel 314 has a trigger adjustment mechanism 354 for adjusting the start and/or stop positions of the triggers 306, 307. The rear panel 314 also comprises a charging indicator in the form of a Light Emitting Diode (LED).

The rear panel 314 also comprises a remap device 344 in the form of an electronic circuit 346, best shown in FIG. 20, which includes an interface 342 or remap initiation device in the form of a remap switch to activate the remap device 344. The electronic circuit 346 also includes function switches having a switch mechanism 348 for replicating the function of one of the four buttons 4 located on the front of the controller 10, and thereby allowing a user to operate the functions of the relevant buttons using their middle fingers, without the need to remove either of their thumbs from the left or right thumb sticks 2, 3. In alternative embodiments function switches 348 may activate a new function not activated by the controls on the front of the controller 10.

The paddle levers 311A, 311B, 311C, 311D when pressed by the user engage with a respective one of the function switches 348, as illustrated in FIG. 19, to activate the respective function which has been programmed to correspond to that switch.

The remap device 344 can be activated or programmed by a user whist the controller is in use, for example in game play, by simultaneously pressing, for a predefined time period, the desired paddle 311A, 311B, 311C, 311D, hence activating the respective function switch 348, the remap switch 342 and the desired button 4 which the paddle 311A, 311B, 311C, 311D is to replicate. Upon release of all of the desired paddles 311A, 311B, 311C, 311D, remap switch 342 and desired button 4, the remap device will have configured the selected paddle 311A, 311B, 311C, 311D to replicate the function of the selected button 4. This is advantageous because the function of any paddle 311A, 311B, 311C, 311D can be changed, by the user, in gameplay and provides an instant remapping function.

The rear panel 314 also comprises a pair of over-grips 356. These over-grips 356 are separable from the rear panel 314. The handles H1, H2 can be customized by a user, for example to adjust the size, shape or appearance of the handles H1, H2. In this way the user can select a particular design, appearance, theme or color scheme for their controller and may change this at will. It also provides a replaceable grip that can be renewed when worn or damaged. The user can select an over-grip 356 having dimensions to suit the particular size of their hand. This may help reduce fatigue or strain to the user's hands or wrists from repeated or prolonged use. The material of the over-grip 356 may be different to that of the rear panel 314. For example, the rear panel 314 may be formed from a rigid plastics material, whereas the over-grip 356 may be formed from a softer, flexible or deformable material which may provide greater comfort to the user. The over-grip 356 may be formed from a material which increases the friction between the user's hands and the controller. This may help to reduce the force the user needs to apply to grasp the controller and hence reduce the likelihood of strain injuries and mitigate against fatigue.

Additionally or alternatively the over-grips 356 provide increased stability of the controller in the hands of the user enabling more accurate use of the controls of the controller, in particular the thumb sticks 2, 3.

Figure 21:
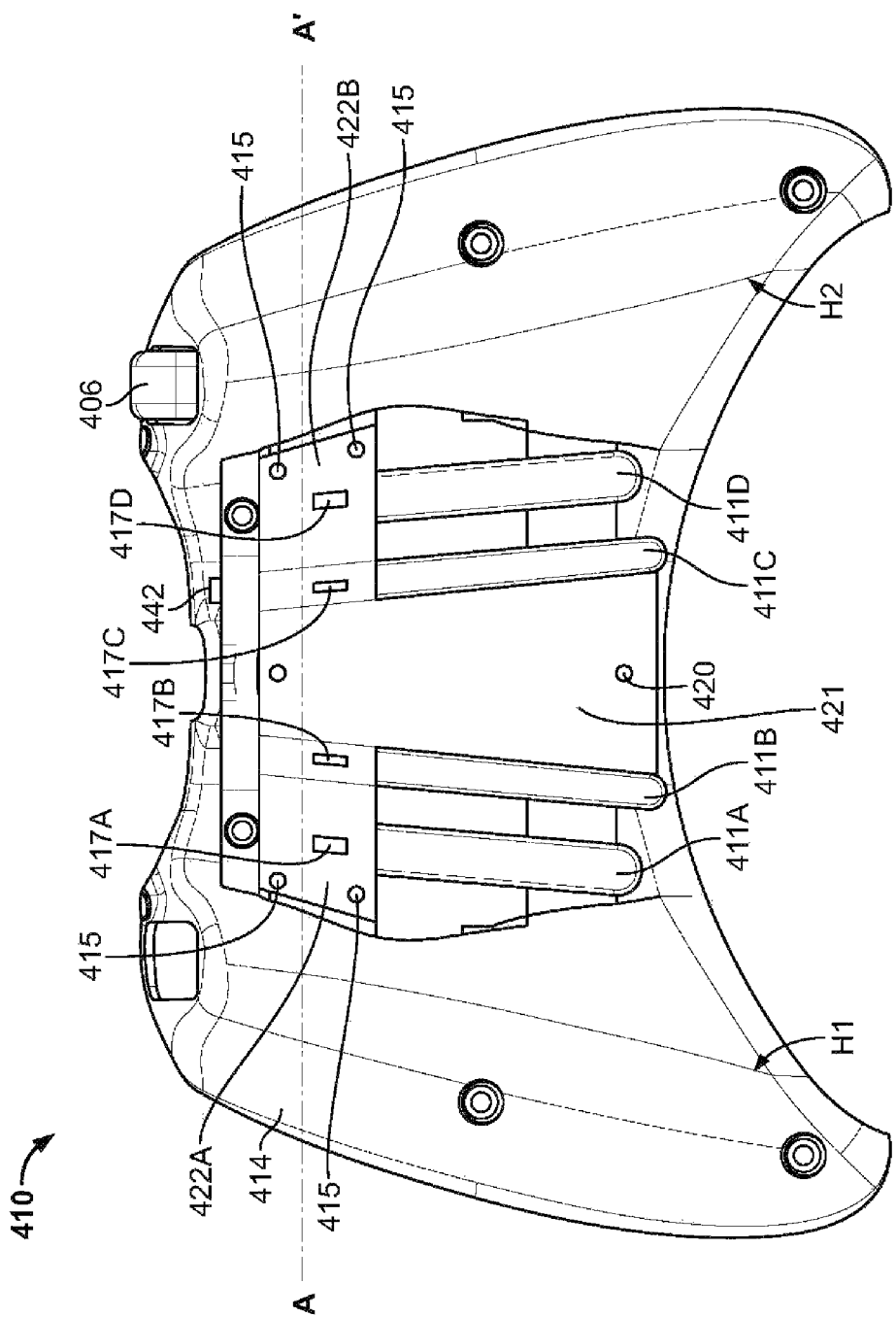
FIG. 21 is a plan view from below of the rear of a games console controller according to the fifth embodiment.
Figure 22:
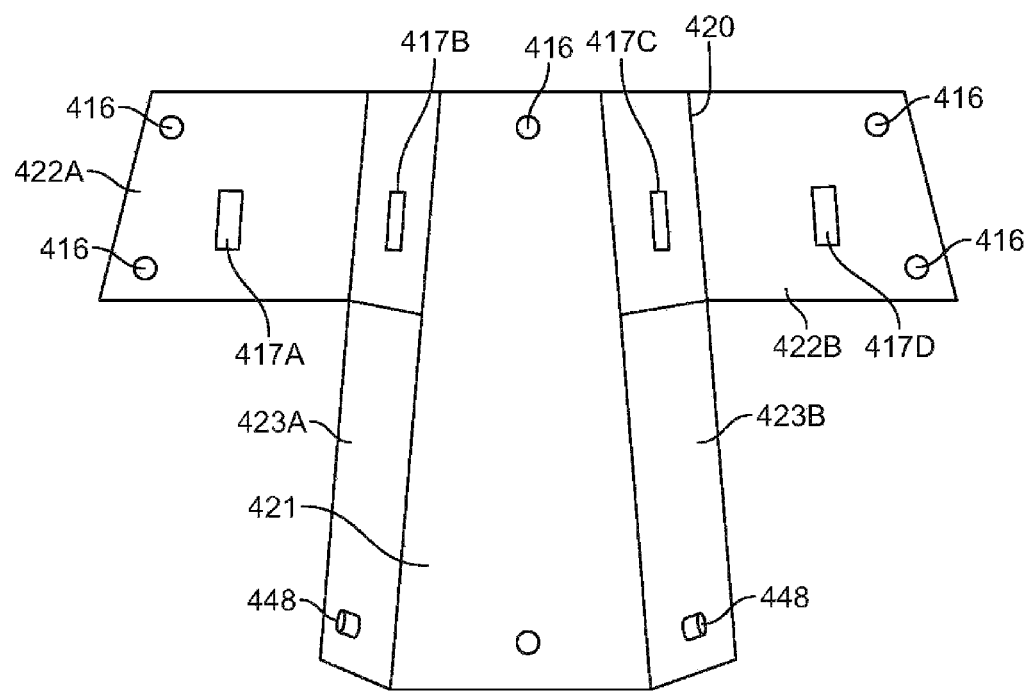
FIG. 22 is a schematic illustration of a component of the rear of a games console controller according to the fifth embodiment.
Figure 23:
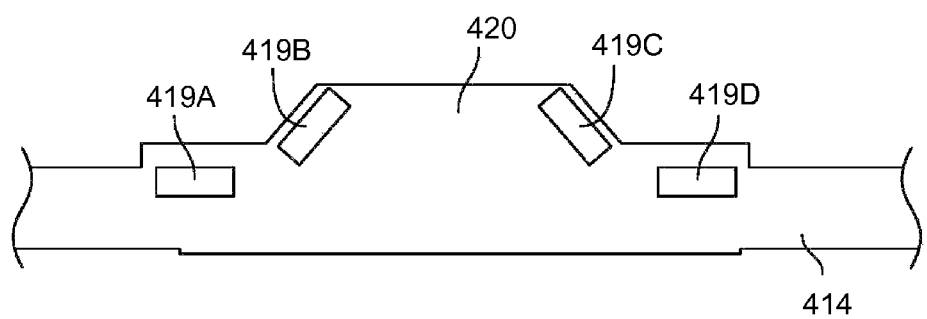
FIG. 23 is a rear end view of the rear panel of a games controller according to a fifth embodiment.
Figure 24:
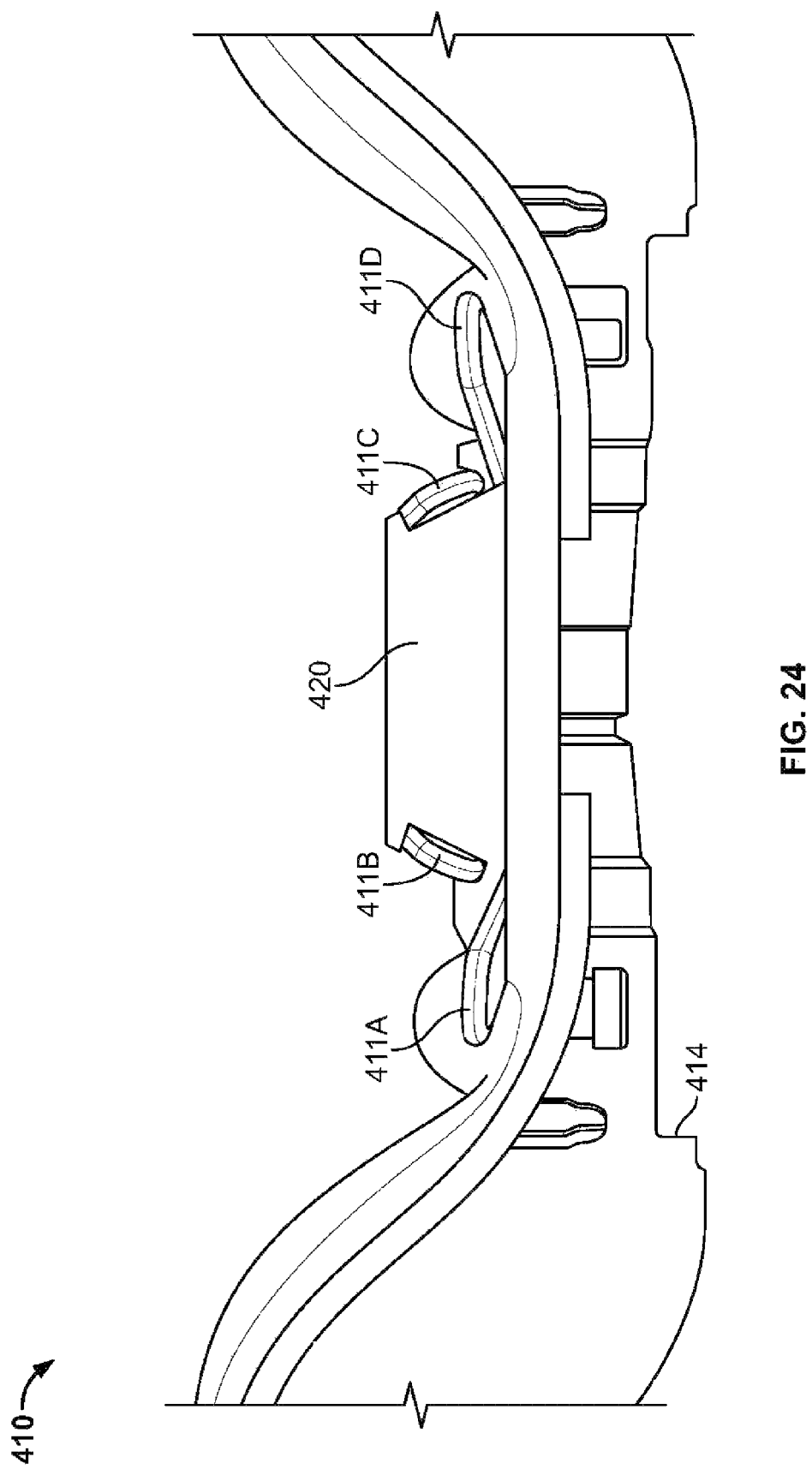
FIG. 24 is a view, taken along the line A-A' shown in FIG. 20 of a portion of the rear panel of a games controller according to a fifth embodiment in which the paddles have been removed.

FIGS. 21 to 24 illustrate a controller 410 according to a fifth embodiment. The controller 410 comprises four paddles 411A, 411B, 411C, 411D. The two outer paddles 411A, 411D are mounted substantially parallel to, or in substantially coplanar relationship with, the plane of the back panel 414. The two inner paddles 411B, 411C are mounted to the controller at an angle to the outer paddles 411A, 411D. In the illustrated embodiment, the two inner paddles 411B, 411C are mounted at an angle of approximately 45 degrees to the outer paddles 411A, 411D, although in other embodiments any angle between about 5 and 90 degrees is envisaged. The cover portion 420 is substantially "T" shaped when viewed in plan view from below, as shown in FIG. 21. The cover portion 420 comprises a central leg portion 421 disposed perpendicularly to the arm portions 422A, 422B. The inner paddles 411B, 411C are mounted on opposing sides of the central leg 421 of the cover portion 420. The central leg 421 includes function switches 448 mounted into each side wall 423A, 423B, as shown in FIG. 22.

The controller 410 may employ the paddles 111A, 111B, 111C, 111D; 211A, 211B, 211C, 211D according to either the second embodiment (FIG. 9) or third embodiment (FIG. 15). In other embodiments the paddles 411A, 411B, 411C, 411D may be fixed to the cover portion 420 by screws 415 in a similar fashion to the paddles 11A, 11B, 11C, 11D of the first embodiment.

Figure 25:
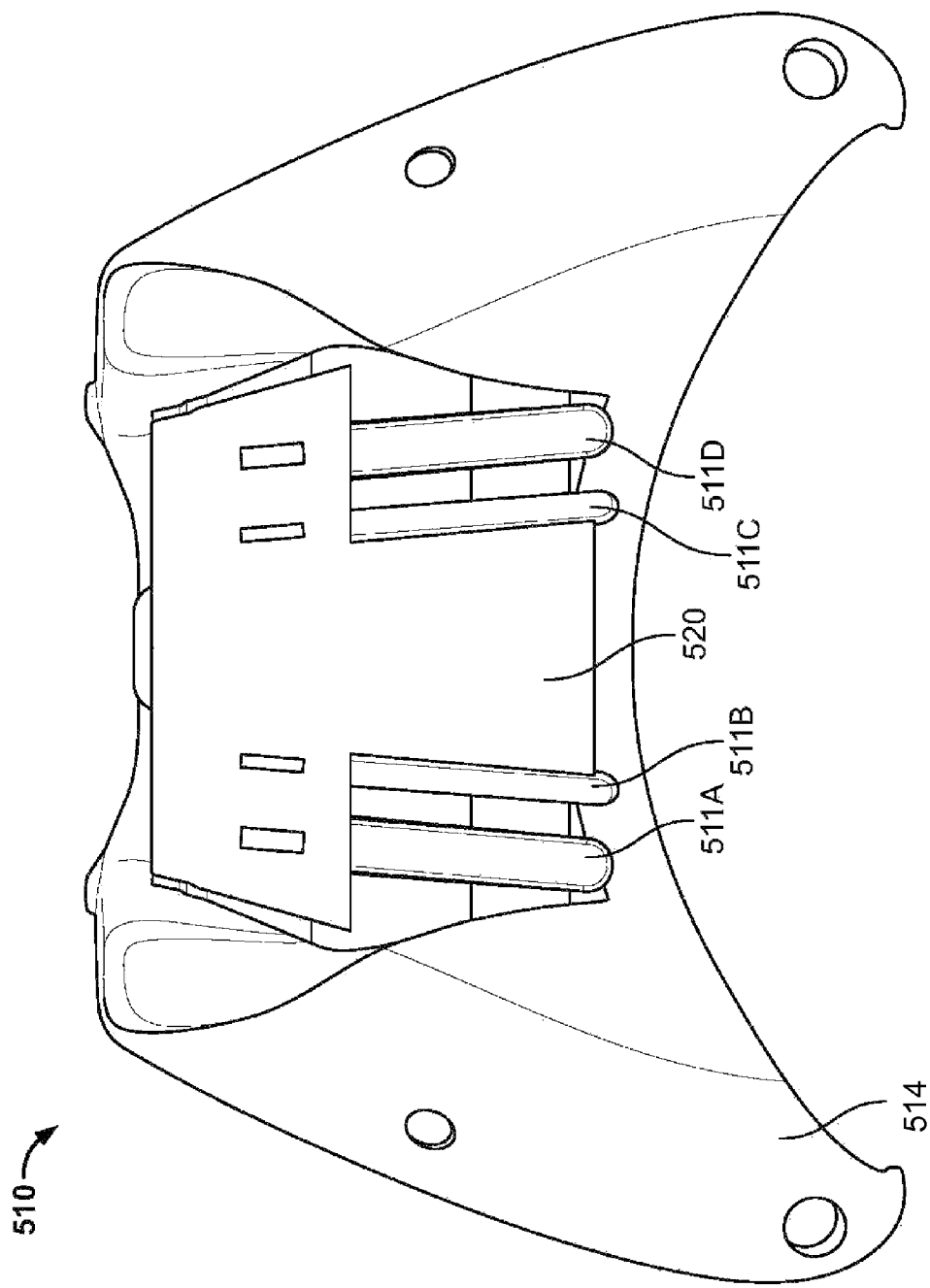
FIG. 25 is a plan view from below of the rear of a games console controller according to the sixth embodiment.

FIG. 25 illustrates a controller 510 according to a sixth embodiment. The controller 510 comprises four paddles 511A, 511B, 511C, 511D. The two outer paddles 511A, 511D are mounted substantially parallel to, or in a substantially coplanar relationship with, the plane of the back panel 514. The two inner paddles 511B, 511C are mounted to the controller at an angle to the outer paddles 511A, 511D. In the illustrated embodiment the two inner paddles 511B, 511C are mounted at an angle of approximately 45 degrees to the outer paddles 511A, 511D, although in other embodiments any angle between about 5 and 90 degrees is envisaged. The cover portion 520 has been integrally formed or molded with the rear panel 514. The paddles 511A, 511B, 511C, 511D are inserted into conduits or tunnels formed within the back panel 514. The conduits or tunnels may be formed in part from the back panel 514 and in part by an internal cover portion (not shown) secured to an inner surface of the back panel 514.

The paddle arrangement of the fourth and fifth embodiments is advantageous since a user may engage the inner paddles 411B, 411C; 511B, 511C and the outer paddles 411A, 411D; 511A, 511D with the same finger; the distance the user must move their finger between the outer paddle 411A, 411D; 511A, 511D and the adjacent inner paddle 411B, 411C; 511B, 511C is reduced. In some embodiments the user may not need to disengage their finger from the outer paddle 411A, 411D; 511A, 511D to engage the adjacent inner paddle 411B, 411C; 511B, 511C. The user may slide or roll their finger over the outer paddle 411A, 411D; 511A, 511D to engage the inner paddle 411B, 411C; 511B, 511C and activate the respective function switch 448, whilst maintaining contact with the adjacent outer paddle 411A, 411D; 511A, 511D.

Referring now to FIGS. 26 to 41C, there are shown further alternative embodiments of the present invention. In the further alternative illustrated embodiments, like numerals have, where possible, been used to denote like parts, albeit with the addition of the prefix "600", "700", "800" and so on to indicate that these features belong to the sixth, seventh, eighth, and so on embodiment respectively.

Figure 26:
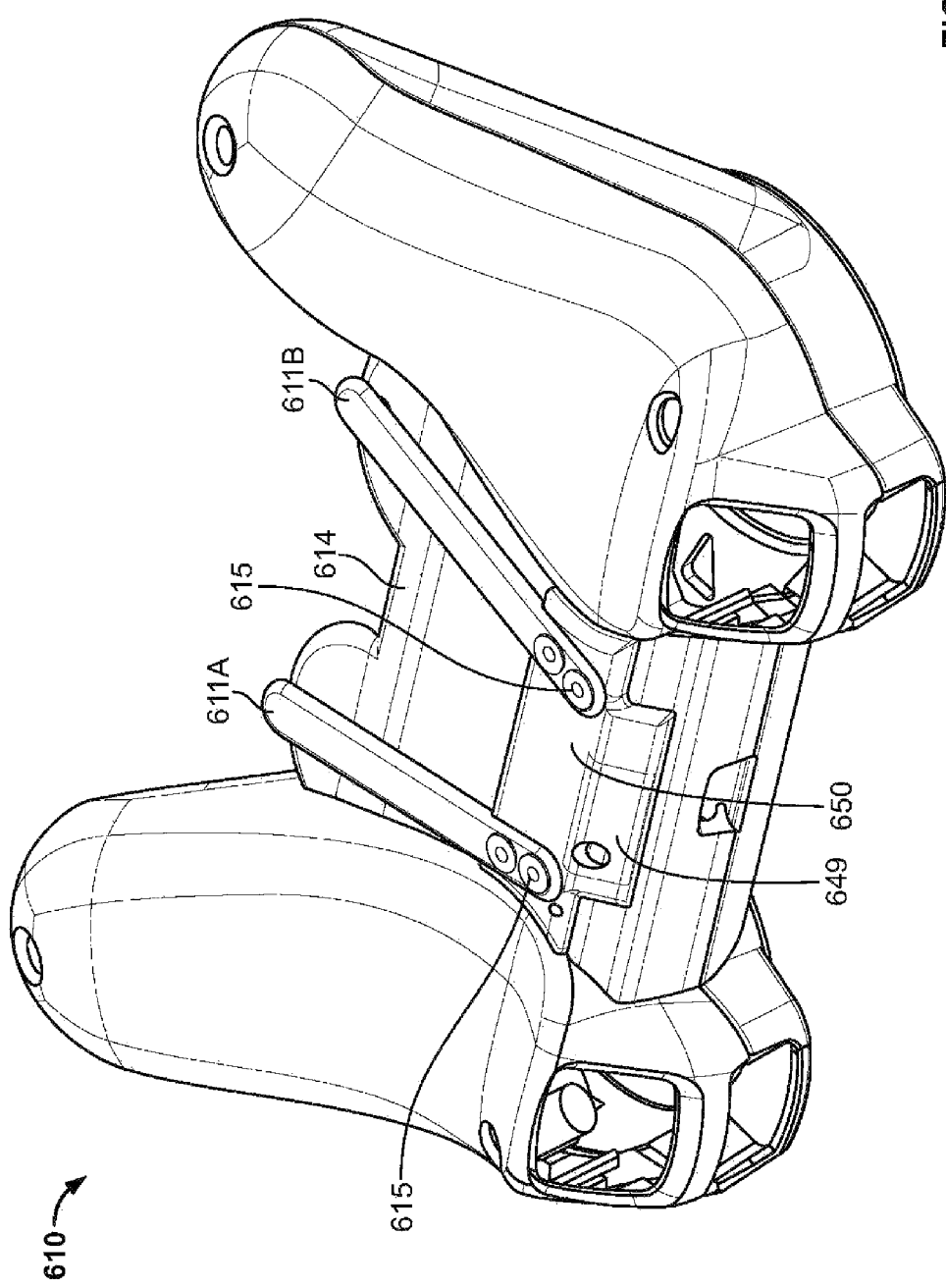
FIG. 26 is a perspective view from below of the rear of a games console controller according to the sixth embodiment.
Figure 27:
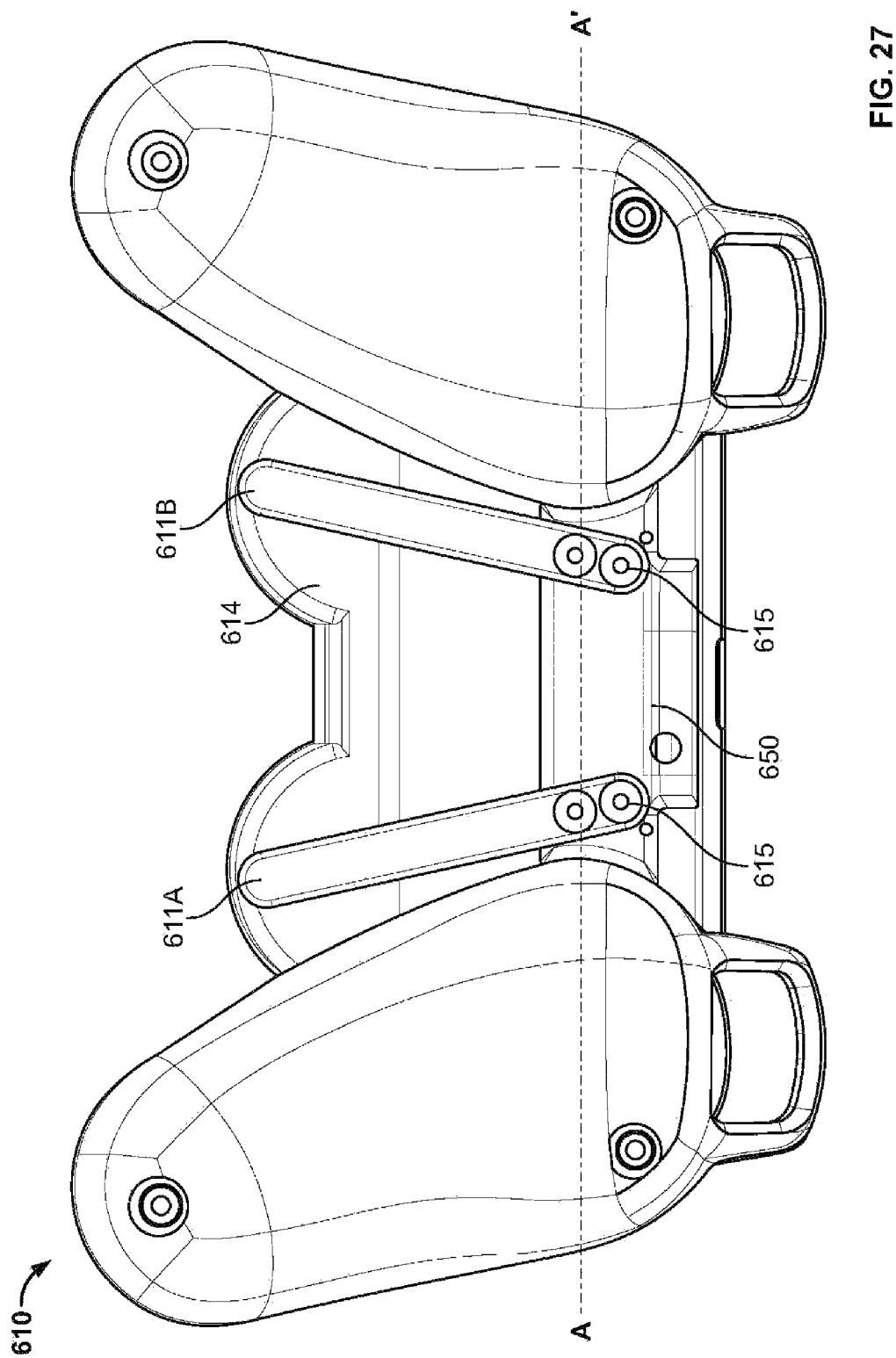
FIG. 27 is a plan view from below of the rear of a games console of FIG. 26.
Figure 28:
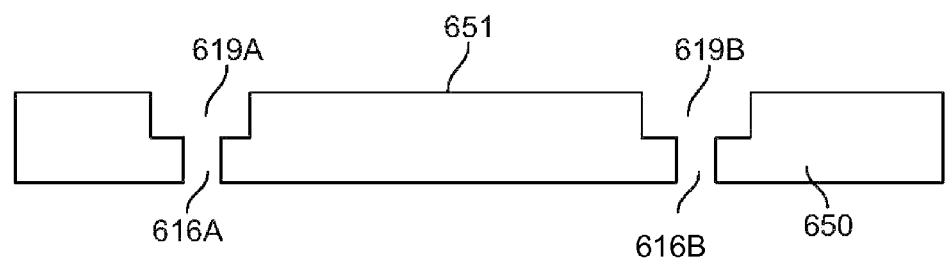
FIG. 28 is a view, taken along the line A-A' shown in FIG. 26, of a saddle for the rear panel of the games controller of FIG. 26.

FIGS. 26 to 28 illustrate a controller 610 according to a sixth embodiment. The controller 610 comprises two paddles 611A, 611B. The two paddles 611A, 611B are mounted substantially parallel to the plane of the back panel 614. The controller 610 comprises a mounting plate or saddle 650 for mounting the two paddles 611A, 611B to the back panel 614 of the controller 610. Each paddle 611A, 611B is disposed in overlying relationship with a switch, preferably a microswitch, and is arranged such that a force can be applied to the paddle 611A, 611B to activate the switch disposed therebelow. The mounting plate 650 comprises a pair of channels or recesses in the outer surface. The channels or recesses 619A, 619B are shaped complementarily to the paddles 611A, 611B. Each paddle 611A, 611B is received in a respective one of the channels 619A, 619B. Each paddle 611A, 611B comprises a pair of apertures disposed approximate one end. Each channel 619A, 619B comprises a pair of apertures 616A, 616B. The apertures 616A, 616B in the channels 619A, 619B are arranged so as to be in vertical alignment with the apertures in the respective one of the paddles 611A, 611B. Fixing members 615, preferably screws, are inserted through each aperture of the paddles 611A, 611B and pass through the respective aperture in the channels of the mounting plate 650. The fixing members 615 are received in the back panel 614 of the controller 610. In this way the mounting plate 650 and the paddles 611A, 611B are affixed to the controller 610. The mounting plate 650 optionally comprises a tongue portion 649 which is formed so as to be complementary in shape to the back panel 614 of the controller 610; the tongue portion 649 is molded integrally with the mounting plate 650 and wraps about an edge or corner of the back panel 614 of the controller 610. In this way the tongue portion 649 further increases the stability of the mounting plate 650. The tongue portion 649 also serves to facilitate alignment of the mounting plate 650 with the back panel 614 of the controller 610 when assembling the controller 610. Side edges of the mounting plate 650 may be shaped complementarily to handles or grip portions H1, H2 of the controller, further increasing stability and aiding alignment of the mounting plate 650.

Figure 29:
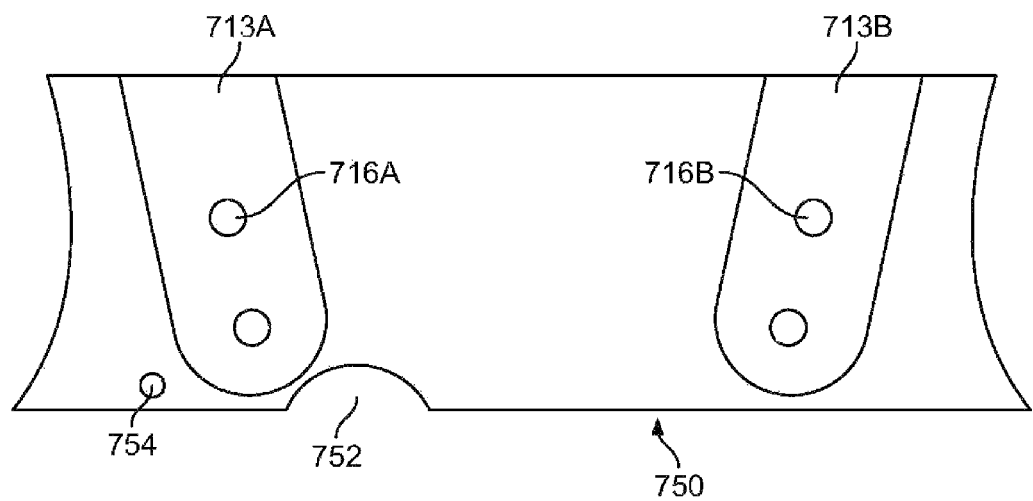
FIG. 29 is a plan view from below of a saddle for a games console controller according to a seventh embodiment.
Figure 30:
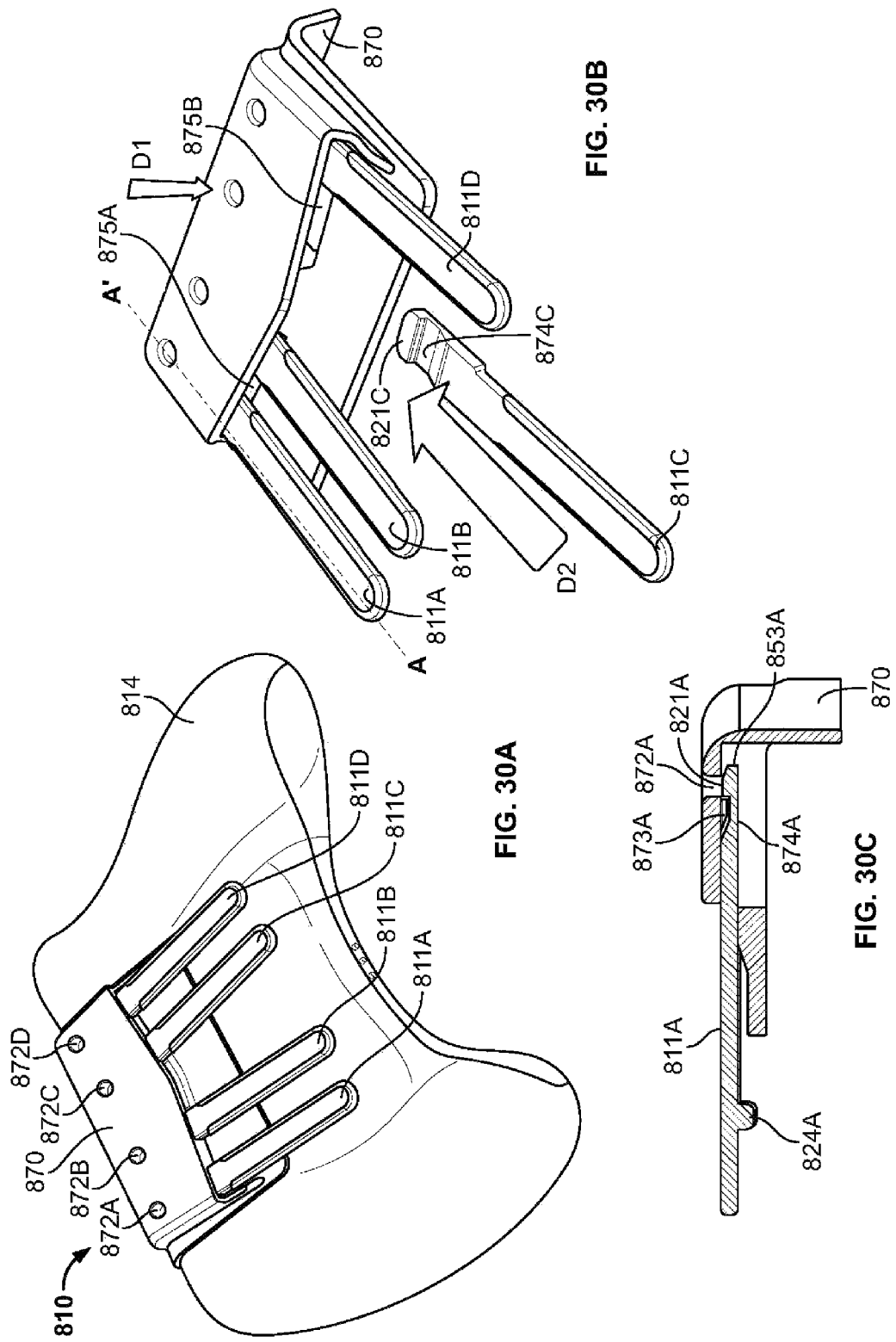
FIG. 30A is a perspective view from below of the rear of a games console controller according to an eighth embodiment.
FIG. 30B is a perspective view from below of a manifold and paddles for the rear of the games console controller of FIG. 30A.
FIG. 30C is a view, taken along the line A-A' shown in FIG. 30B, of the manifold and a paddle for the rear of the games console controller of FIG. 30A.
Figure 31:
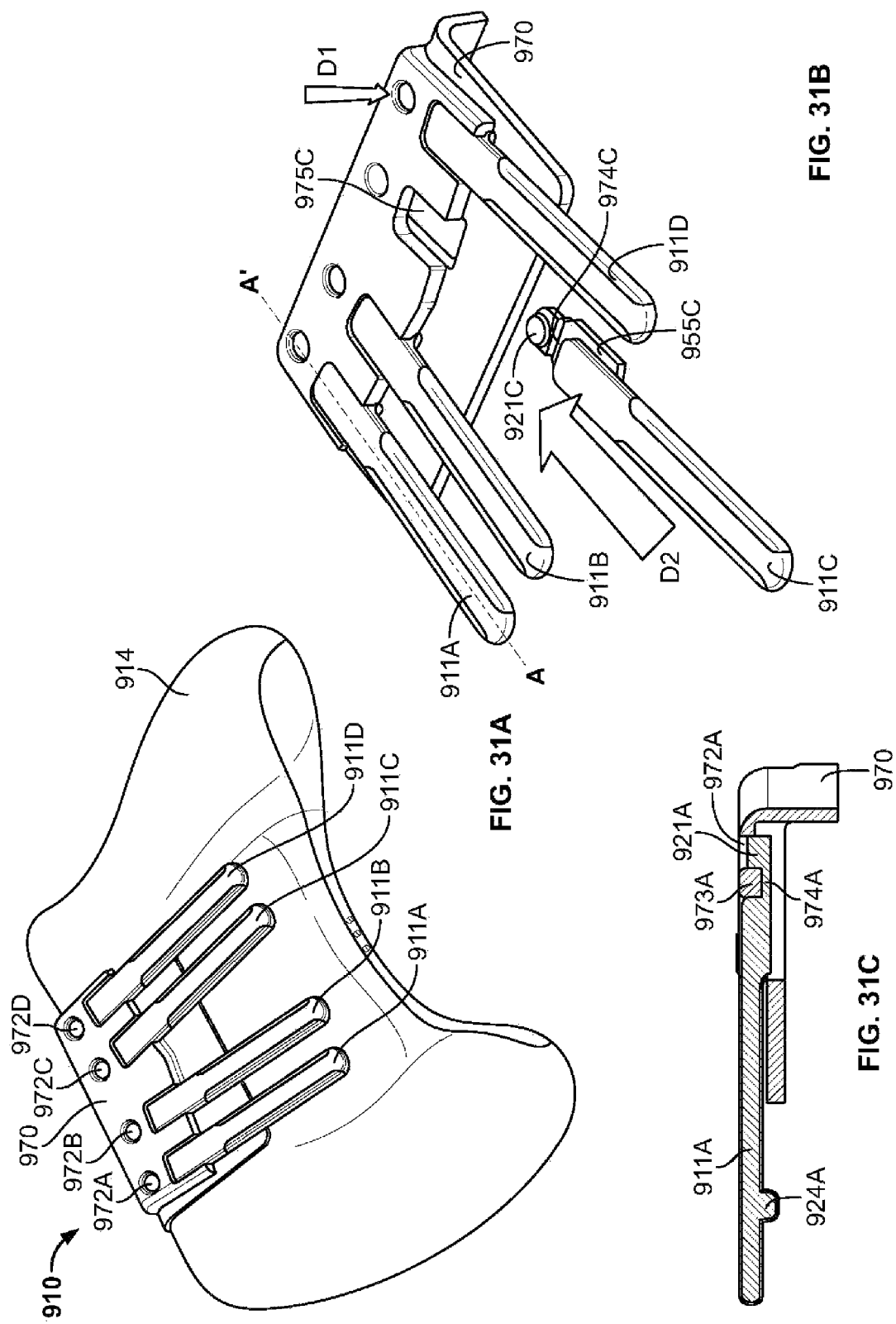
FIG. 31A is a perspective view from below of the rear of a games console controller according to a ninth embodiment.
FIG. 31B is a perspective view from below of a manifold and paddles for the rear of the games console controller of FIG. 31A.
FIG. 31C is a view, taken along the line A-A' shown in FIG. 31B, of the manifold and a paddle for the rear of the games console controller of FIG. 31A.
Figure 32:
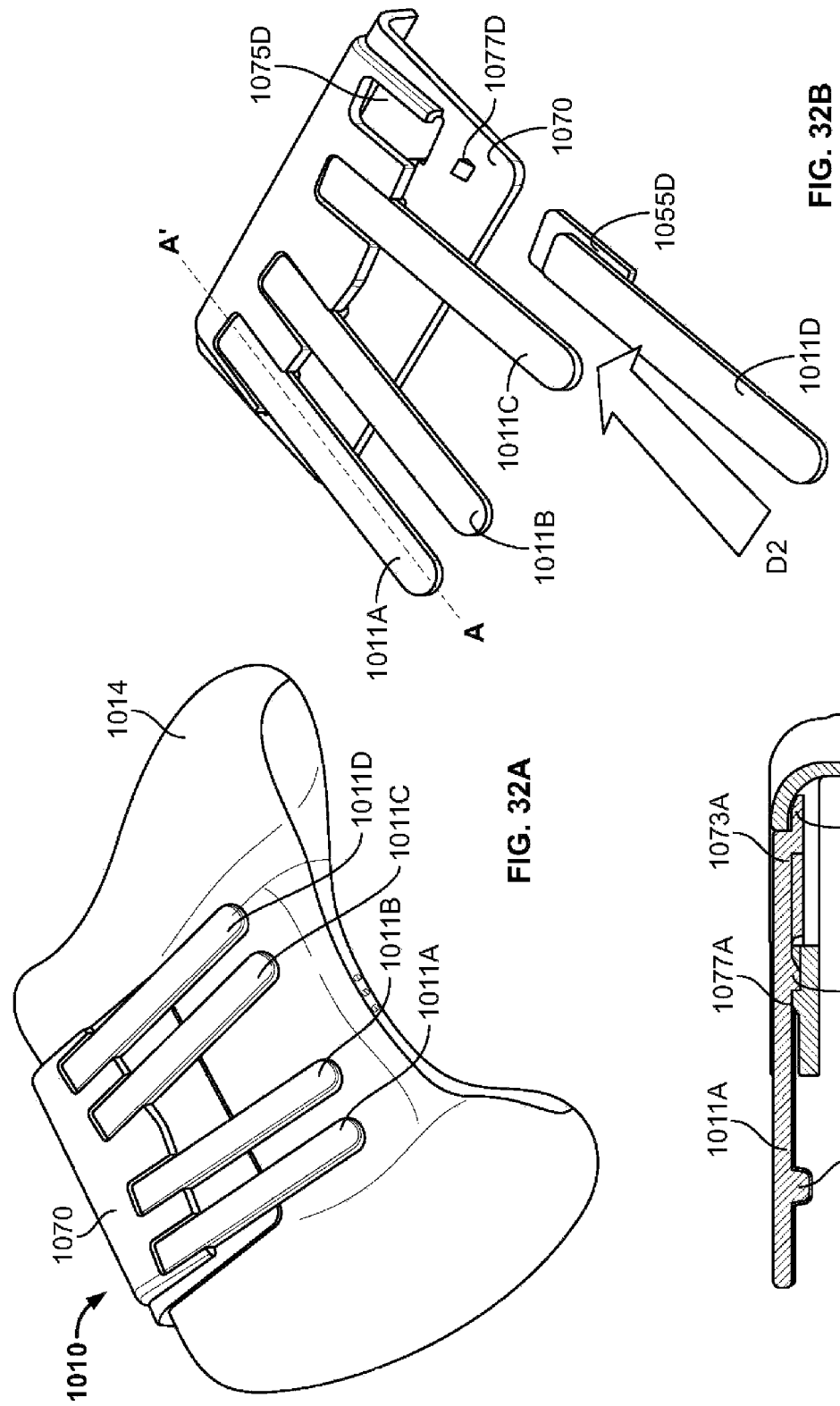
FIG. 32A is a perspective view from below of the rear of a games console controller according to a tenth embodiment.
FIG. 32B is a perspective view from below of a manifold and paddles for the rear of the games console controller of FIG. 32A.
FIG. 32C is a view, taken along the line A-A' shown in FIG. 32B, of the manifold and a paddle for the rear of the games console controller of FIG. 32A.

FIG. 29 illustrates a mounting plate 750 for a controller according to a seventh embodiment. The seventh embodiment shares many common features with the sixth embodiment and therefore only the differences from the embodiment illustrated in FIGS. 26 to 28 will be described in any greater detail. The tongue portion has been omitted from the mounting plate 750. The mounting plate 750 comprises a first aperture 754. First aperture 754 is configured so as to allow access to a button provided in the back panel of the controller. The button may provide the user with functionality such as resetting or restarting the controller. The mounting plate 750 comprises a cutaway 752. The cutaway 752 facilitates access to a fixing member or screw which secures the back panel 614 of the controller 610 to a chassis or front panel of the controller.

FIGS. 30A to 30C illustrate a controller 810 according to an eighth embodiment. The eighth embodiment shares many common features with the previous embodiments and therefore only the differences from the embodiments illustrated in FIGS. 1 to 29 will be described in any greater detail. The controller 810 comprises four paddles 811A, 811B, 811C, 811D. The four paddles 811A, 811B, 811C, 811D are mounted substantially parallel to the plane of the back panel 814. The controller 810 comprises a detachable mounting plate or saddle 870 for mounting the four paddles 811A, 811B, 811C, 811D to the back panel 814 of the controller 810. Each paddle 811A, 811B, 811C, 811D is disposed in overlying relationship with a switch, preferably a microswitch, and is arranged such that a force can be applied to the paddles 811A, 811B, 811C, 811D to activate the switch disposed therebelow. The detachable mounting plate 870 comprises two conduits 875A, 875B. Each of the conduits 875A, 875B receives a pair of paddles 811A/811B; 811C/811D. Each of the paddles 811A, 811B, 811C, 811D comprises a tapered leading end 872A, see FIG. 30A. The tapered leading end 872A facilitates insertion of the paddles 811A, 811B, 811C, 811D into the conduits 875A, 875B as indicated by direction arrow D2. Each of the paddles 811A, 811B, 811C, 811D comprises a recess or cutaway 874A in an upper surface thereof. Each of the paddles 811A, 811B, 811C, 811D comprises a catch 821A, 821C adjacent to the recess or cutaway 874A. The recess or cutaway 874A, 874C and the catch 821A, 821C define a transition therebetween. The transition forms a first engaging edge.

Each of the conduits 875A, 875B comprises a pair of projections or detents 873A. The projections 873A are provided inside the conduits 875A, 875B, and preferably project downwards from a ceiling of the conduits 875A, 875B. The projections or detents 873A comprise a second engaging edge. The second engaging edge of the conduits 875A, 875B cooperates with the first engaging edge of one of the paddles 811A, 811B, 811C, 811D to lock the respective paddle 811A, 811B, 811C, 811D within the conduit 875A, 875B. The floor of each conduit 875A, 875B is cut away or recessed such that the end portion of each paddle can be pressed downwardly so as to disengage the first engaging edge of the paddles 811A, 811B, 811C, 811D from the second engaging edge of the projections or detents 873A in the conduits 875A, 875B. The detachable mounting plate 870 comprises four release apertures 872A, 872B, 872C, 872D. Each release aperture 872A, 872B, 872C, 872D is configured so as to be disposed over a respective one of the paddles 811A, 811B, 811C, 811D. A user can insert a tool into the release apertures 872A, 872B, 872C, 872D to apply a force, as indicated by direction arrow D1, against the paddles 811A, 811B, 811C, 811D disposed therebelow. In this way the first engaging edge of the paddles 811A, 811B, 811C, 811D is disengaged from the second engaging edge of the projections or detents 873A. The paddles 811A, 811B, 811C, 811D can be removed by pulling the paddles 811A, 811B, 811C, 811D in a direction opposite to that indicated by direction arrow D2.

The conduits 875A, 875B may comprise guide members in the form of a pair of rails or a recess, wherein each guide member engages the lateral edges of a respective one of the paddles 811A, 811B, 811C, 811D. In some embodiments part of the guide member for each paddle 811A, 811B, 811C, 811D may be provided by a side wall of one of the pair of conduits 875A, 875B.

The paddles 811A, 811B, 811C, 811D comprise a lug or projection 824A.

The detachable mounting plate 870 is detachably coupled to the back panel 814 of the controller 810 by one or more detents or latches (not shown). In some embodiments the detachable mounting plate 870 covers or protects a void in the controller 810; preferably a power source such as a battery is provided in the void. The detachable mounting plate 870 may be detached from the controller 810 for insertion or removal of the paddles 811A, 811B, 811C, 811D. Alternatively, insertion or removal of the paddles 811A, 811B, 811C, 811D may be carried out with the detachable mounting plate 870 mounted to the back panel 814 of the controller 810.

It is envisaged that the detachable mounting plate 870 may be retrofitted to a controller 810 in place of a battery cover panel (not shown) which mates with the back panel 814 of the controller 810.

FIGS. 31A to 31C illustrate a controller 910 according to a ninth embodiment. The ninth embodiment shares many common features with the previous embodiments and therefore only the differences from the embodiments illustrated in FIGS. 1 to 29 will be described in any greater detail. The controller 910 comprises four paddles 911A, 911B, 911C, 911D. The four paddles 911A, 911B, 911C, 911D are mounted substantially parallel to the plane of the back panel 914. The controller 910 comprises a detachable mounting plate or saddle 970 for mounting the four paddles 911A, 911B, 911C, 911D to the back panel 914 of the controller 910. Each paddle 911A, 911B, 911C, 911D is disposed in overlying relationship with a switch, preferably a microswitch, and is arranged such that a force can be applied to the paddle 911A, 911B, 911C, 911D to activate the switch disposed therebelow. The detachable mounting plate 970 comprises four conduits 975C. Each of the conduits 975C receives a respective one of the paddles 911A, 911B, 911C, 911D. Each paddle 911A, 911B, 911C, 911D comprises a laterally projecting guide member 955C projecting from opposing sides thereof. The laterally projecting guide members 955C of each paddle 911A, 911B, 911C, 911D are received by the respective one of the four conduits 975C. Each of the laterally projecting guide members 955C of each paddle 911A, 911B, 911C, 911D is disposed below a portion of the respective one of the four conduits 975C. The laterally projecting guide members 955C ensure the catches 921A of the paddles 911A, 911B, 911C, 911D are secure within the detachable mounting plate 970.

FIGS. 32A to 32C illustrate a controller 1010 according to a tenth embodiment. The controller 1010 comprises four paddles 1011A, 1011B, 1011C, 1011D. The four paddles 1011A, 1011B, 1011C, 1011D are mounted substantially parallel to the plane of the back panel 1014. The controller 1010 comprises a detachable mounting plate or saddle 1070 for mounting the four paddles 1011A, 1011B, 1011C, 1011D to the back panel 1014 of the controller 1010. Each paddle 1011A, 1011B, 1011C, 1011D is disposed in overlying relationship with a switch, preferably a microswitch, and is arranged such that a force can be applied to the paddles 1011A, 1011B, 1011C, 1011D to activate the switch disposed therebelow. The detachable mounting plate 1070 comprises four conduits 1075D. Each of the conduits 1075D receives a respective one of the paddles 1011A, 1011B, 1011C, 1011D. Each paddle 1011A, 1011B, 1011C, 1011D comprises a laterally projecting guide member 1055C projecting from opposing sides thereof. The laterally projecting guide members 1055C of each paddle 1011A, 1011B, 1011C, 1011D are received by the respective one of the four conduits 1075D. Each of the laterally projecting guide members 1055C of each paddle 1011A, 1011B, 1011C, 1011D is disposed below a portion of the respective one of the four conduits 1075D. Each paddle 1011A, 1011B, 1011C, 1011D comprises a first catch or detent 1076A, see FIG. 32C, mounted to a lower surface thereof. The detachable mounting plate 1070 comprises a second catch or detent 1077A, 1077D mounted to an upper surface thereof. The first catch or detent 1076A mates with the second catch or detent 1077A, 1077D to lock each paddle 1011A, 1011B, 1011C, 1011D into the respective one of the four conduits 1075D.

Figure 33:
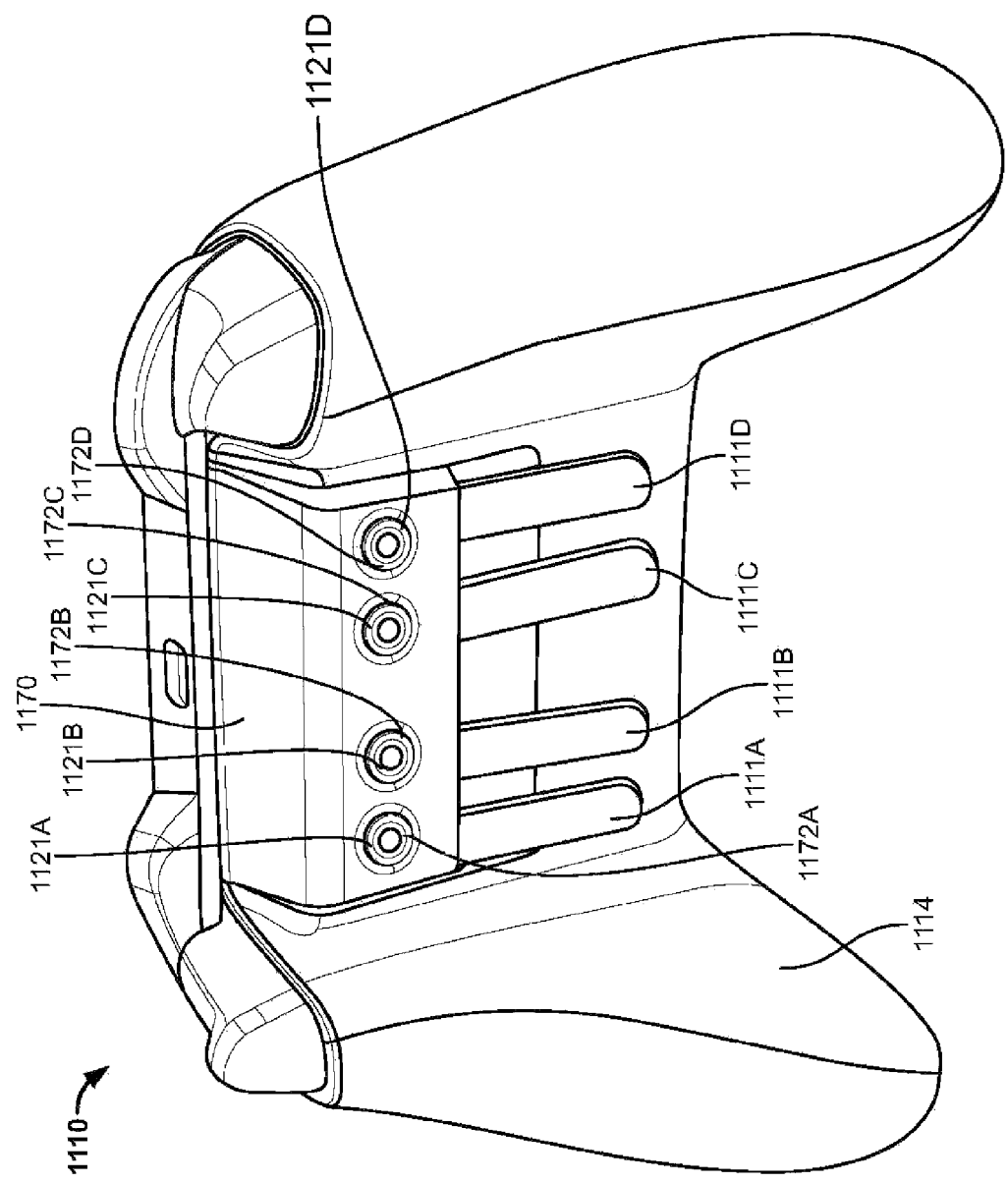
FIG. 33 is a perspective view from below of the rear of a games console controller according to an eleventh embodiment.

FIG. 33 illustrates a controller 1110 according to an eleventh embodiment. The controller 1110 comprises four paddles 1111A, 1111B, 1111C, 1111D. The four paddles 1111A, 1111B, 1111C, 1111D are mounted substantially parallel to the plane of the back panel 1114. The controller 1110 comprises a detachable mounting plate or saddle 1170 for mounting the four paddles 1111A, 1111B, 1111C, 1111D to the back panel 1114 of the controller 1110. Each paddle 1111A, 1111B, 1111C, 1111D is disposed in overlying relationship with a switch, preferably a microswitch, and is arranged such that a force can be applied to the paddle 1111A, 1111B, 1111C, 1111D to activate the switch disposed therebelow. The detachable mounting plate 1170 comprises four conduits. Each of the conduits receives a respective one of the paddles 1111A, 1111B, 1111C, 1111D. The detachable mounting plate 1170 comprises four release apertures 1172A, 1172B, 1172C, 1172D. Each release aperture 1172A, 1172B, 1172C, 1172D is configured so as to be disposed over a respective one of the paddles 1111A, 1111B, 1111C, 1111D. Each release aperture 1172A, 1172B, 1172C, 1172D receives a catch 1121A, 1121B, 1121C, 1121D of a respective one of the paddles 1111A, 1111B, 1111C, 1111D. The catches 1121A, 1121B, 1121C, 1121D form a button which may be pressed by a user with their finger to disengage the catches 1121A, 1121B, 1121C, 1121D from the release apertures 1172A, 1172B, 1172C, 1172D.

Figure 34A:
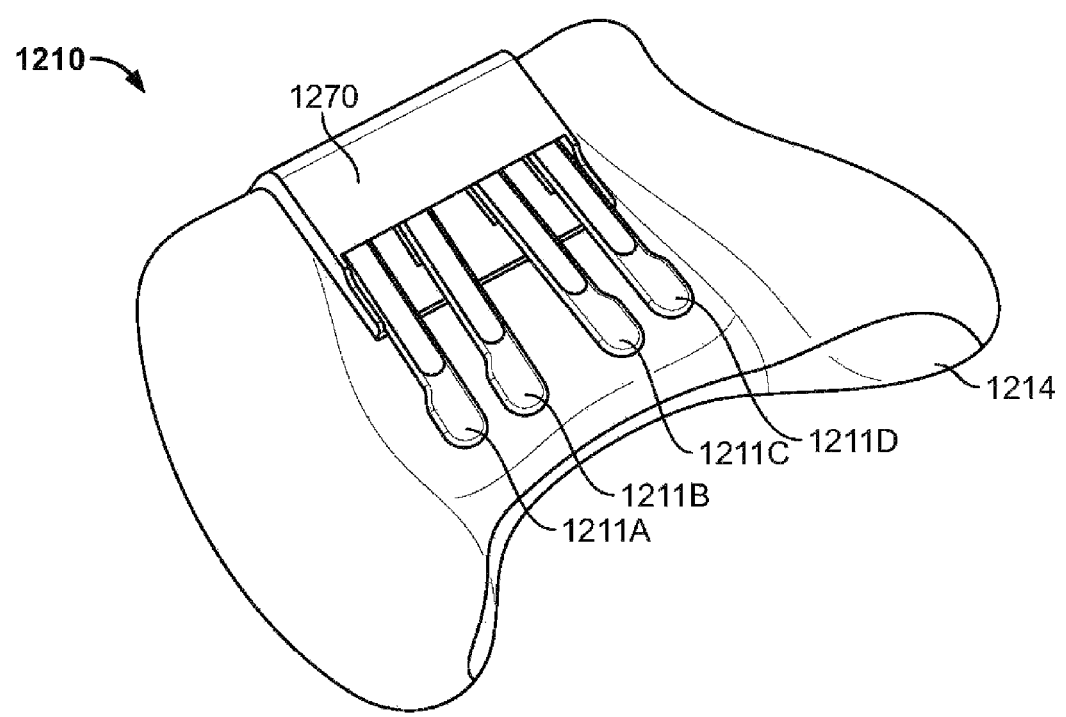
FIG. 34A is a perspective view from below of the rear of a games console controller according to a twelfth embodiment.
Figure 34B:
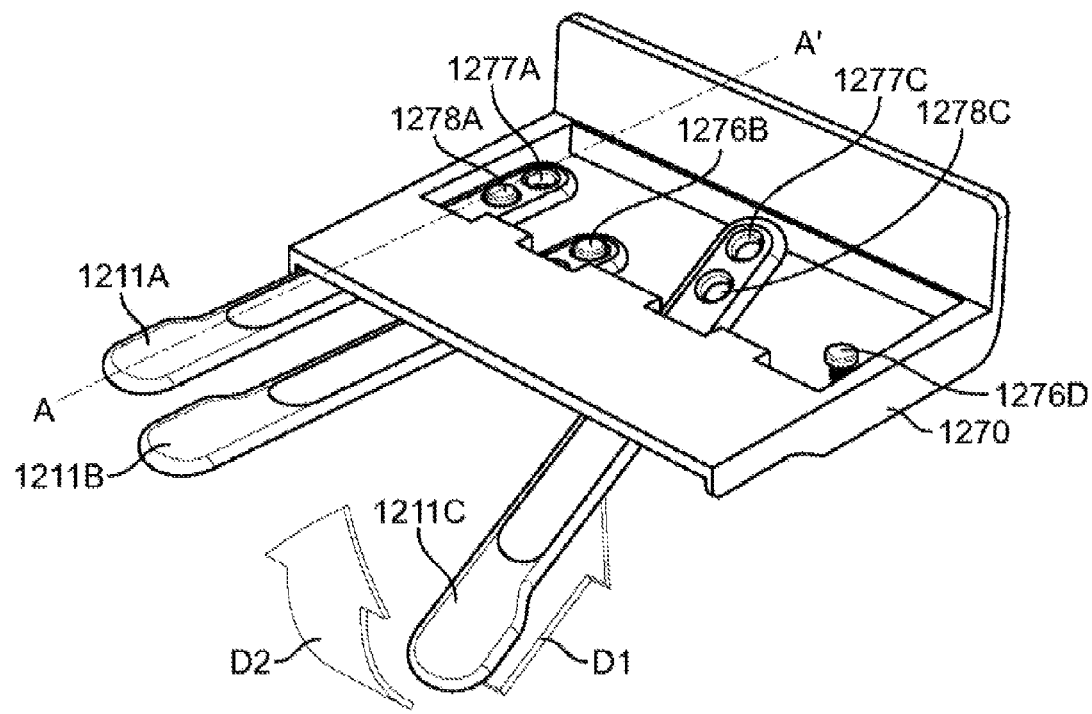
FIG. 34B is a perspective view from below of a manifold and paddles for the rear of the games console controller of FIG. 34A.
Figure 34C:
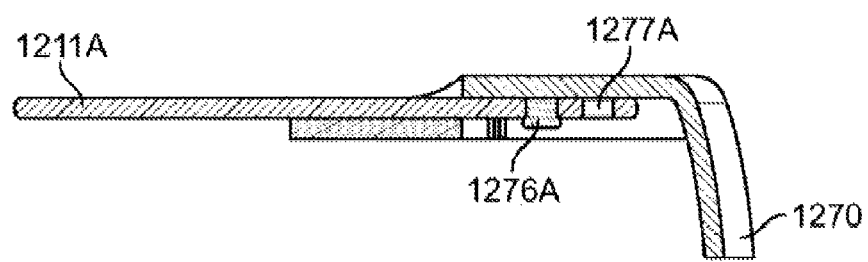
FIG. 34C is a view, taken along the line A-A' shown in FIG. 34B, of the manifold and a paddle for the rear of the games console controller of FIG. 34A.

FIGS. 34A to 34C illustrate a controller 1210 according to a twelfth embodiment. The controller 1210 comprises four paddles 1211A, 1211B, 1211C, 1211D. The four paddles 1211A, 1211B, 1211C, 1211D are mounted substantially parallel to the plane of the back panel 1214. The controller 1210 comprises a detachable mounting plate or saddle 1270 for mounting the four paddles 1211A, 1211B, 1211C, 1211D to the back panel 1214 of the controller 1210. Each paddle 1211A, 1211B, 1211C, 1211D is disposed in overlying relationship with a switch, preferably a microswitch, and is arranged such that a force can be applied to the paddles 1211A, 1211B, 1211C, 1211D to activate the switch disposed therebelow. The detachable mounting plate 1270 comprises four conduits. Each of the conduits receives a respective one of the paddles 1211A, 1211B, 1211C, 1211D. The detachable mounting plate 1270 comprises four mounting posts 1276A, 1276B, 1276C, 1276D. The four mounting posts 1276A, 1276B, 1276C, 1276D are mounted to an internal surface of the detachable mounting plate 1270. The internal surface forms a ceiling above the paddles 1211A, 1211B, 1211C, 1211D. Each paddle 1211A, 1211B, 1211C, 1211D comprises a first mounting aperture 1277A, 1277B, 1277C, 1277D proximate a first end thereof. Each first end of the paddles 1211A, 1211B, 1211C, 1211D is inserted into a respective one of the conduits, as indicated by direction arrow D1. The paddles 1211A, 1211B, 1211C, 1211D once inserted are rotated or pivoted, as indicated by direction arrow D2, such that a mounting post 1276A, 1276D is received in the respective first mounting aperture 1277A, 1277B, 1277C, 1277D. Optionally, each paddle 1211A, 1211B, 1211C, 1211D comprises a second mounting aperture 1278A, 1278B, 1278C, 1278D proximate the first mounting apertures 1277A, 1277B, 1277C, 1277D. A user may vary the length of the portion of the paddles 1211A, 1211B, 1211C, 1211D extending from each respective conduit by selecting to engage the mounting posts with either of the first or second mounting apertures 1277A, 1277B, 1277C, 1277D, 1278A, 1278B, 1278C, 1278D.

Figure 35A:
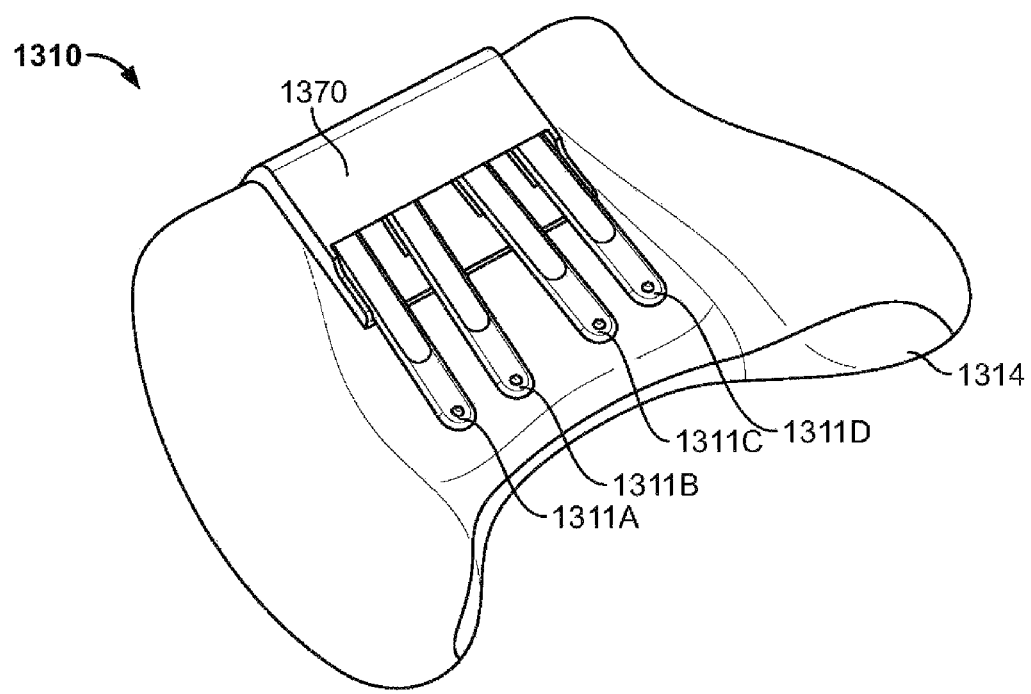
FIG. 35A is a perspective view from below of the rear of a games console controller according to a thirteenth embodiment.
Figure 35B:
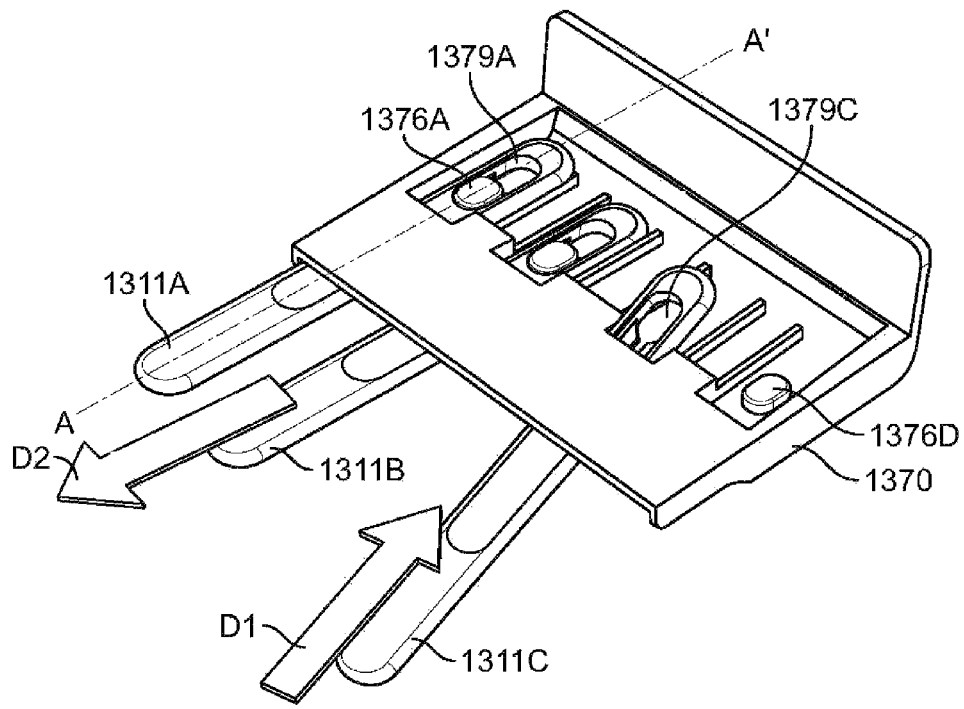
FIG. 35B is a perspective view from below of a manifold and paddles for the rear of the games console controller of FIG. 35A.
Figure 35C:
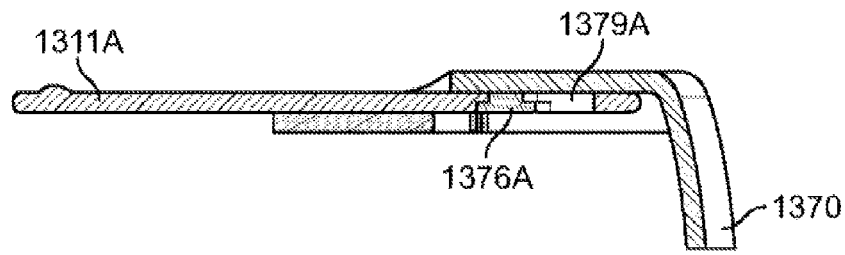
FIG. 35C is a view, taken along the line A-A' shown in FIG. 35B, of the manifold and a paddle for the rear of the games console controller of FIG. 35A.

FIGS. 35A to 35C illustrate a controller 1310 according to a thirteenth embodiment. The controller 1310 comprises four paddles 1311A, 1311B, 1311C, 1311D. The four paddles 1311A, 1311B, 1311C, 1311D are mounted substantially parallel to the plane of the back panel 1314. The controller 1310 comprises a detachable mounting plate or saddle 1370 for mounting the four paddles 1311A, 1311B, 1311C, 1311D to the back panel 1314 of the controller 1310. Each paddle 1311A, 1311B, 1311C, 1311D is disposed in overlying relationship with a switch, preferably a microswitch, and is arranged such that a force can be applied to the paddles 1311A, 1311B, 1311C, 1311D to activate the switch disposed therebelow. The detachable mounting plate 1370 comprises four conduits. Each of the conduits receives a respective one of the paddles 1311A, 1311B, 1311C, 1311D. The detachable mounting plate 1370 comprises four mounting posts 1376A, 1376D. The four mounting posts are mounted to an internal surface of the detachable mounting plate 1370. The internal surface forms a ceiling above the paddles 1311A, 1311B, 1311C, 1311D. Each paddle 1311A, 1311B, 1311C, 1311D comprises a mounting aperture 1377A, 1377B, 1377C, 1377D proximate a first end thereof. The mounting posts 1376A, 1376D comprise a head and a trunk. The head is mounted upon the trunk; the head is larger in dimension than the trunk. The mounting apertures 1377A, 1377B, 1377C, 1377D comprise a first region large enough to receive the head of a mounting post and a second region in the form of a recessed slot, the recessed slot being large enough in dimension to receive the trunk of the mounting posts 1376A, 1376D, but smaller in dimension than the head of the mounting posts 1376A, 1376D.

Each first end of the paddles 1311A, 1311B, 1311C, 1311D is inserted into a respective one of the conduits, as indicated by direction arrow D1. The paddles 1311A, 1311B, 1311C, 1311D once inserted are rotated or pivoted such that a mounting post 1376A, 1376D is received in the first region of the mounting apertures 1377A, 1377B, 1377C, 1377D. The paddles 1311A, 1311B, 1311C, 1311D are then slid with respect to the detachable mounting plate 1370, as indicated by direction arrow D2, such that the trunk of the mounting post 1376A, 1376D is located within the slot and the head of the mounting post 1376A, 1376D is located in the recess. The mounting post 1376A, 1376D thus locks the paddle within the detachable mounting plate 1370; the head of the mounting post 1376A, 1376D is substantially flush with a lower surface of the paddles 1311A, 1311B, 1311C, 1311D.

Figure 36A:
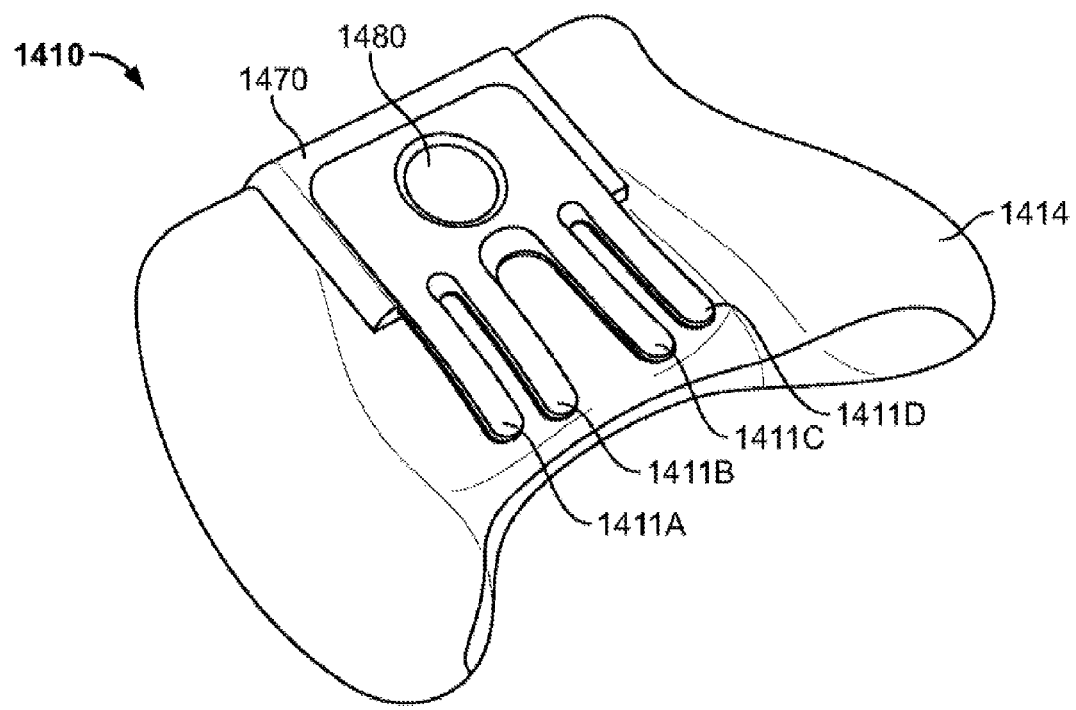
FIG. 36A is a perspective view from below of the rear of a games console controller according to a fourteenth embodiment.
Figure 36B:
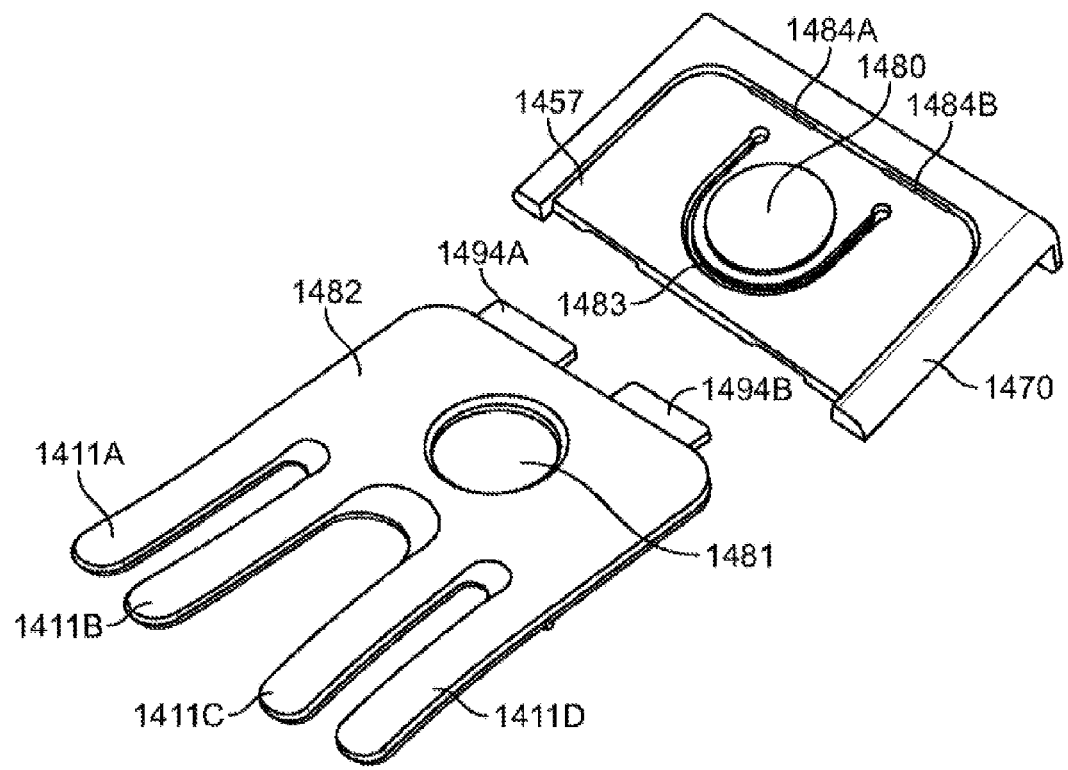
FIG. 36B is a perspective view from below of a manifold and paddles for the rear of the games console controller of FIG. 36A.
Figure 36C:
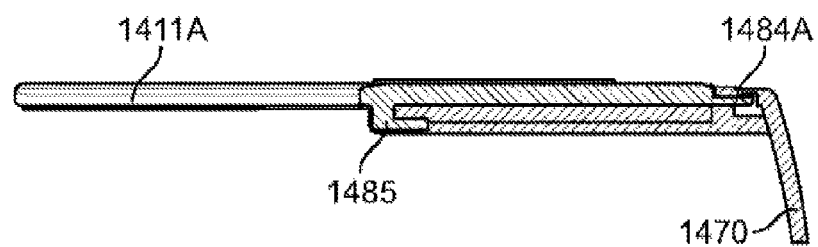
FIG. 36C is a view, taken along the line A-A' shown in FIG. 36B, of the manifold and a paddle for the rear of the games console controller of FIG. 36A.

FIGS. 36A to 36C illustrate a controller 1410 according to a fourteenth embodiment. The controller 1410 comprises a paddle 1482 having four legs 1411A, 1411B, 1411C, 1411D. The paddle 1482 comprises a body portion from which the four legs 1411A, 1411B, 1411C, 1411D extend. The body portion and the four legs 1411A, 1411B, 1411C, 1411D are integrally formed, preferably by molding from a suitable plastic material. The four legs 1411A, 1411B, 1411C, 1411D are mounted substantially parallel to the plane of the back panel 1414. The controller 1410 comprises a detachable mounting plate 1470 for mounting the paddle 1482 including the four legs 1411A, 1411B, 1411C, 1411D to the back panel 1414 of the controller 1410. Each of the four legs 1411A, 1411B, 1411C, 1411D is disposed in overlying relationship with a switch, preferably a microswitch, and is arranged such that a force can be applied to the legs 1411A, 1411B, 1411C, 1411D to activate the switch disposed therebelow.

The detachable mounting plate 1470 comprises a recess 1457 in an outer surface; the body portion of the paddle 1482 is received in the recess 1457. The detachable mounting plate 1470 comprises a catch 1480 disposed within the recess 1457. The body portion of the paddle 1482 comprises an aperture 1481 for mating with the catch 1480 to lock the paddle 1482 to the detachable mounting plate 1470. The catch 1480 is integrally formed with the detachable mounting plate 1470 and is defined in part by a cutaway or slot 1483. The catch 1480 is hinged to the detachable mounting plate 1470 by a living hinge. The paddle 1482 can be separated from the detachable mounting plate 1470 by pressing on the catch 1480 to move the catch out of the aperture 1481. The paddle 1482 can then be slid with respect to the detachable mounting plate 1470 to separate it therefrom. The inherent resilience of the material from which the detachable mounting plate 1470 is formed biases the catch 1480 in a direction which causes the catch 1480 to engage with the aperture 1481.

The detachable mounting plate 1470 comprises two apertures or slots 1484A, 1484B. The body portion of the paddle 1482 comprises a pair of tongues 1494A, 1494B. Each aperture 1484A, 1484B receives a respective one of the pair of tongues 1494A, 1494B.

The body portion of the paddle 1482 comprises two lugs 1485. The lugs 1485 are provided on an inner surface of the body portion of the paddle 1482 and in a spaced apart relationship to the inner surface. A portion of the detachable mounting plate 1470 is received between the body portion of the paddle 1482 and each of the lugs 1485.

Figure 37A:
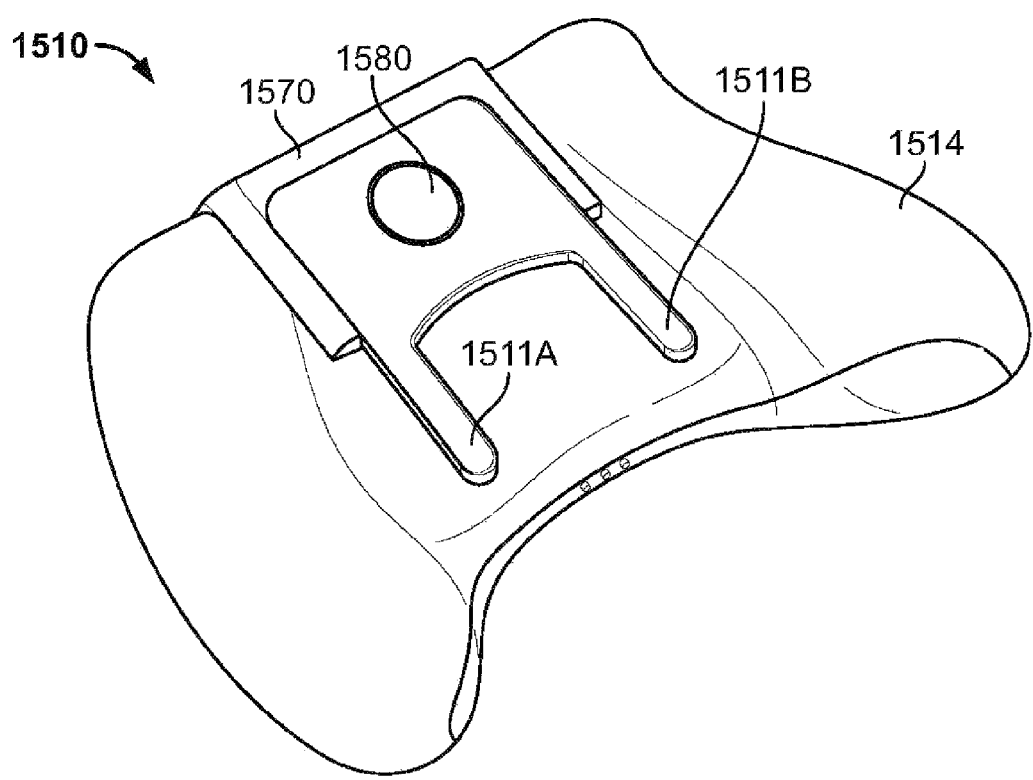
FIG. 37A is a perspective view from below of the rear of a games console controller according to a fifteenth embodiment.
Figure 37B:
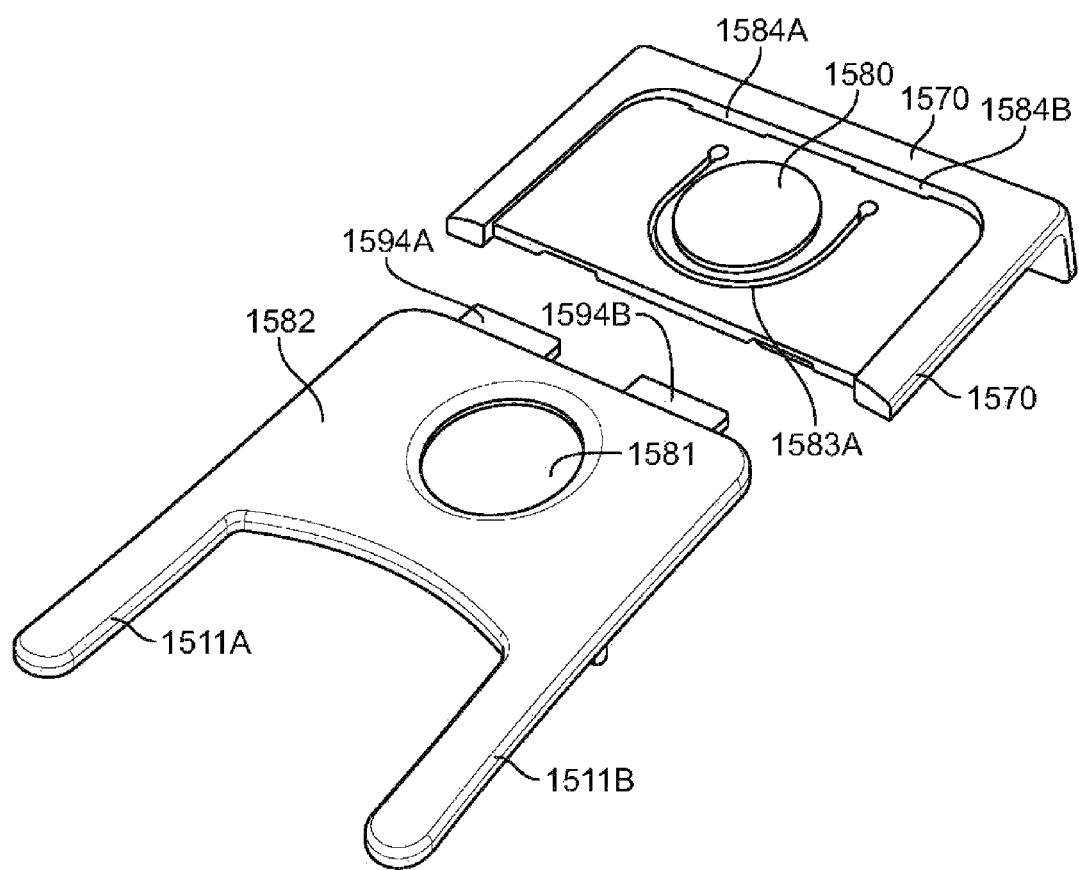
FIG. 37B is a perspective view from below of a manifold and paddles for the rear of the games console controller of FIG. 37A.

FIGS. 37A and 37B illustrate a controller 1510 according to a fifteenth embodiment. The fifteenth embodiment shares many common features with the fourteenth embodiment and therefore only the differences from the embodiment illustrated in FIGS. 36A to 36C will be described in any greater detail. The controller 1510 comprises a paddle 1582 having two legs 1511A, 1511B. The paddle 1582 comprises a body portion from which the two legs 1511A, 1511B extend. The body portion and the two legs 1511A, 1511B are integrally formed, preferably by molding from a suitable plastic material. The two legs 1511A, 1511B are mounted substantially parallel to the plane of the back panel 1514.

Figure 38A:
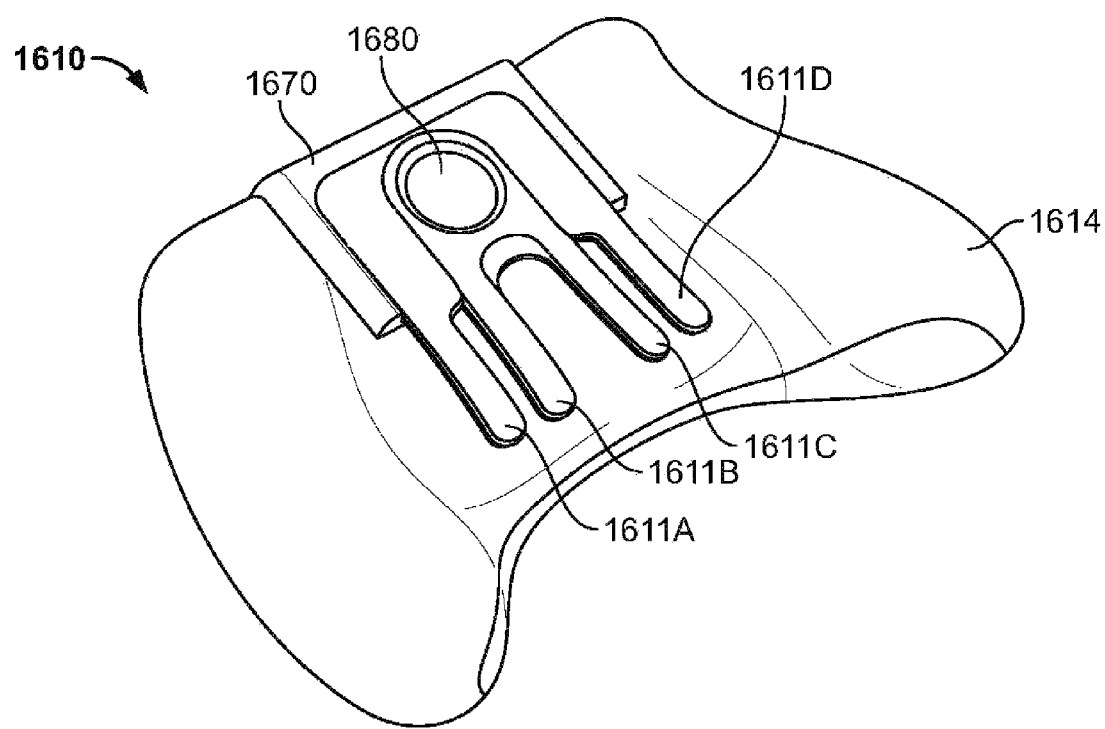
FIG. 38A is a perspective view from below of the rear of a games console controller according to a sixteenth embodiment.
Figure 38B:
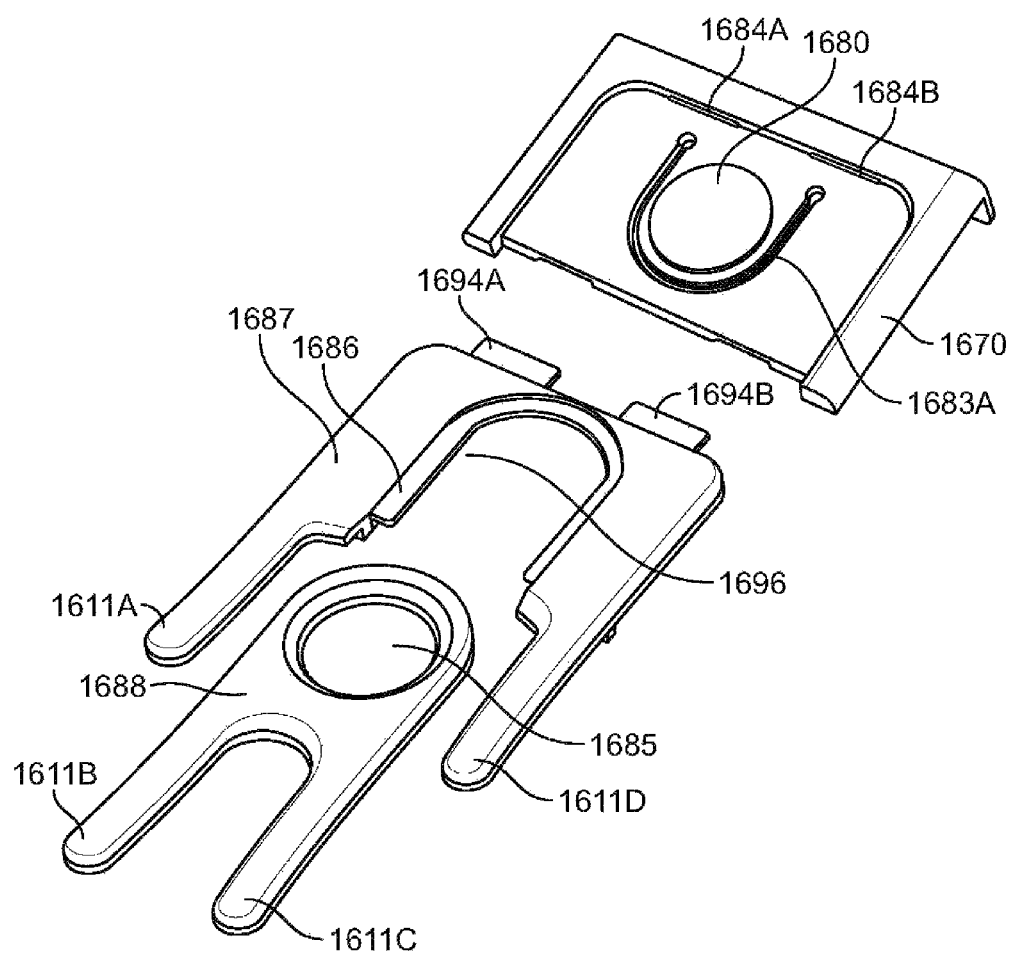
FIG. 38B is a perspective view from below of a manifold and paddles for the rear of the games console controller of FIG. 38A.

FIGS. 38A and 38B illustrate a controller 1610 according to a sixteenth embodiment. The sixteenth embodiment shares many common features with the fourteenth and fifteenth embodiments and therefore only the differences from the embodiments illustrated in FIGS. 36A to 37B will be described in any greater detail.

The controller 1610 comprises a first paddle 1687 having two legs 1611A, 1611D. The first paddle 1687 comprises a body portion from which the two legs 1611A, 1611D extend. The body portion and the two legs 1611A, 1611D are integrally formed, preferably by molding from a suitable plastic material. The two legs 1611A, 1611D are mounted substantially parallel to the plane of the back panel 1614.

The controller 1610 comprises a second paddle 1688 having two legs 1611B, 1611C. The second paddle 1687 comprises a body portion from which the two legs 1611B, 1611C extend. The body portion and the two legs 1611B, 1611C are integrally formed, preferably by molding from a suitable plastic material. The two legs 1611B, 1611C are mounted substantially parallel to the plane of the back panel 1614.

The detachable mounting plate 1670 comprises two apertures or slots 1684A, 1684B. The body portion of the first paddle 1687 comprises a pair of tongues 1694A, 1694B. Each aperture 1684A, 1684B receives a respective one of the pair of tongues 1694A, 1694B.

The body portion of the first paddle 1687 comprises two lugs (not shown). The lugs are provided on an inner surface of the body portion of the first paddle 1687 and in a spaced apart relationship to the inner surface. A portion of the detachable mounting plate 1670 is received between the body portion of the first paddle 1687 and each of the lugs.

The body portion of the first paddle 1687 comprises a recess or cutaway 1696 which receives a portion of the body portion of the second paddle 1688. The body portion of the first paddle 1687 comprises a ledge 1686 adjacent to the recess or cut away 1696. The body portion of the second paddle 1688 rests or engages with the ledge 1686 when received in the recess or cutaway 1696.

The body portion of the second paddle 1688 comprises an aperture 1685 for mating with the catch 1680 to lock the first and second paddles 1687, 1688 to the detachable mounting plate 1670.

Figure 39A:
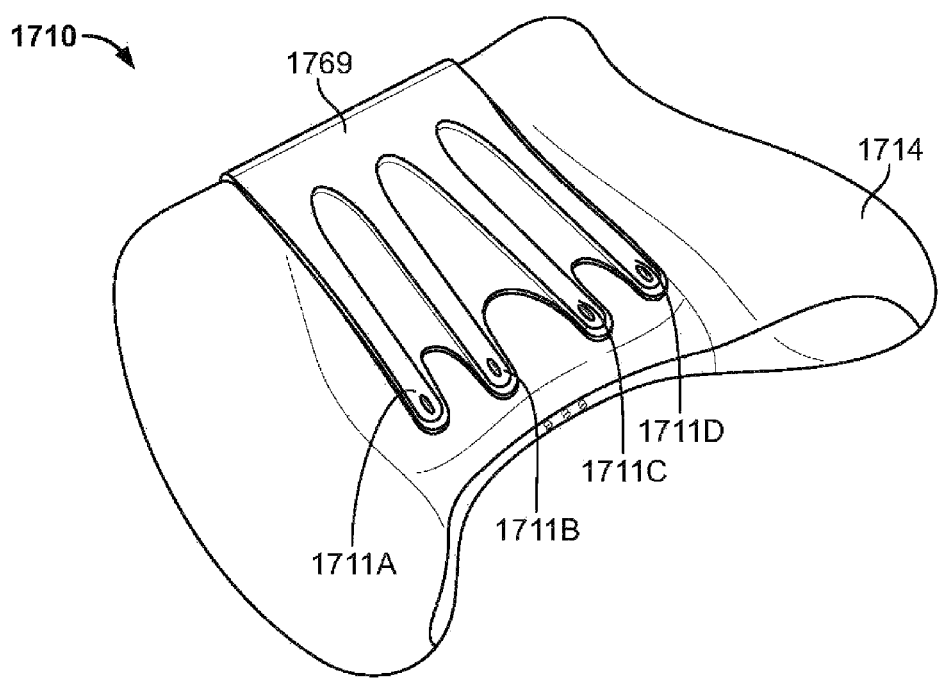
FIG. 39A is a perspective view from below of the rear of a games console controller according to a seventeenth embodiment.
Figure 39B:
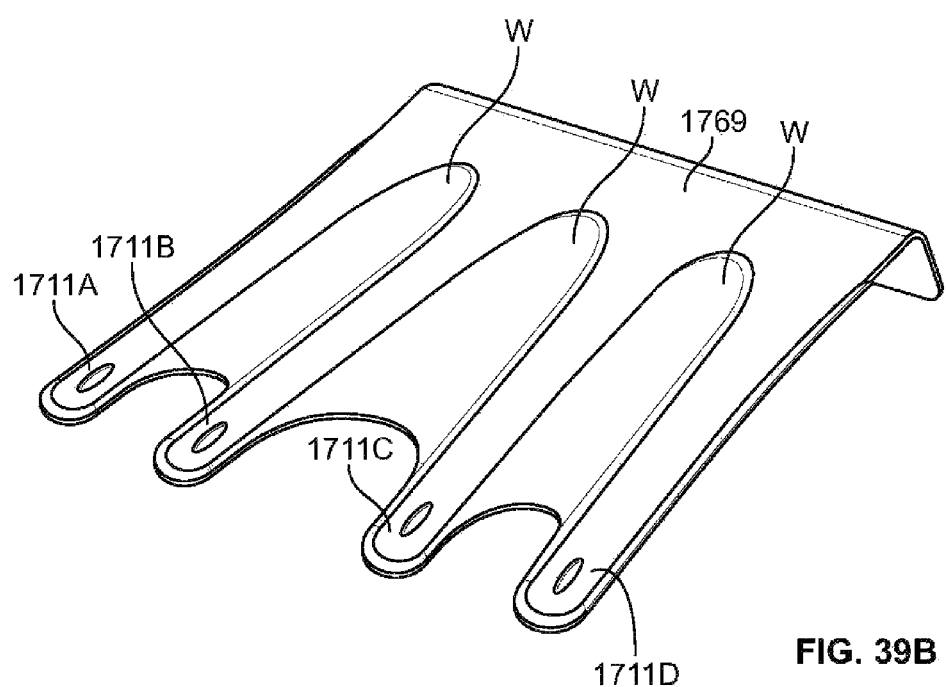
FIG. 39B is a perspective view from below of a manifold and paddles for the rear of the games console controller of FIG. 39A.

FIGS. 39A to 39B illustrate a controller 1710 according to a seventeenth embodiment. The controller 1710 comprises four legs 1711A, 1711B, 1711C, 1711D which form paddles. The four legs 1711A, 1711B, 1711C, 1711D are mounted substantially parallel to the plane of the back panel 1714. The controller 1710 comprises a detachable cover plate 1769 for mounting the four legs 1711A, 1711B, 1711C, 1711D to the back panel 1714 of the controller 1710. Each leg 1711A, 1711B, 1711C, 1711D is disposed in overlying relationship with a switch, preferably a microswitch, and is arranged such that a force can be applied to the legs 1711A, 1711B, 1711C, 1711D to activate the switch disposed therebelow. The detachable cover plate 1769 comprises a body portion from which the four legs 1711A, 1711B, 1711C, 1711D extend. The body portion and the four legs 1711A, 1711B, 1711C, 1711D are integrally formed, preferably by molding from a suitable plastic material. The detachable cover plate 1769 comprises an optional web structure W which couples each of the four legs 1711A, 1711B, 1711C, 1711D to its adjacent neighbors. Preferably, the optional web structure W is formed from a flexible material which allows each of the four legs 1711A, 1711B, 1711C, 1711D to bend or move with respect to the back panel 1714 without affecting its adjacent neighbors.

The detachable cover plate 1769 is detachably coupled to the back panel 1714 of the controller 1710 by one or more detents or latches (not shown). In some embodiments the detachable cover plate 1769 covers or protects a void in the controller 1710; preferably a power source such as a battery is provided in the void. The detachable cover plate 1769 may be detached from the controller 1710 for insertion or removal of the power source.

It is envisaged that the detachable cover plate 1769 may be retrofitted to a controller 1710 in replacement of a battery cover panel (not shown) which mates with the back panel 1714 of the controller 1710.

Figure 40A:
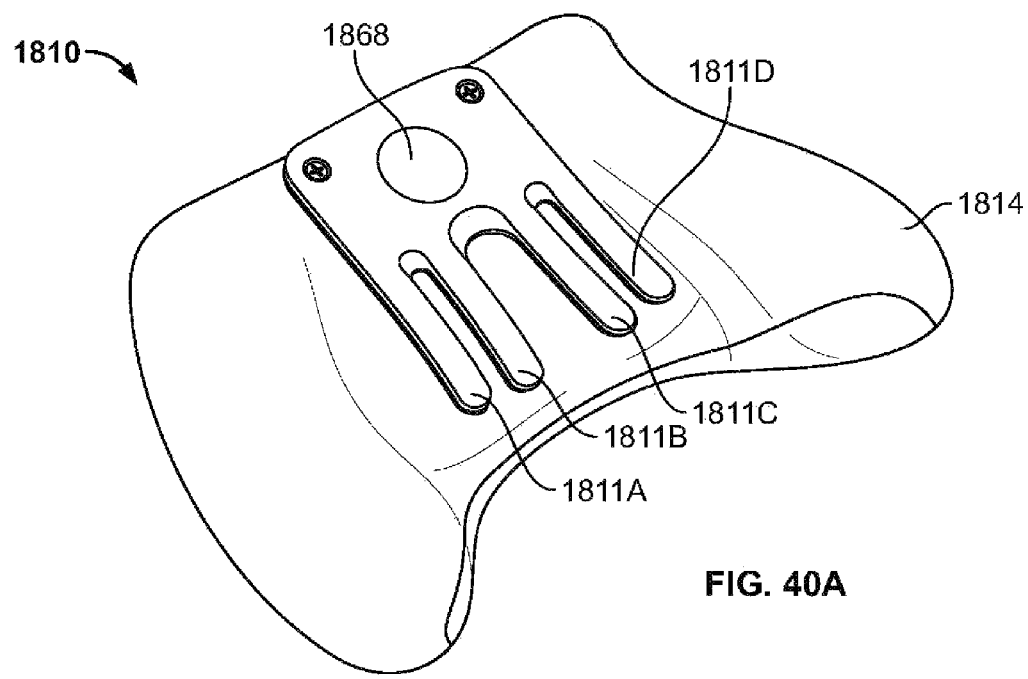
FIG. 40A is a perspective view from below of the rear of a games console controller according to an eighteenth embodiment.
Figure 40B:
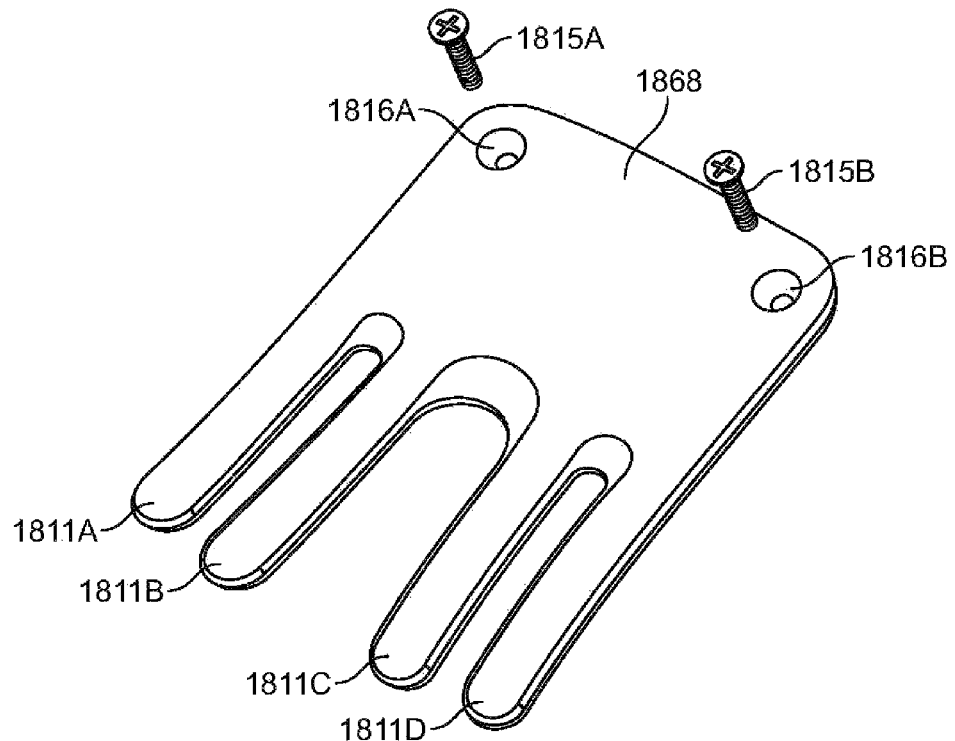
FIG. 40B is a perspective view from below of a manifold and paddles for the rear of the games console controller of FIG. 40A.

FIGS. 40A and 40B illustrate a controller 1810 according to an eighteenth embodiment. The controller 1810 comprises a cover plate 1868 having four legs 1811A, 1811B, 1811C, 1811D which form paddles. The four legs 1811A, 1811B, 1811C, 1811D are mounted substantially parallel to the plane of the back panel 1814. Each paddle 1811A, 1811B, 1811C, 1811D is disposed in overlying relationship with a switch, preferably a microswitch, and is arranged such that a force can be applied to the paddles 1811A, 1811B, 1811C, 1811D to activate the switch disposed therebelow. The cover plate 1868 comprises a body portion from which the four legs 1811A, 1811B, 1811C, 1811D extend. The body portion and the four legs 1811A, 1811B, 1811C, 1811D are integrally formed, preferably by molding from a suitable plastic material. The cover plate 1868 comprises a pair of mounting apertures 1816A, 1816B which allow the cover plate 1868 to be mounted to the back panel 1814 by a respective fixing device 1815A, 1815B.

Figure 41A:
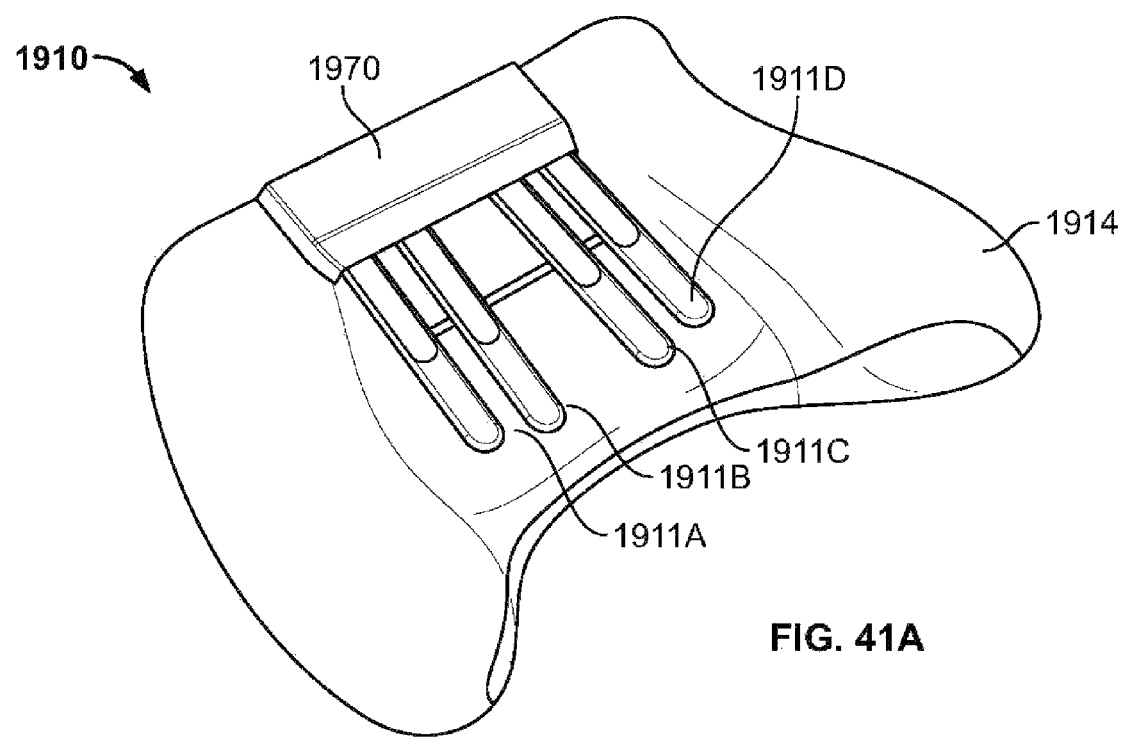
FIG. 41A is a perspective view from below of the rear of a games console controller according to a nineteenth embodiment.
Figure 41B:
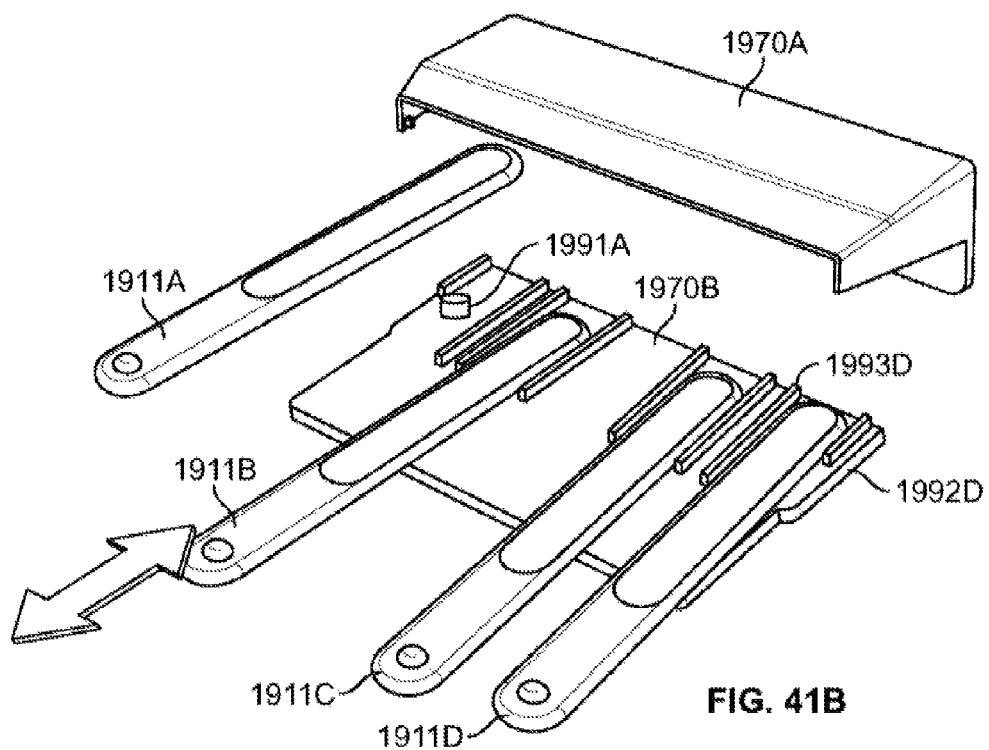
FIG. 41B is a perspective view from below of a manifold and paddles for the rear of the games console controller of FIG. 41A.
Figure 41C:
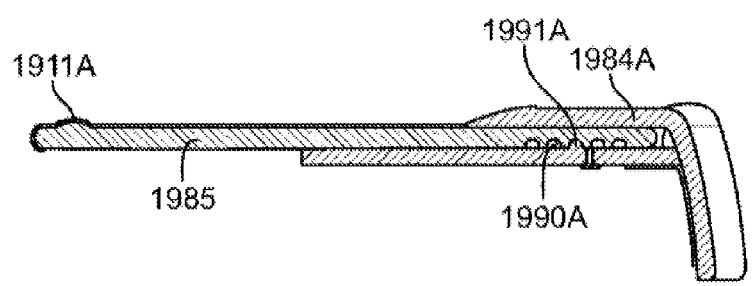
FIG. 41C is a view, taken along the line A-A' shown in FIG. 41B, of the manifold and a paddle for the rear of the games console controller of FIG. 41A.
Figure 44:
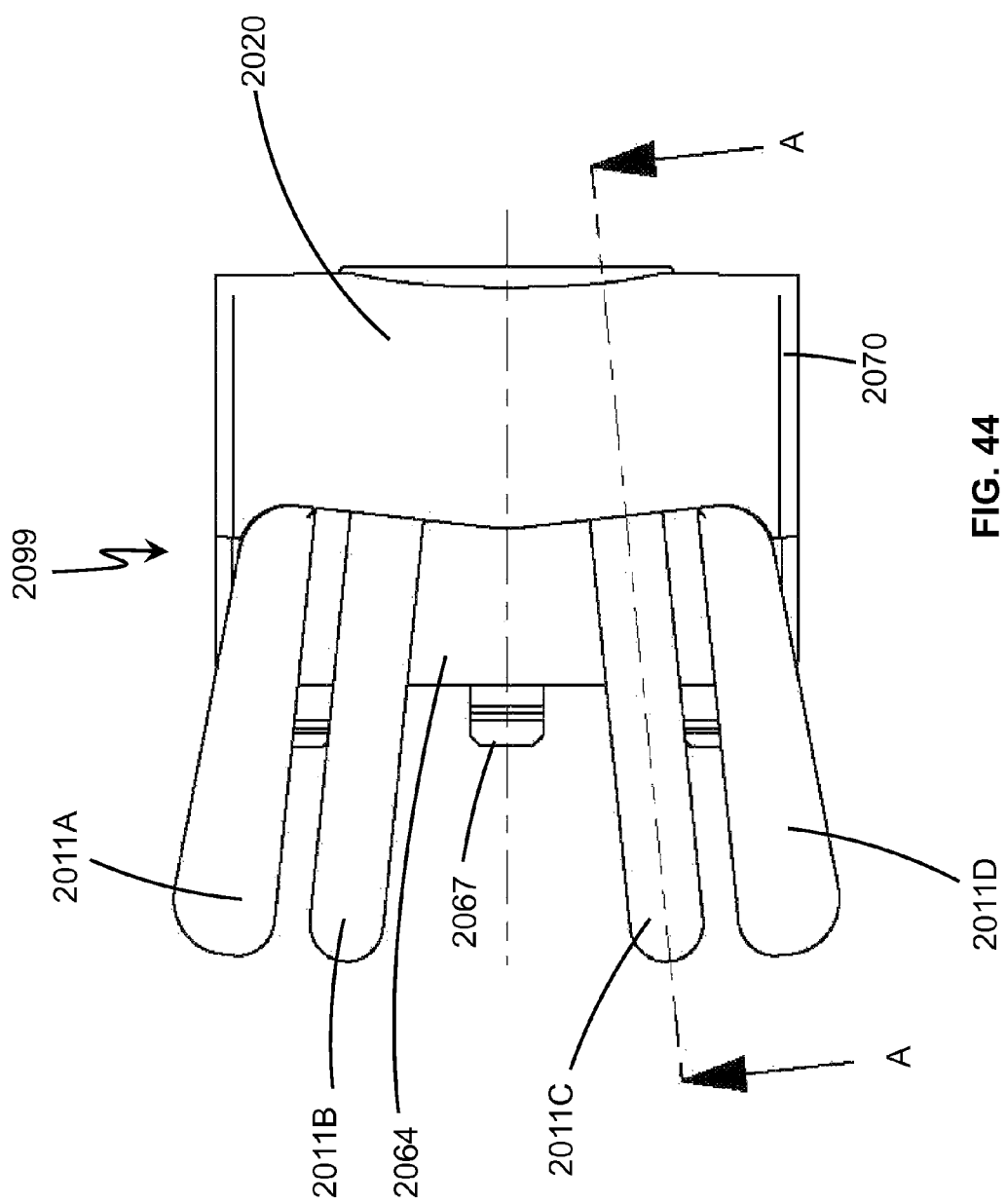
FIG. 44 is a plan view from below of the manifold and paddles of FIG. 42.

FIGS. 41A to 41C illustrate a controller 1910 according to a nineteenth embodiment. The controller 1910 comprises four paddles 1911A, 1911B, 1911C, 1911D. The four paddles 1911A, 1911B, 1911C, 1911D are mounted substantially parallel to the plane of the back panel 1914. The controller 1910 comprises a detachable mounting plate or saddle 1970 for mounting the four paddles 1911A, 1911B, 1911C, 1911D to the back panel 1914 of the controller 1910. Each paddle 1911A, 1911B, 1911C, 1911D is disposed in overlying relationship with a switch, preferably a microswitch, and is arranged such that a force can be applied to the paddles 1911A, 1911B, 1911C, 1911D to activate the switch disposed therebelow.

The detachable mounting plate 1970 comprises a base portion 1970B and a second top portion 1970A. The base portion 1970B and the second top portion 1970A together form four conduits. Each of the conduits receives a respective one of the paddles 1911A, 1911B, 1911C, 1911D. The first base portion 1970B comprises a first guide member in the form of a first rail 1992D and a second guide member in the form of a second rail 1993D. The first guide member 1992D and the second guide member 1993D define in part each conduit. A locating post 1991A is provided on the base portion 1970B between each of the first 1992D and second 1993D guide members. Each of the paddles 1911A, 1911B, 1911C, 1911D comprises a plurality of locating recesses 1990A or, in alternative embodiments, apertures. The locating recesses 1990A are configured to one of the locating posts 1991A. A user can adjust the length of the exposed portion of each of the paddles 1911A, 1911B, 1911C, 1911D by selecting to engage the locating post 1991A in a desired one of the plurality of locating recesses 1990A. The base portion 1970B and the second top portion 1970A are detachably secured to each other so as to hold the paddles 1911A, 1911B, 1911C, 1911D in the selected position.

FIGS. 42 to 48 illustrate an apparatus 2099 for a controller (not shown), the apparatus including a mounting plate 2070 and paddles 2011A, 2011B, 2011C, 2011D according to a twentieth embodiment. The twentieth embodiment shares many common features with the previous embodiments and therefore only the differences from the previous embodiments will be described in any greater detail.

Referring to FIGS. 42 to 48, the mounting plate 2070 comprises a base 2064 and a cover 2020. The base 2064 and cover 2020 define a plurality of channels or conduits. In the illustrated embodiment four such conduits are provided; each conduit is configured and arranged to receive a paddle 2011A, 2011B, 2011C, 2011D. Each of the paddles 2011A, 2011B, 2011C, 2011D is removable from the conduit, without the requirement for a tool to release the paddles 2011A, 2011B, 2011C, 2011D.

The base 2064 of the mounting plate 2070 comprises a plurality of slots 2047, best illustrated in FIG. 46A. The slots 2047 are configured and arranged to receive a detent 2058, in the form of a barb or catch, best illustrated in FIG. 48. The detent 2058 comprises side walls which engage with side walls of the slot 2047. In this way the slot 2047 and detent 2058 provide lateral or transverse support to the paddles 2011A, 2011B, 2011C, 2011D.

The detent 2058 comprises an end wall 2047E and the slot 2047 comprises an end wall 2058E. The end wall 2047E of the detent 2058 abuts or engages with the end wall 2058E of the slot 2047 to lock the paddle in the conduit, best shown in FIG. 45.

Figure 45:
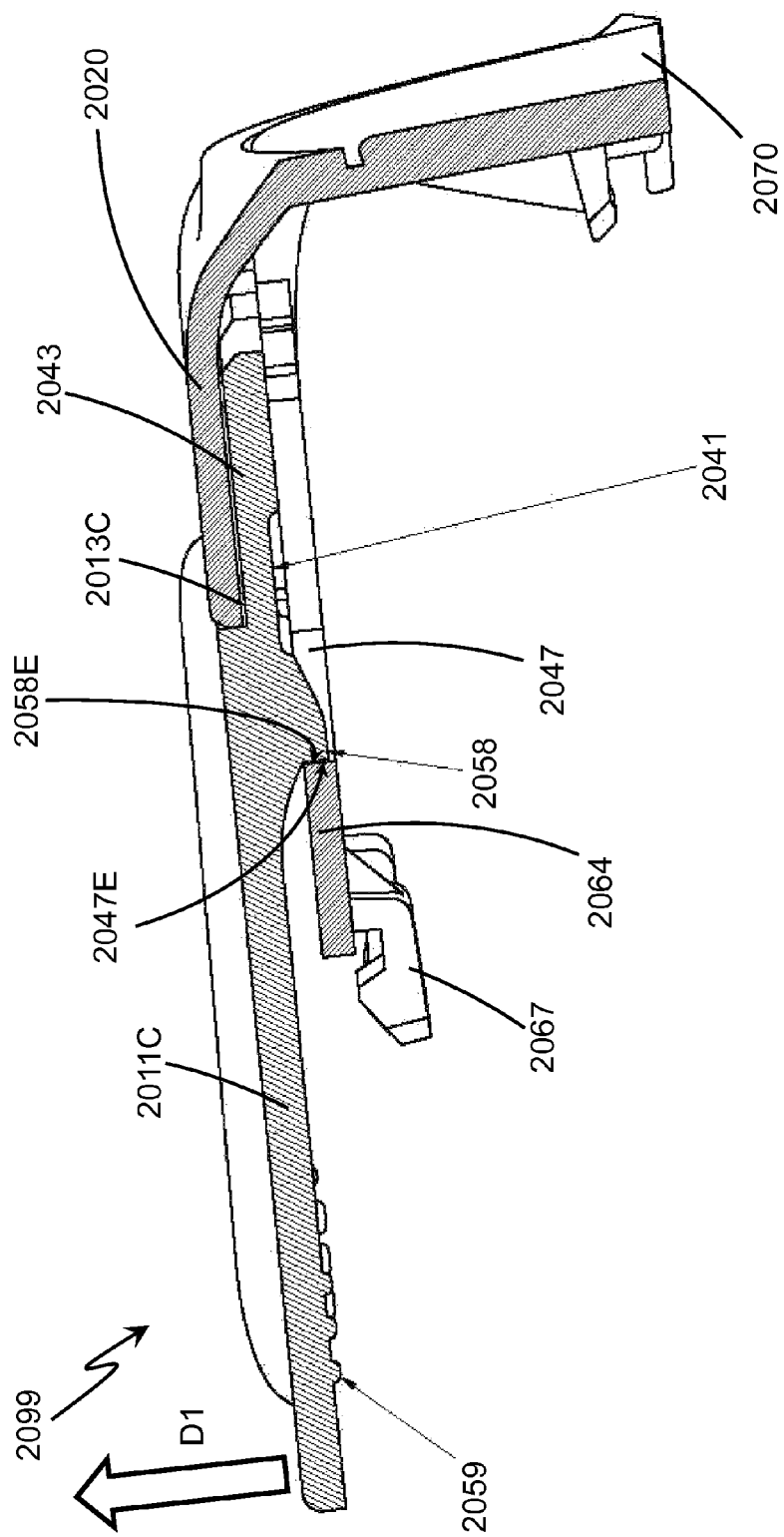
FIG. 45 is a view, taken along the line A-A shown in FIG. 44, of the manifold and paddles of FIG. 42.
Figure 46:
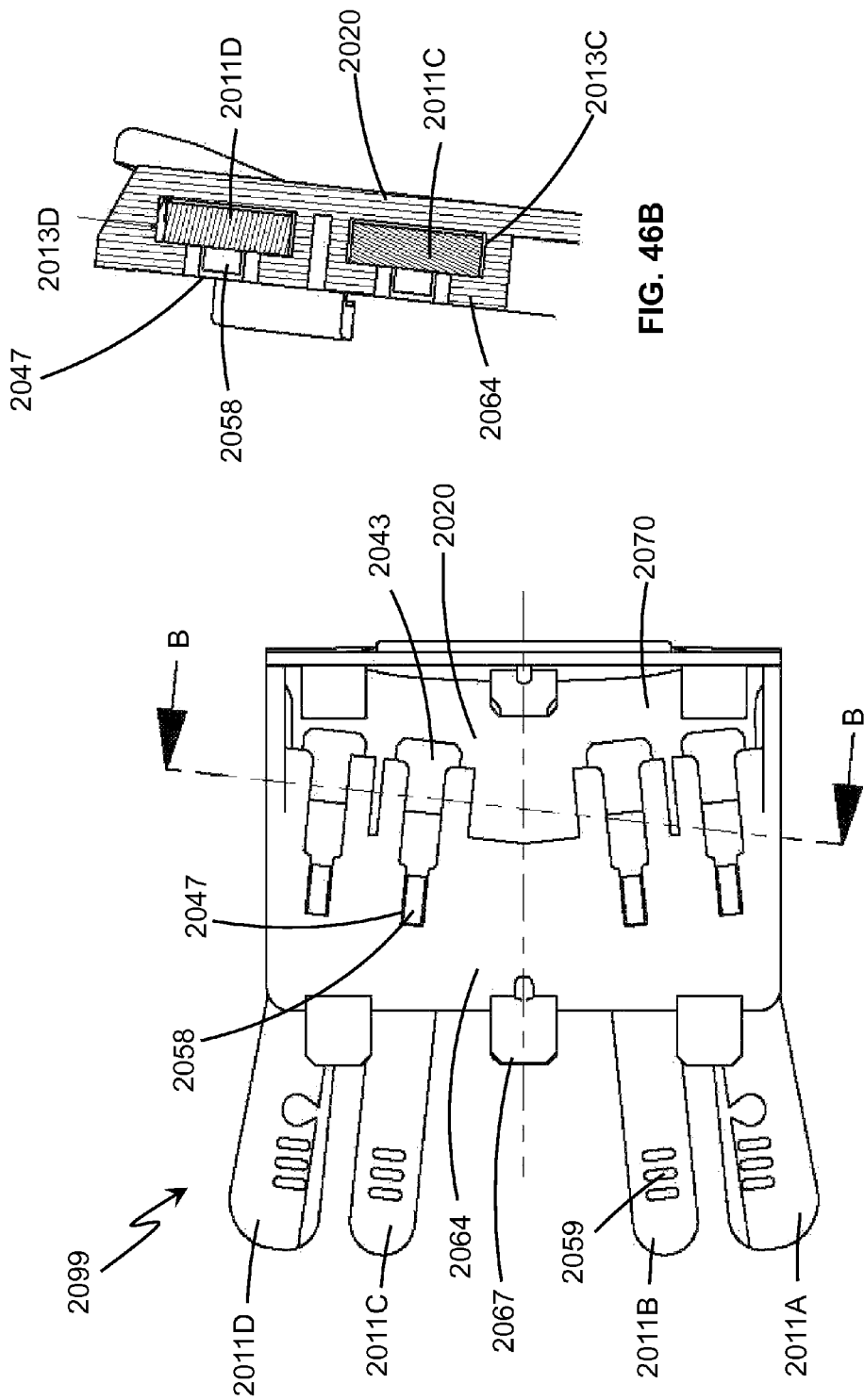
FIG. 46A is a plan view from above of the manifold and paddles of FIG. 42.
FIG. 46B is a partial view, taken along the line B-B shown in FIG. 46A, of the manifold and paddles of FIG. 42.
Figure 47:
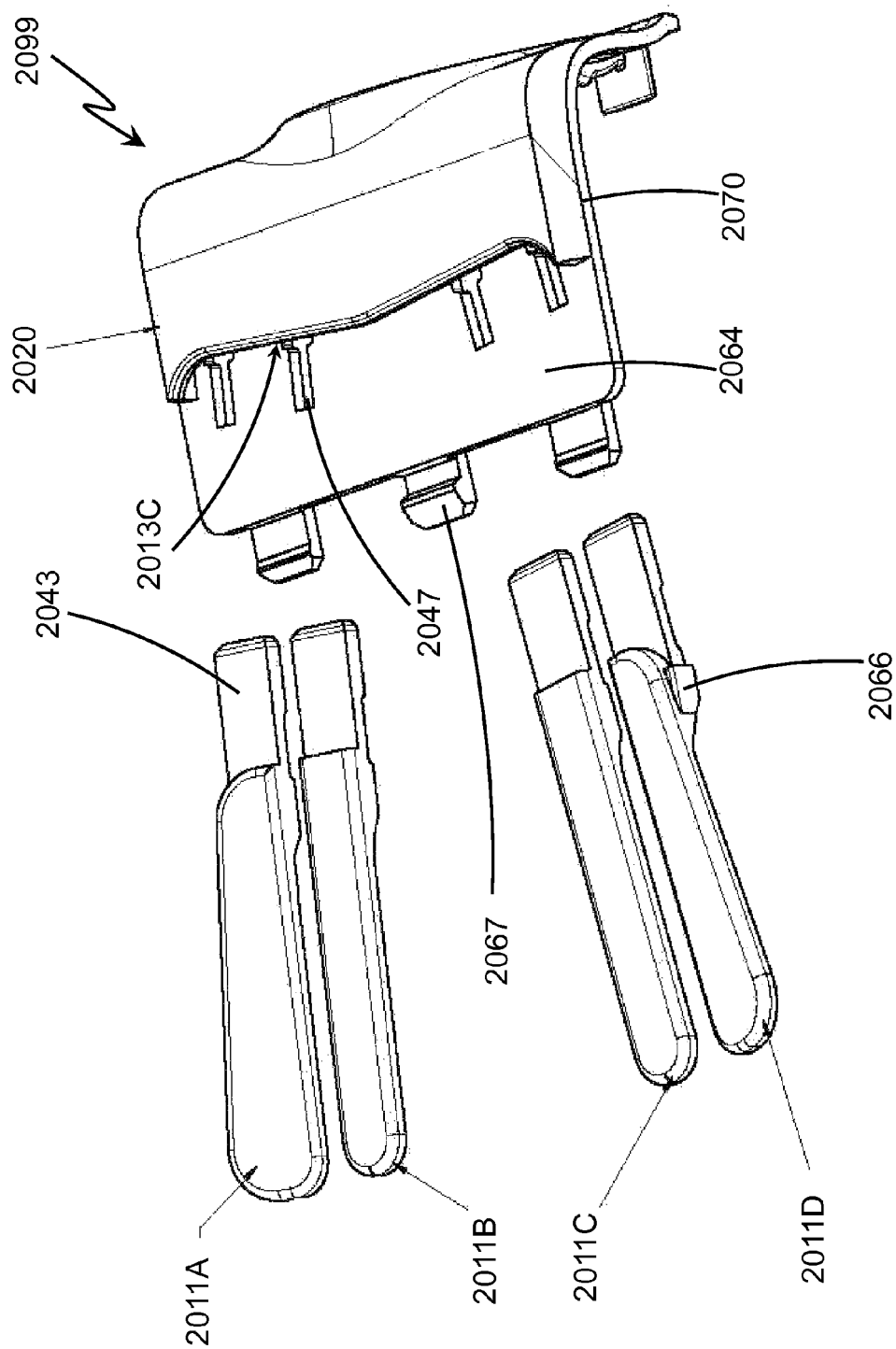
FIG. 47 is a perspective view from below of the manifold and paddles of FIG. 42 in which the paddles have been removed from the manifold.
Figure 48:
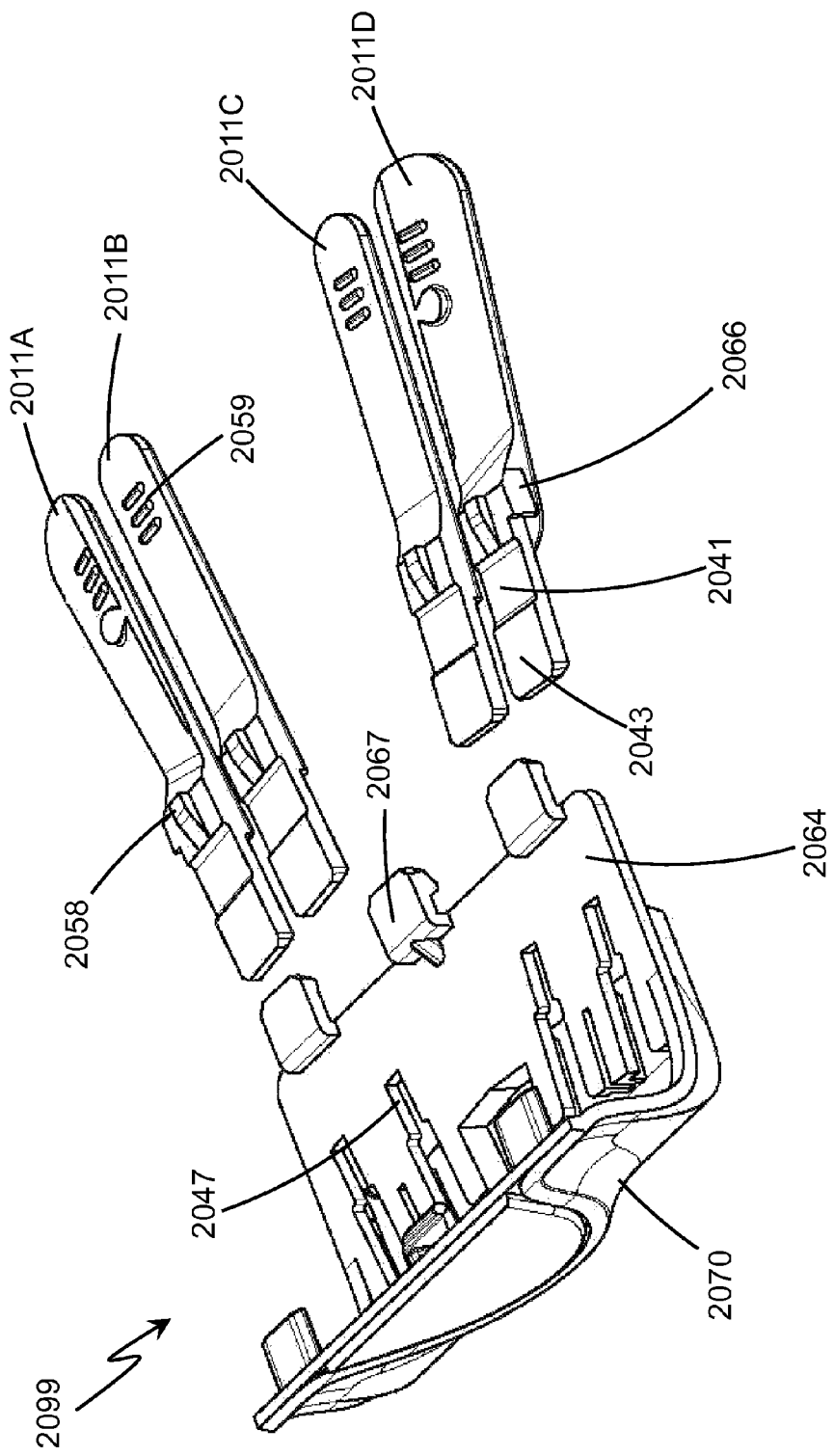
FIG. 48 is a perspective view from above of the manifold and paddles of FIG. 42 in which the paddles have been removed from the manifold.

The paddles 2011A, 2011B, 2011C, 2011D comprise a head 2043, see FIG. 45, which is inserted into the conduit. The paddles 2011A, 2011B, 2011C, 2011D comprise a main body integrally formed with the head 2043 which is disposed externally on the rear of a controller (not shown). The paddles 2011A, 2011B, 2011C, 2011D comprise a transition between the head 2043 and the main body. The transition is defined by a wall which is configured to be substantially perpendicular to the upper surface of the head 2043. The transition abuts an end wall of the cover 2020, further increasing the security of the paddles 2011A, 2011B, 2011C, 2011D within the mounting plate 2070.

The paddles 2011A, 2011B, 2011C, 2011D each comprise a flexible region 2041 created by a recess in the surface of the paddles 2011A, 2011B, 2011C, 2011D. As shown in FIG. 45, the recess is disposed in the lower surface of the paddles 2011A, 2011B, 2011C, 2011D. The lower surface is disposed adjacent to the base 2064 of the mounting plate 2070; however, it will be appreciated that in normal use the recess is disposed uppermost. In alternative embodiments the recess may be disposed in the opposing surface of the paddles 2011A, 2011B, 2011C, 2011D, which in FIG. 45 is an upper surface; the opposing surface is disposed adjacent to the cover 2020.

The conduits 2013D, 2013C, best shown in FIG. 46B, comprise opposing side walls and upper and lower walls, such that the paddles 2011A, 2011B, 2011C, 2011D are supported and/or aligned on four surfaces.

The paddles 2011A, 2011B, 2011C, 2011D comprise a grip 2059 disposed on the lower surface shown in FIG. 45. The grip 2059 is formed from a plurality of ridges protruding from the lower surface. In alternative embodiments, the grip 2059 may be formed by a plurality of troughs or recesses in the lower surface. In still further embodiments, the grip 2059 may be formed by over-molding or securing a second different material such as, but not limited to, a rubberized material to the paddles 2011A, 2011B, 2011C, 2011D.

The outermost paddles 2011A, 2011D each comprise a brace member 2066 disposed on an outer side edge thereof. The brace members 2066 comprise an engaging edge which abuts the end of the cover 2020 and/or an end of the side wall of a respective conduit. The brace members 2066 provide lateral or transverse support to the paddles 2011A, 2011B, 2011C, 2011D.

In other embodiments brace members 2066 may be provided on the inner side edge in addition, or alternatively, to the outer side edge. In still further embodiments the innermost paddles 2011B, 2011C may comprise brace members 2066.

The mounting plate 2070 comprises clips or catches 2067 for providing an interlocking fit with a receiver (not shown) disposed within the chassis of a controller (not shown).

In the illustrated embodiment, the mounting plate 2070 forms a hatch or cover for a battery compartment of the controller. The mounting plate 2070 includes an end wall 2063 having a display region 2065 for the display of indicia. The display region 2065 may be formed from a magnetic or ferromagnetic material, or from a permanent magnet. A removable indicia component may be attached to the display region 2065 and held thereto by magnetic force of attraction.

The paddles 2011A, 2011B, 2011C, 2011D can be removed from the mounting plate 2070 by lifting a free end of the paddles 2011A, 2011B, 2011C, 2011D such that the detent 2058 clears the slot 2047. The paddles 2011A, 2011B, 2011C, 2011D can then be removed, preferably by sliding them out of the conduit. The paddles 2011A, 2011B, 2011C, 2011D can be inserted by reversing the removal process. Preferably, the paddles 2011A, 2011B, 2011C, 2011D will be formed so as to have an inherent bias or resilience such that the detent 2058 is securely located within the slot 2047. Such biasing may be achieved or increased by forming the paddles 2011A, 2011B, 2011C, 2011D with a slight curve or arcuate form.

In some embodiments the microswitches may be replaced with a magnetic switch or sensor, for example a reed switch; the paddles may comprise a magnet arranged so as to activate the magnetic switch or sensor when the paddle is depressed by a user. It is envisaged that in such embodiments the magnetic switch or sensor is mounted inside the controller behind the back panel and that there will be no requirement to provide apertures through the back panel in order that the paddles can physically contact the microswitches. Further it is envisaged that the user may be provided with feedback to indicate that the switch has been activated. The feedback may be aural or haptic, for example, such as an audible click.

It is envisaged that the controllers may be coupled to a games console or computer by a wired connection or by a wireless connection device.

It is also envisaged that the controller may be constructed as a shell or caddy into which a hand-held electronic device such as, but not limited to, a mobile telephone (smartphone) or tablet computer is inserted, the caddy comprising control actuators, thumb sticks and/or buttons (which are coupled to the electronic device either wirelessly or via physical or wired connection) for interaction with or control of the electronic device.

It will be recognized that as used herein, directional references such as "top", "bottom", "front", "back", "end", "side", "inner", "outer", "upper" and "lower" do not limit the respective features to such orientation, but merely serve to distinguish these features from one another.

What is claimed is:

1. A hand held controller for a games console comprising:
a hard outer case; and
a plurality of controls located on a front and top of the controller;

the controller being shaped to be held in both hands of a user such that the user's thumbs are positioned to operate controls located on the front of the controller and the user's index fingers are positioned to operate controls located on the top of the controller; wherein the controller further comprises at least one additional control mounted on a back of the controller such that the at least one additional control is in a position operable by the middle finger of a user;

wherein the controller comprises a switch mechanism mounted in the outer case, and disposed in vertical registry with at least a portion of the at least one additional control, the switch mechanism being mounted to be disposed flush with the back of the controller, and wherein each of the at least one additional control comprises a projection arranged to be aligned in vertical registry with the switch mechanism, the projection providing an engaging surface for activating the switch mechanism.

2. The hand held controller of claim 1 wherein the at least one additional control comprises a paddle lever.

3. The hand held controller of claim 2 wherein the paddle lever comprises an elongate member.

4. A paddle lever for engaging with a hand held controller comprising:

an elongate member;

a first part of a complementary locking mechanism for engaging with a second part of a complementary locking mechanism disposed on a back of the controller, the elongate member comprising a projection extending from a first surface, the projection providing an engaging surface for activating a switch mechanism mounted in an outer case of the controller, and disposed in vertical registry with the projection, the switch mechanism being mounted to be disposed flush with the back of the controller.

5. A hand held controller for a games console comprising:

a hard outer case; and a plurality of controls located on a front and top of the controller;

the controller being shaped to be held in both hands of a user such that the user's thumbs are positioned to operate controls located on the front of the controller and the user's index fingers are positioned to operate controls on the top of the controller; wherein the controller further comprises at least one additional control mounted on a back of the controller such that the at least one additional control is in a position operable by a user's middle finger, the additional control comprising an elongate member; wherein the controller comprises a switch mechanism mounted in the outer case and disposed in vertical registry with at least a portion of the at least one additional control, the switch mechanism being mounted to be disposed in a flush position with respect to the back of the controller, and wherein the elongate member comprises a projection arranged to be aligned in vertical registry with the switch mechanism, the projection providing an engaging surface for activating the switch mechanism.

6. A hand held controller for a games console comprising:

a hard outer case; and a plurality of controls located on a front and a top of the controller;

the controller being shaped to be held in both hands of a user such that the user's thumbs are positioned to operate controls located on the front of the controller and the user's index fingers are positioned to operate controls located on the top of the controller; wherein the controller further comprises at least one additional control mounted on a back of the controller such that the at least one additional control is in a position operable by the middle finger of a user;

wherein the controller comprises a switch mechanism mounted in the outer case, and disposed in vertical registry with at least a portion of the at least one additional control, the switch mechanism being mounted such that a contact surface of the switch mechanism is disposed between an inner surface of the back of the controller and an outer surface of the back of the controller, and wherein each of the at least one additional control comprises a projection arranged to be aligned in vertical registry with the switch mechanism, the projection providing an engaging surface for engaging the contact surface and activating the switch mechanism.

* * * * *